US010133443B2

(12) United States Patent
Von Dehsen et al.

(10) Patent No.: US 10,133,443 B2
(45) Date of Patent: Nov. 20, 2018

(54) SYSTEMS AND METHODS FOR SMART HOME AUTOMATION USING A MULTIFUNCTION STATUS AND ENTRY POINT ICON

(71) Applicant: GOOGLE LLC, Mountain View, CA (US)

(72) Inventors: Lauren Von Dehsen, San Francisco, CA (US); Zachery Webster Kennedy, San Jose, CA (US); Ted Boda, Mountain View, CA (US); Jason Ketterman, Mountain View, CA (US); Jesse Boettcher, Mountain View, CA (US); Michael Mizono, Mountain View, CA (US); Tomas Brennessl, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/738,928

(22) Filed: Jun. 14, 2015

(65) Prior Publication Data

US 2016/0364114 A1   Dec. 15, 2016

(51) Int. Cl.
*G06F 3/0481* (2013.01)
*G06F 3/0484* (2013.01)
(Continued)

(52) U.S. Cl.
CPC ....... *G06F 3/04817* (2013.01); *G05B 19/042* (2013.01); *G06F 3/04842* (2013.01);
(Continued)

(58) Field of Classification Search
CPC ............. G06F 3/04817; G06F 3/04842; G05B 19/042; G05B 2219/2613
(Continued)

(56) References Cited

U.S. PATENT DOCUMENTS 5,625,410 A   4/1997   Washino et al.
5,765,485 A   6/1998   Thoman et al.
(Continued)

FOREIGN PATENT DOCUMENTS

WO   WO 2006/120596 A2   11/2006
WO   WO 2014/137372 A1   9/2014

OTHER PUBLICATIONS

Blatner, WiCam: Wireless iPhone Camera, Rochester Institute of Technology, Spring 2010, 1 pg, www.ce/rit/edu/research/projects/2010_spring/WICam/index.html.
(Continued)

*Primary Examiner* — Roland J Casillas
(74) *Attorney, Agent, or Firm* — Morgan, Lewis & Bockius LLP

(57) ABSTRACT

A computing device is associated with one or more electronic devices in a smart home environment, the smart home environment having a plurality of environment statuses. A current environment status of the plurality of environment statuses is identified for the smart home environment. Based on the current environment status of the smart home environment, one of a plurality of different feature sets is determined for a smart home application executable on the computing device for interacting with the smart home environment. The determined feature set includes selectable commands for performing device functions associated with the current environment status. The determined feature set is provided to an instance of the smart home application, thereby enabling the instance to offer user interactions consistent with the selectable commands.

20 Claims, 46 Drawing Sheets

(51) Int. Cl.
  *G05B 19/042* (2006.01)
  *H04L 12/28* (2006.01)
(52) U.S. Cl.
  CPC ...... *H04L 12/2807* (2013.01); *H04L 12/2816* (2013.01); *G05B 2219/2613* (2013.01)
(58) Field of Classification Search
  USPC ........................................................ 715/835
  See application file for complete search history.

(56) References Cited

U.S. PATENT DOCUMENTS

| | | | |
|---|---|---|---|
| D424,036 S | 5/2000 | Arora et al. | |
| D456,293 S | 4/2002 | Tsumura et al. | |
| D550,227 S | 9/2007 | Sato et al. | |
| 7,382,244 B1 | 6/2008 | Donovan et al. | |
| D597,864 S | 8/2009 | Sakuma et al. | |
| D607,004 S | 12/2009 | Kordus et al. | |
| D621,730 S | 8/2010 | Driver et al. | |
| D626,131 S | 10/2010 | Kruzeniski et al. | |
| 7,877,708 B2 | 1/2011 | Zinn et al. | |
| 7,884,855 B2 | 2/2011 | Ortiz | |
| 7,903,115 B2 | 3/2011 | Platzer et al. | |
| 7,996,771 B2 | 8/2011 | Girgensohn et al. | |
| D647,809 S | 11/2011 | Driver | |
| D656,157 S | 3/2012 | Khan et al. | |
| D658,674 S | 5/2012 | Shallcross et al. | |
| D661,701 S | 6/2012 | Brown et al. | |
| D662,508 S | 6/2012 | Kim | |
| D664,966 S | 8/2012 | Shallcross et al. | |
| D664,978 S | 8/2012 | Tanghe et al. | |
| D672,364 S | 12/2012 | Reyna et al. | |
| 8,340,654 B2 | 12/2012 | Bratton et al. | |
| D677,269 S | 3/2013 | Scott et al. | |
| D678,898 S | 3/2013 | Walsh et al. | |
| 8,390,684 B2 | 3/2013 | Piran et al. | |
| D681,653 S | 5/2013 | Bitran et al. | |
| D681,660 S | 5/2013 | Matas | |
| D684,164 S | 6/2013 | Friedlander et al. | |
| D686,221 S | 7/2013 | Brinda et al. | |
| D689,892 S | 9/2013 | Perry et al. | |
| D689,895 S | 9/2013 | DeLuca | |
| D692,450 S | 10/2013 | Convay et al. | |
| D694,255 S | 11/2013 | Jones, Jr. | |
| 8,589,374 B2 | 11/2013 | Chaudhri | |
| 8,615,511 B2 | 12/2013 | Jones | |
| D697,940 S | 1/2014 | Bitran et al. | |
| 8,665,375 B2 | 3/2014 | Moore et al. | |
| D702,704 S | 4/2014 | Santos et al. | |
| D708,197 S | 7/2014 | Pasceri et al. | |
| D708,204 S | 7/2014 | Pasceri et al. | |
| D714,334 S | 9/2014 | Cojuangco et al. | |
| 8,830,193 B2 | 9/2014 | Shah | |
| 8,843,239 B2 | 9/2014 | Mighdoll et al. | |
| D716,334 S | 10/2014 | Lee et al. | |
| D717,809 S | 11/2014 | Tsuru et al. | |
| D717,823 S | 11/2014 | Brotman et al. | |
| 8,917,274 B2 | 12/2014 | Ma et al. | |
| D720,765 S | 1/2015 | Xie et al. | |
| D720,766 S | 1/2015 | Mandal et al. | |
| D721,382 S | 1/2015 | Brinda | |
| D723,576 S | 3/2015 | Jones | |
| D724,603 S | 3/2015 | Williams et al. | |
| D725,666 S | 3/2015 | Tseng et al. | |
| 8,984,436 B1 | 3/2015 | Tseng et al. | |
| D726,735 S | 4/2015 | Asai | |
| D736,223 S | 8/2015 | Park | |
| D736,792 S | 8/2015 | Brinda et al. | |
| D737,278 S | 8/2015 | Shin et al. | |
| D737,283 S | 8/2015 | Scalisi | |
| D739,864 S | 9/2015 | Kang | |
| D740,300 S | 10/2015 | Lee et al. | |
| 9,170,707 B1 | 10/2015 | Laska et al. | |
| D745,527 S | 12/2015 | Wang | |
| D746,828 S | 1/2016 | Arai et al. | |
| D746,849 S | 1/2016 | Anzures et al. | |
| D747,333 S | 1/2016 | Supino et al. | |
| D748,666 S | 2/2016 | Heeter et al. | |
| D749,620 S | 2/2016 | Jones | |
| D751,090 S | 3/2016 | Hu et al. | |
| D752,061 S | 3/2016 | Ahn et al. | |
| D752,072 S | 3/2016 | Song | |
| D753,132 S | 4/2016 | Cuthbert et al. | |
| D753,151 S | 4/2016 | Lee et al. | |
| D753,703 S | 4/2016 | Villamor et al. | |
| D753,708 S | 4/2016 | Yang et al. | |
| D754,713 S | 4/2016 | Zhang et al. | |
| D754,714 S | 4/2016 | Zhang et al. | |
| D756,379 S | 5/2016 | Apodaca et al. | |
| D756,401 S | 5/2016 | Soldner et al. | |
| D757,090 S | 5/2016 | Myung | |
| D757,747 S | 5/2016 | Butcher et al. | |
| D757,784 S | 5/2016 | Lee et al. | |
| D758,386 S | 6/2016 | Zhang | |
| D758,422 S | 6/2016 | Zhao | |
| D759,688 S | 6/2016 | Wu | |
| 9,361,011 B1 | 6/2016 | Burns et al. | |
| D760,769 S | 7/2016 | Ishii et al. | |
| D761,277 S | 7/2016 | Harvell | |
| 9,386,230 B1 | 7/2016 | Duran et al. | |
| D763,271 S | 8/2016 | Everette et al. | |
| D763,306 S | 8/2016 | Lee et al. | |
| D763,869 S | 8/2016 | Wang et al. | |
| D763,888 S | 8/2016 | Patel | |
| D765,674 S | 9/2016 | Kim | |
| D765,678 S | 9/2016 | Goux | |
| D768,687 S | 10/2016 | Bae et al. | |
| D769,897 S | 10/2016 | Li | |
| D769,930 S | 10/2016 | Agrawal | |
| 9,471,452 B2 | 10/2016 | McElhinney et al. | |
| D771,645 S | 11/2016 | Jewitt et al. | |
| D772,257 S | 11/2016 | Furutani et al. | |
| D772,894 S | 11/2016 | Zhao et al. | |
| D775,658 S | 1/2017 | Luo et al. | |
| D776,126 S | 1/2017 | Lai et al. | |
| D776,680 S | 1/2017 | Bae et al. | |
| D776,690 S | 1/2017 | Tsujimoto et al. | |
| D776,702 S | 1/2017 | Huang et al. | |
| 9,619,984 B2 | 4/2017 | Donovan et al. | |
| 9,838,602 B2 | 12/2017 | Duran et al. | |
| 2002/0116120 A1 | 8/2002 | Ruiz et al. | |
| 2004/0113770 A1* | 6/2004 | Falk | G08B 13/19645 340/531 |
| 2004/0260427 A1* | 12/2004 | Wimsatt | G05B 15/02 700/275 |
| 2008/0174570 A1 | 7/2008 | Jobs et al. | |
| 2008/0263468 A1 | 10/2008 | Cappione et al. | |
| 2009/0002157 A1 | 1/2009 | Donovan et al. | |
| 2009/0002492 A1 | 1/2009 | Velipasalar et al. | |
| 2009/0075694 A1 | 3/2009 | Kim et al. | |
| 2009/0164439 A1 | 6/2009 | Nevins | |
| 2009/0178007 A1 | 7/2009 | Matas et al. | |
| 2009/0220206 A1 | 9/2009 | Kisliakov | |
| 2009/0288011 A1 | 11/2009 | Piran et al. | |
| 2010/0131457 A1 | 5/2010 | Heimendinger | |
| 2010/0321183 A1 | 12/2010 | Donovan et al. | |
| 2011/0040760 A1 | 2/2011 | Fleishman et al. | |
| 2011/0185269 A1 | 7/2011 | Finkelstein et al. | |
| 2011/0316697 A1 | 12/2011 | Krahnstoever et al. | |
| 2012/0066608 A1* | 3/2012 | Sundermeyer | G08B 25/003 715/738 |
| 2012/0130513 A1* | 5/2012 | Hao | G05B 15/02 700/90 |
| 2013/0016122 A1 | 1/2013 | Bhatt | |
| 2013/0067365 A1 | 3/2013 | Shrufi et al. | |
| 2013/0072308 A1 | 3/2013 | Peck et al. | |
| 2013/0091432 A1 | 4/2013 | Shet et al. | |
| 2013/0129307 A1 | 5/2013 | Choe | |
| 2013/0132908 A1 | 5/2013 | Lee et al. | |
| 2013/0145270 A1 | 6/2013 | Piran et al. | |
| 2013/0179836 A1 | 7/2013 | Han et al. | |
| 2013/0185150 A1 | 7/2013 | Crum | |
| 2013/0211783 A1 | 8/2013 | Fisher et al. | |
| 2013/0263034 A1 | 10/2013 | Bruck et al. | |

(56) References Cited

U.S. PATENT DOCUMENTS

| | | | |
|---|---|---|---|
| 2013/0311909 | A1 | 11/2013 | Howard et al. |
| 2013/0325332 | A1 | 12/2013 | Rhee et al. |
| 2013/0328997 | A1 | 12/2013 | Desai |
| 2013/0332886 | A1 | 12/2013 | Cranfill et al. |
| 2014/0012574 | A1 | 1/2014 | Pasupalak et al. |
| 2014/0013243 | A1 | 1/2014 | Flynn, III et al. |
| 2014/0026061 | A1 | 1/2014 | Kim et al. |
| 2014/0033071 | A1 | 1/2014 | Gruber et al. |
| 2014/0043485 | A1 | 2/2014 | Bateman et al. |
| 2014/0064738 | A1 | 3/2014 | Chen et al. |
| 2014/0098247 | A1 | 4/2014 | Rao et al. |
| 2014/0189518 | A1 | 7/2014 | Kim et al. |
| 2014/0189586 | A1 | 7/2014 | Waldman et al. |
| 2014/0218517 | A1 | 8/2014 | Kim et al. |
| 2014/0222424 | A1 | 8/2014 | Hartford et al. |
| 2014/0232873 | A1 | 8/2014 | Meganathan |
| 2014/0277795 | A1 | 9/2014 | Matsuoka et al. |
| 2014/0313377 | A1 | 10/2014 | Hampton |
| 2015/0023650 | A1 | 1/2015 | Austin et al. |
| 2015/0058709 | A1 | 2/2015 | Zaletel |
| 2015/0143239 | A1 | 5/2015 | Birkbeck et al. |
| 2015/0173846 | A1 | 6/2015 | Schneider et al. |
| 2015/0193127 | A1* | 7/2015 | Chai ............... G08B 13/19645 715/719 |
| 2015/0227196 | A1 | 8/2015 | Fujii et al. |
| 2015/0242404 | A1 | 8/2015 | Underwood, IV et al. |
| 2015/0248275 | A1 | 9/2015 | Gallo et al. |
| 2015/0269643 | A1 | 9/2015 | Riley et al. |
| 2015/0310280 | A1 | 10/2015 | Bentley et al. |
| 2016/0004390 | A1 | 1/2016 | Laska et al. |
| 2016/0034574 | A1 | 2/2016 | Kang |
| 2016/0041724 | A1 | 2/2016 | Kirkby et al. |
| 2016/0110064 | A1 | 4/2016 | Shapira |
| 2016/0139671 | A1 | 5/2016 | Jun et al. |
| 2016/0139747 | A1 | 5/2016 | Kocienda et al. |
| 2016/0155315 | A1* | 6/2016 | McElhinney ....... G06F 11/0751 340/502 |
| 2016/0364114 | A1 | 12/2016 | Von Dehsen et al. |
| 2017/0089739 | A1 | 3/2017 | Gallo et al. |
| 2017/0126975 | A1 | 5/2017 | Duran et al. |
| 2017/0207949 | A1 | 7/2017 | Donovan et al. |
| 2018/0018081 | A1 | 1/2018 | Dattilo-Green et al. |
| 2018/0019889 | A1 | 1/2018 | Burns et al. |
| 2018/0048819 | A1 | 2/2018 | Duran et al. |
| 2018/0144615 | A1 | 5/2018 | Kinney et al. |

OTHER PUBLICATIONS

TechBitar, Bluetooth-conrolled Pan/Tilt Servo Platform Using Android as Remote, downloaded Jul. 15, 2015, 9 pgs, www.techbitar.com/bluetooth-controlled-pan-tilt-servo.html.

EyeSpyFX, Viewer for D-Link Cams, IOS Version 3.1.2, 2013, 19 pgs, www.eyespyfx.com/dlink.php.

Netgear, Home Security Systems / Security Cameras / Arlo, downloaded Jul. 15, 2015, 6 pgs, arlo.com/en-us.

CNET, Netgear Arlo Smart Home Security review, downloaded Jul. 15, 2015, 5 pgs, www.cnet.com/products/netgear-arlo-smart-home-security-kit.

Arlo on the App Store on iTunes, downloaded Jul. 15, 2015, 2 pgs, itunes.apple.com/us/app/arlo/id925911312?mt=8.

AppCrawlr, ipCam FC—IP camera surveillance (ios), downloaded Jul. 15, 2015, 2 pgs, apperawlr.com/ios/ipcam-fc-ip-camera-surveillance.

Siml, ipCamFC—IP camera surveillance, downloaded Jul. 15, 2015, 2 pgs, itunes.apple.com/us/app/ipcam-fc-ip-camera-surveillance/id548480721?mt=8.

D-Link Corporation, mydlink Lite, downloaded Jul. 15, 2015, 2 pgs, itunes.apple.com/us/app/mydlink-lite/id372571229?mt=8.

D-Link Corporation, mydlink+, downloaded Jul. 15, 2015, 2 pgs, itunes.apple.com/us/app/mydlink/id479832296?mt=8.

D-Link Corporation, mydlink App, downloaded Jul. 15, 2015, 4 pgs, www.mydlink.com/apps.

Wollerton, Turn your old iPod into a security camera for free, CNET, Dec. 17, 2014, 5 pgs, www.cnet.com/how-to/turn-your-old-ipod-into-a-security-camera-for-free.

Features > Button Bars, posted at webbookbinder.com, May 8, 2011, [site visited Sep. 13, 2016]. Available from Internet: <http://www.webbookbinder.com/Website/020New/buttonbars.asp>.

Stock Vector—Web Site Interface Icons // Button Bar Series, posted at alamy.com, Aug. 2, 2010, [site visited Sep. 13, 2016]. Available from Internet: <http://www.alamy.com/stock-photo-web-site-interface-icons-button-bar-series-64003090.html>.

Visavadia, Jay, "i0S7 Wireframe", posted at dribble.com, Dec. 19, 2013, [site visited Sep. 14, 2016]. Available from Internet: <https://dribble.com/shots/1352315-i057-Wireframe>.

Holly, Russell, "Nest Aware, and why the Nest Cam subscription makes sense", posted at androidcentral.com, Jul. 3, 2015, [site visited Sep. 30, 2016]. Available from Internet: <http://www.androidcentral.com/nest-aware-and-why-nest-cam-subscription-makes-sense>.

Ahmed, Nafees, "5 Best Video Editing Apps for Android Devices", posted at techbuzzes.com, Mar. 23, 2013, (site visited Jun. 3, 2016), Available from Internet: http://techbuzzes.com/2013/03/best-video-editing-apps-for-android.

Nunal, Paul, "Best Android apps for videographers and video editors", posted at androidauthority.com, May 3, 2012, (site visited Jun. 3, 2016), Available from Internet: http://www.androidauthority.com/best-android-apps-videograhers-video-videography-80338.

Fitzer, Michael, "Editing Effects Software to Make Your Video Sing", posted at videomaker.com, May 3, 2012, (site visited Jun. 3, 2016) Available from Internet: https://www.videomaker.com/article/c3/15366-editing-effects-software-to-make-your-video-sing).

"Dropcam", posted at play.google.com, Aug. 20, 2015, [site visited Jan. 17, 2017]. Available from Internet: <https://play.google.com/store/apps/details?id=com.dropcam.android>.

"Foto de archivo", posted at es.123rf.com, Apr. 23, 2015, [site visited Jan. 17, 2017]. Available from Internet: <http://es.123rf.com/photo_37507296_diseno-transparente-plantilla-de-interfaz-de-usuario-movil-disposicion-para-el-movil-o-pagina-web-il.html>.

Hoang, Le, "YouTube: How to Find Previously Watched Videos", posted at tech-recipes.com, Feb. 15, 2011, [site visited Jan. 17, 2017]. Available from Internet: <http://www.tech-recipes.com/rx/11104/youtube-how-to-find-all-the-previously-watched-videos>.

"Wireframe toolkit for Keynote and Powerpoint", posted at raizlabs.com, Jun. 29, 2011, [site visited Jan. 17, 2017]. Available from Internet: <https://www.raizlabs.com/blog/2011/06/wireframe-toolkit-for-keynote-and-powerpoint>.

Vector Video Player, posted at shutterstock.com, Aug. 21, 2014, [site visited Mar. 17, 2017]. Available from Internet: <https://www.shutterstock.com/fr/image-vector/vector-audio-video-player-web-101573365>.

"Mini UI toolkit PSD Download", posted at freepsds123.com, Jun. 21, 2014, [site visited Mar. 17, 2017]. Available from Internet: <http://www.freepsds123.com/2014/06/21/mini-u i-toolkit-psd-down load>.

"Octopussy (1983)—Cancelled" posted at mi6-hq.com, Oct. 2, 2014, [site visited Mar. 17, 2017]. Available from Internet: <https://www.mi6-hq.com/sections/games/octopussy_I 983>.

* cited by examiner

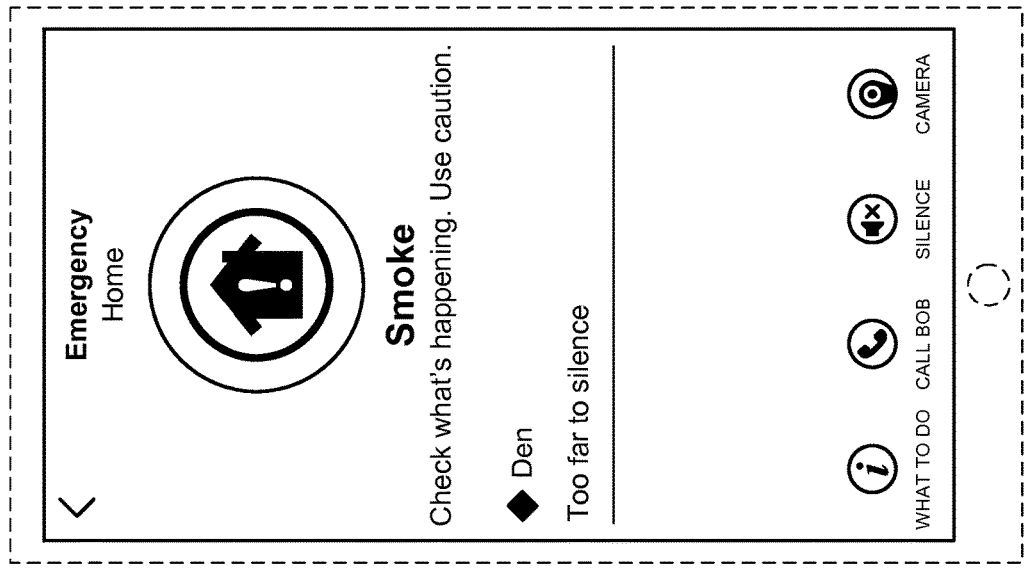

1200

┌─────────────────────────────────────────────────────────────────┐
│ Identify a current environment status of a plurality of environment statuses
│ for a smart home environment. The smart home environment includes one — 1202
│ or more electronic devices associated with a computing device.
│
│  ┌──────────────────────────────────────────────────────────┐
│  │ Each of the plurality of environment statuses for the smart home
│  │ environment corresponds to a respective alert level of a predefined — 1204
│  │ range of alert levels
│  │
│  │  ┌────────────────────────────────────────────────────┐
│  │  │ The current environment status is a first environment status of
│  │  │ the plurality of environment statuses and corresponds to a first — 1206
│  │  │ alert level of the predefined range of alert levels
│  │  └────────────────────────────────────────────────────┘
│  │
│  │  ┌────────────────────────────────────────────────────┐
│  │  │ The current environment status is a second environment status
│  │  │ of the plurality of environment statuses and corresponds to a
│  │  │ second alert level of the predefined range of alert levels that is — 1208
│  │  │ higher than the first alert level
│  │  │
│  │  │  ┌──────────────────────────────────────────────┐
│  │  │  │ A first one of the one or more electronic devices is a hazard
│  │  │  │ detector device, and the second environment status — 1210
│  │  │  │ corresponds to the detection of smoke levels satisfying a
│  │  │  │ first predefined smoke threshold.
│  │  │  └──────────────────────────────────────────────┘
│  │  │
│  │  │  ┌──────────────────────────────────────────────┐
│  │  │  │ A first one of the one or more electronic devices is a
│  │  │  │ camera device, and the second environment status — 1212
│  │  │  │ corresponds to the detection of motion in a predefined
│  │  │  │ region monitored by the camera device
│  │  │  └──────────────────────────────────────────────┘
│  │  └────────────────────────────────────────────────────┘
│  └──────────────────────────────────────────────────────────┘
│                              (A)
└─────────────────────────────────────────────────────────────────┘

Figure 12A

SYSTEMS AND METHODS FOR SMART HOME AUTOMATION USING A MULTIFUNCTION STATUS AND ENTRY POINT ICON

RELATED APPLICATIONS

This application is related to U.S. patent application Ser. No. 14/738,930, filed Jun. 14, 2015, entitled "Methods and Systems for Presenting Multiple Live Video Feeds in a User Interface," which is hereby incorporated by reference in its entirety.

TECHNICAL FIELD

This relates generally to device control in a smart device environment, including but not limited to methods and systems for determining a feature set that includes selectable commands for performing device functions in a smart device environment.

BACKGROUND

Smart devices and their use in enhancing and creating new technical capabilities for everyday tasks have increased dramatically. Given that many smart device environments typically contain multiple devices, and devices of many different types, users often struggle to manage smart device environments in an efficient manner, as most devices require proprietary control mechanisms for device configuration and manipulation. Consequently, there has been a growing need for consolidated control and management of smart device environments and the devices within them.

SUMMARY

Accordingly, there is a need for methods, systems, and interfaces for identifying a current environment status for a smart home environment and determining, based on the current environment status, a corresponding feature set for interacting with the smart home environment. By continually tracking and identifying a current environment status of a smart home environment, users are provided with targeted and meaningful command options for interacting with devices in the smart home environment based on a current condition or state of the smart home environment.

In accordance with some implementations, a method is performed at a computing device having one or more processors and memory storing instructions for execution by the one or more processors, wherein the computing device is associated with one or more electronic devices in a smart home environment, the smart home environment having a plurality of environment statuses. The method includes identifying a current environment status of the plurality of environment statuses for the smart home environment. Based on the current environment status of the smart home environment, one of a plurality of different feature sets for a smart home application executable on the computing device for interacting with the smart home environment is determined, the determined feature set including selectable commands for performing device functions associated with the current environment status. The determined feature set is then provided to an instance of the smart home application, thereby enabling the instance to offer user interactions consistent with the selectable commands.

In accordance with some implementations, a computing device includes at least a processor and memory storing one or more programs for execution by the processor, the one or more programs including instructions for performing the operations of the method described above. In accordance with some implementations, a computer readable storage medium has stored therein one or more programs having instructions which, when executed by an electronic device having one or more processors, cause the electronic device to perform the operations of the method described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 12A-12F are flow diagrams illustrating a method of determining a set of features based on a current environment status, in accordance with some implementations.

Like reference numerals refer to corresponding parts throughout the several views of the drawings.

DESCRIPTION OF IMPLEMENTATIONS

Figure 1:
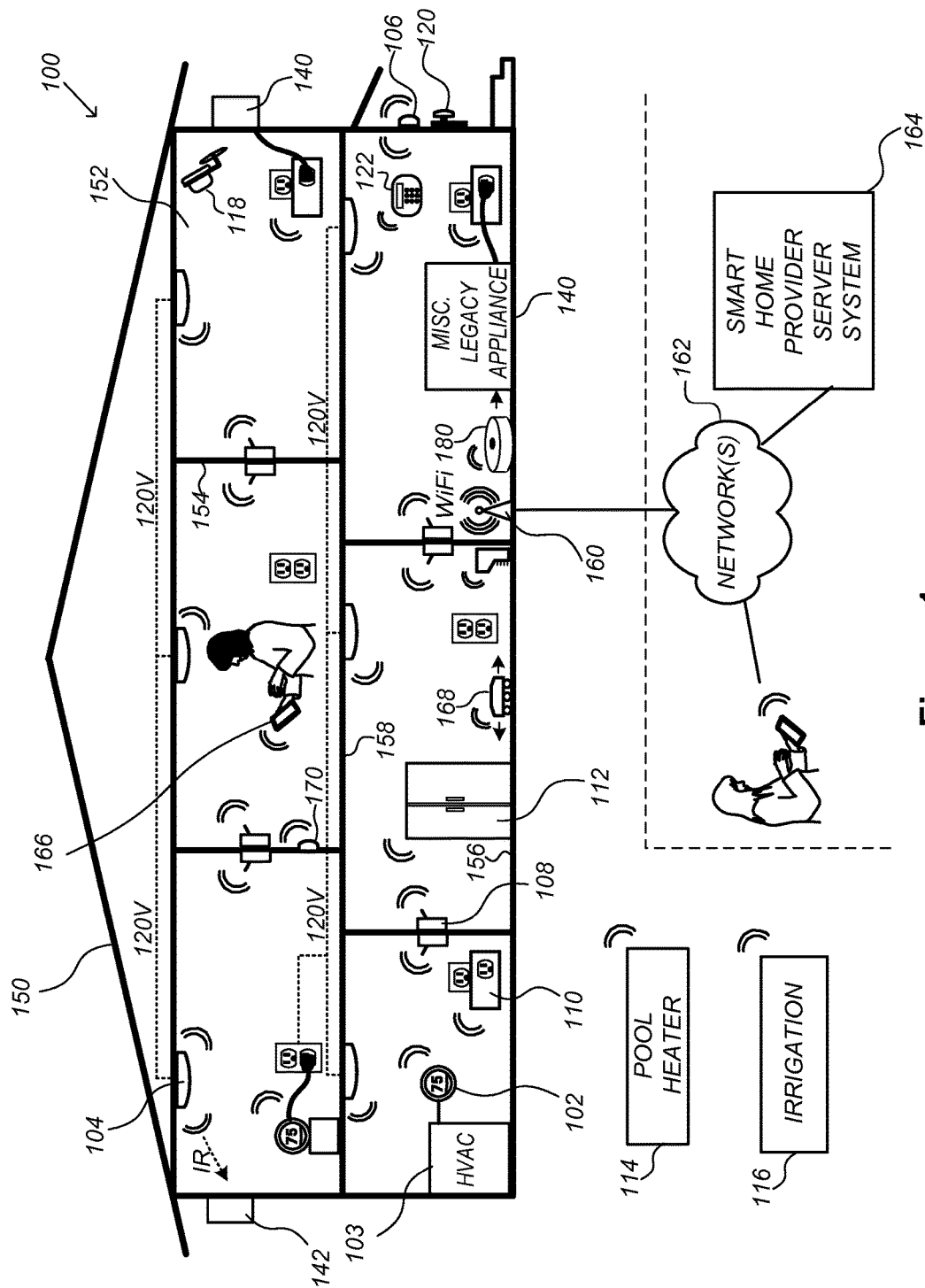
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first environment status could be termed a second environment status, and, similarly, a second environment status could be termed a first environment status, without departing from the scope of the various described implementations. The first environment status and the second environment status are both environment statuses, but they are not the same environment status.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output. In some implementations, smart hazard detectors 104 are configured to not only detect the presence of smoke, but also determine an amount of detected smoke (e.g., in parts per million). Furthermore, based on a determined amount of detected smoke, smart hazard detectors 104 may be further configured to determine whether one or more predefined smoke thresholds (corresponding to varying alert levels) are satisfied. In some implementations, smart hazard detectors 104 are configured to receive commands from other electronic devices (e.g., a client device 504), where the commands are executable by the smart hazard detectors 104 and cause the smart hazard detectors 104 to perform various device functions (e.g., silencing an audible alarm sounding in response to a hazard detection).

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
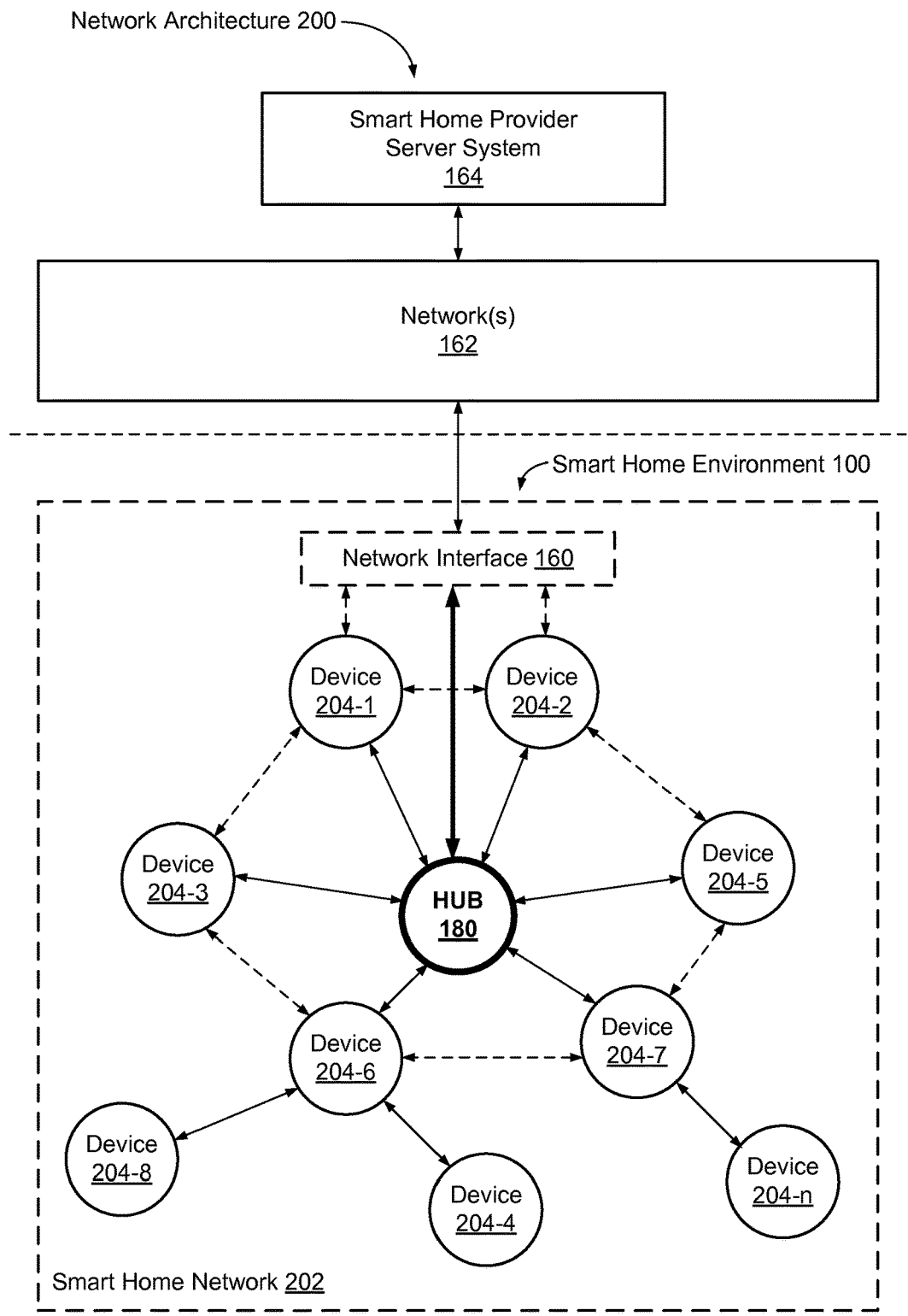
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
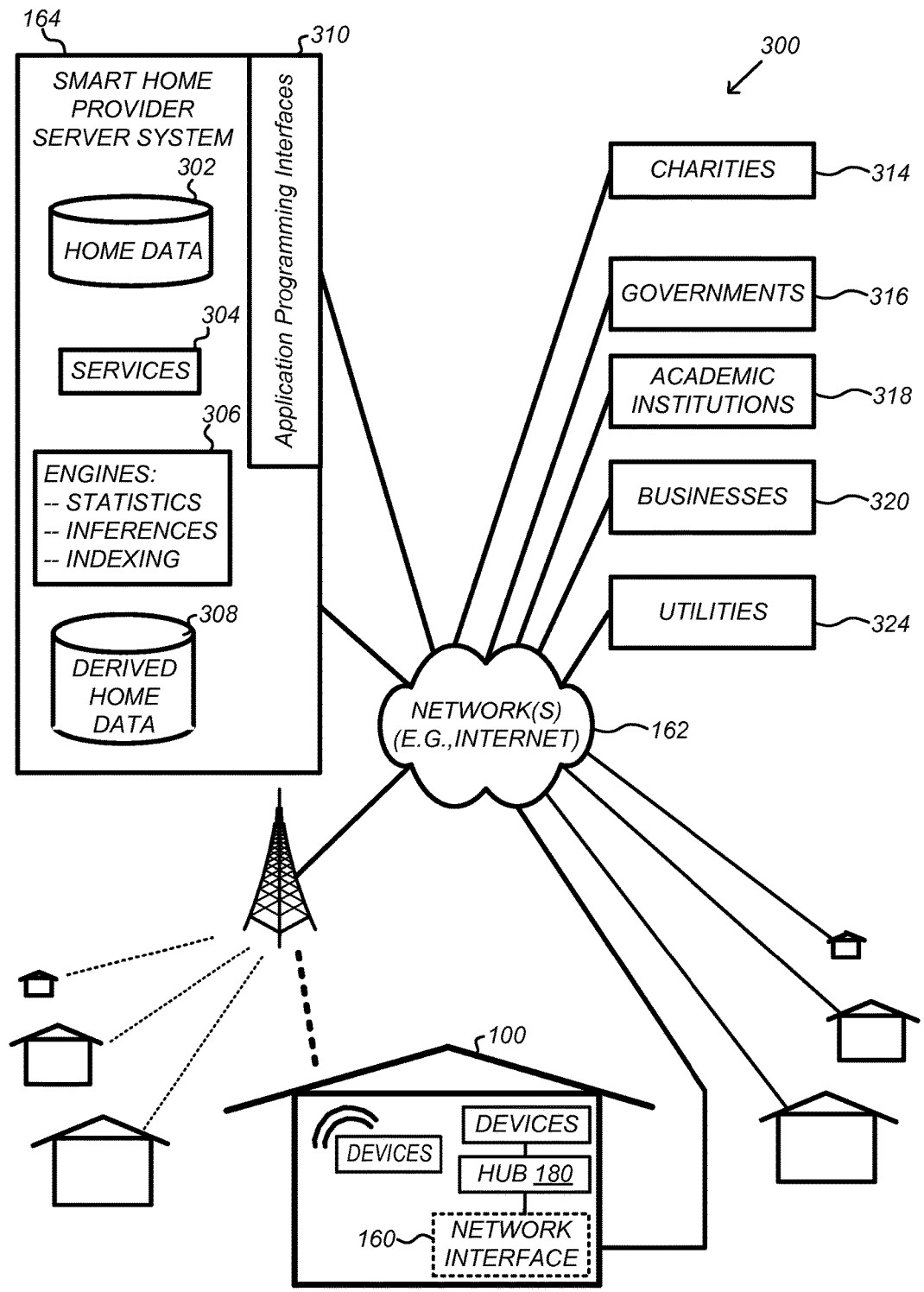
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
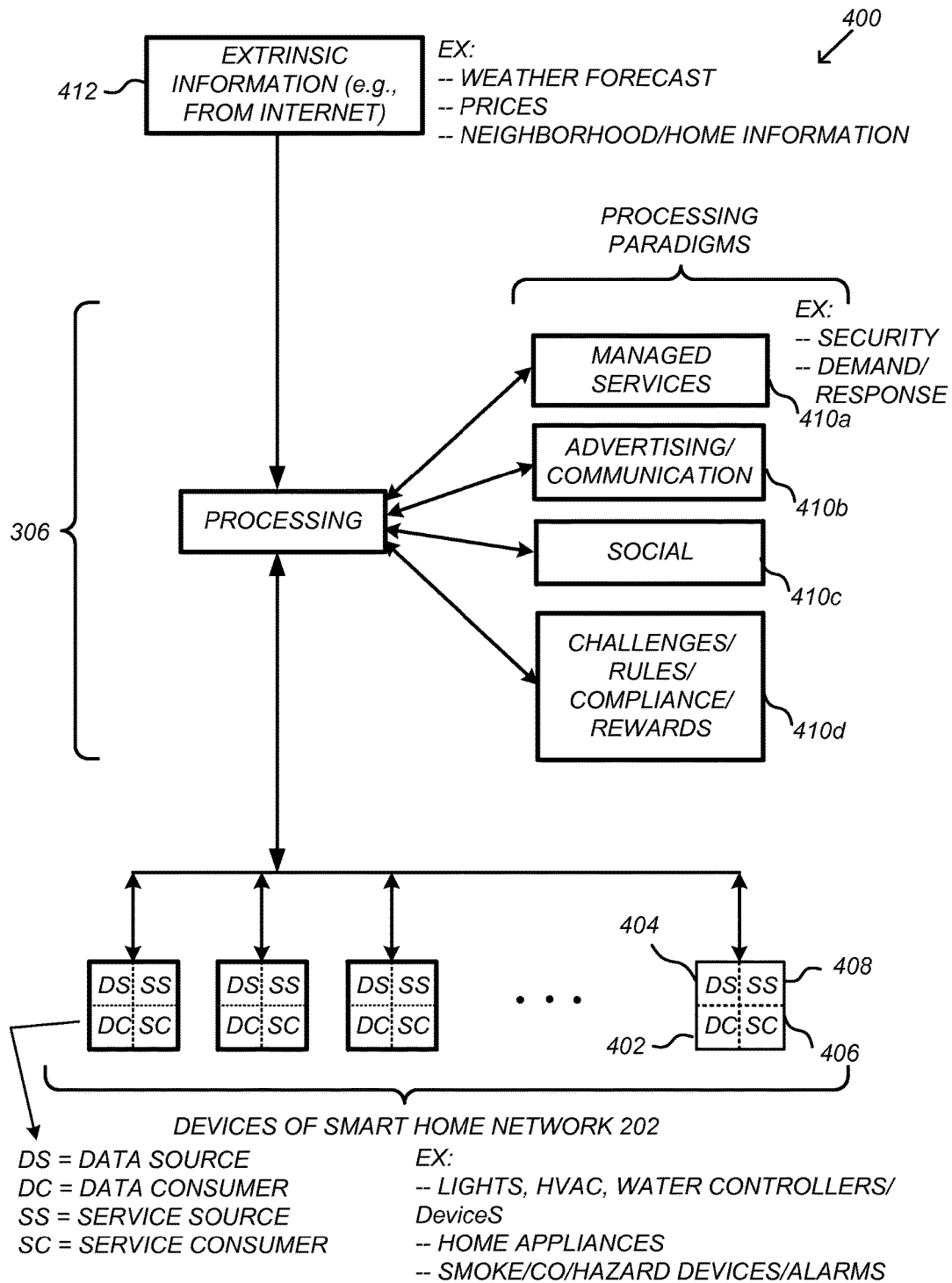
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
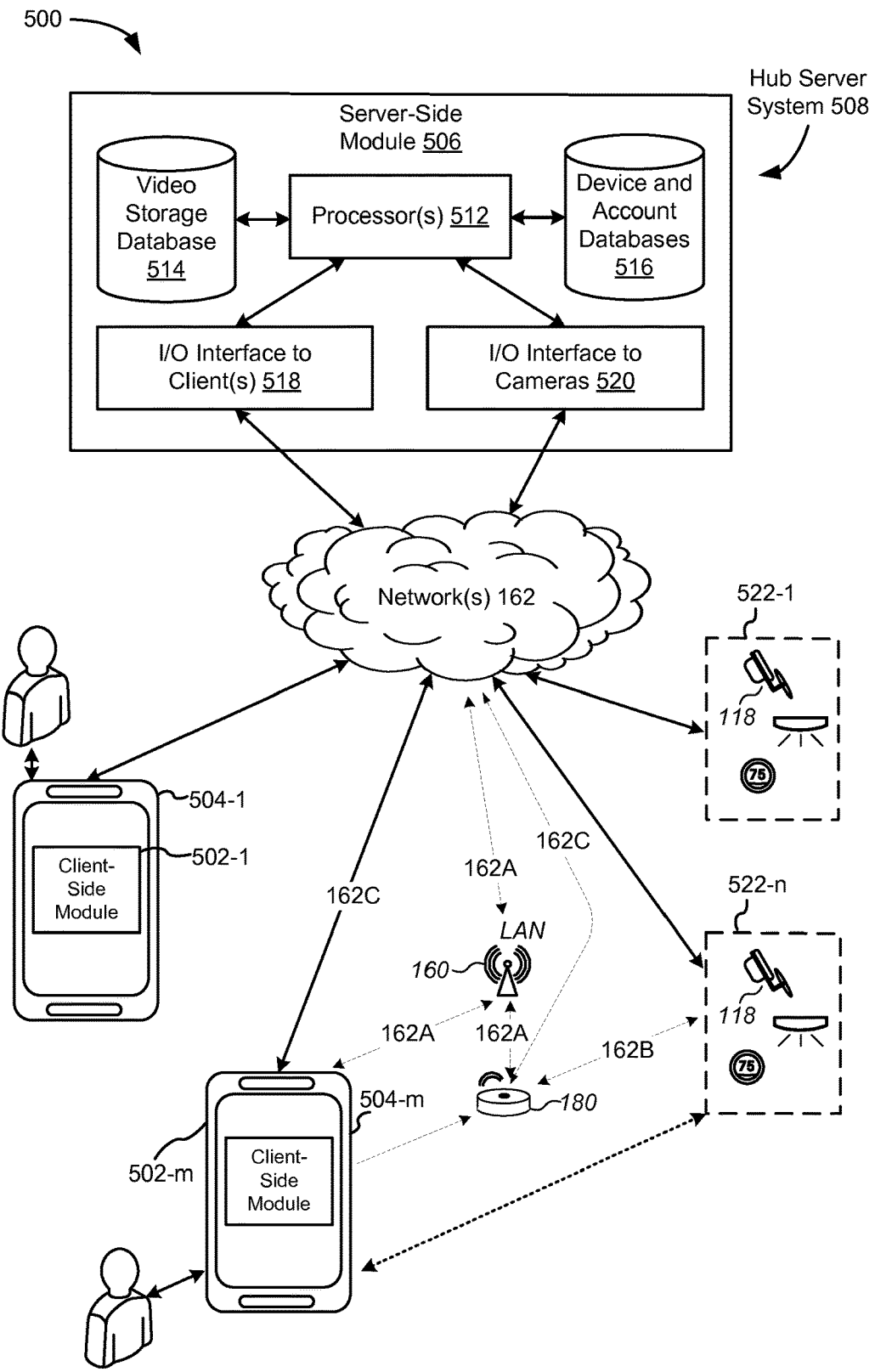
FIG. 5 is a representative operating environment in which a hub device server system interacts with client devices and hub devices communicatively coupled to local smart devices, in accordance with some implementations.

FIG. 5 illustrates a representative operating environment 500 in which a hub device server system 508 provides data processing for monitoring and facilitating review of motion events in video streams captured by video cameras 118. As shown in FIG. 5, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508. In some implementations, the hub device server system 508 is a dedicated video processing server that provides video processing services to video sources and client devices 504 independent of other services provided by the hub device server system 508.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally, performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

As shown in FIG. 5, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 without no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
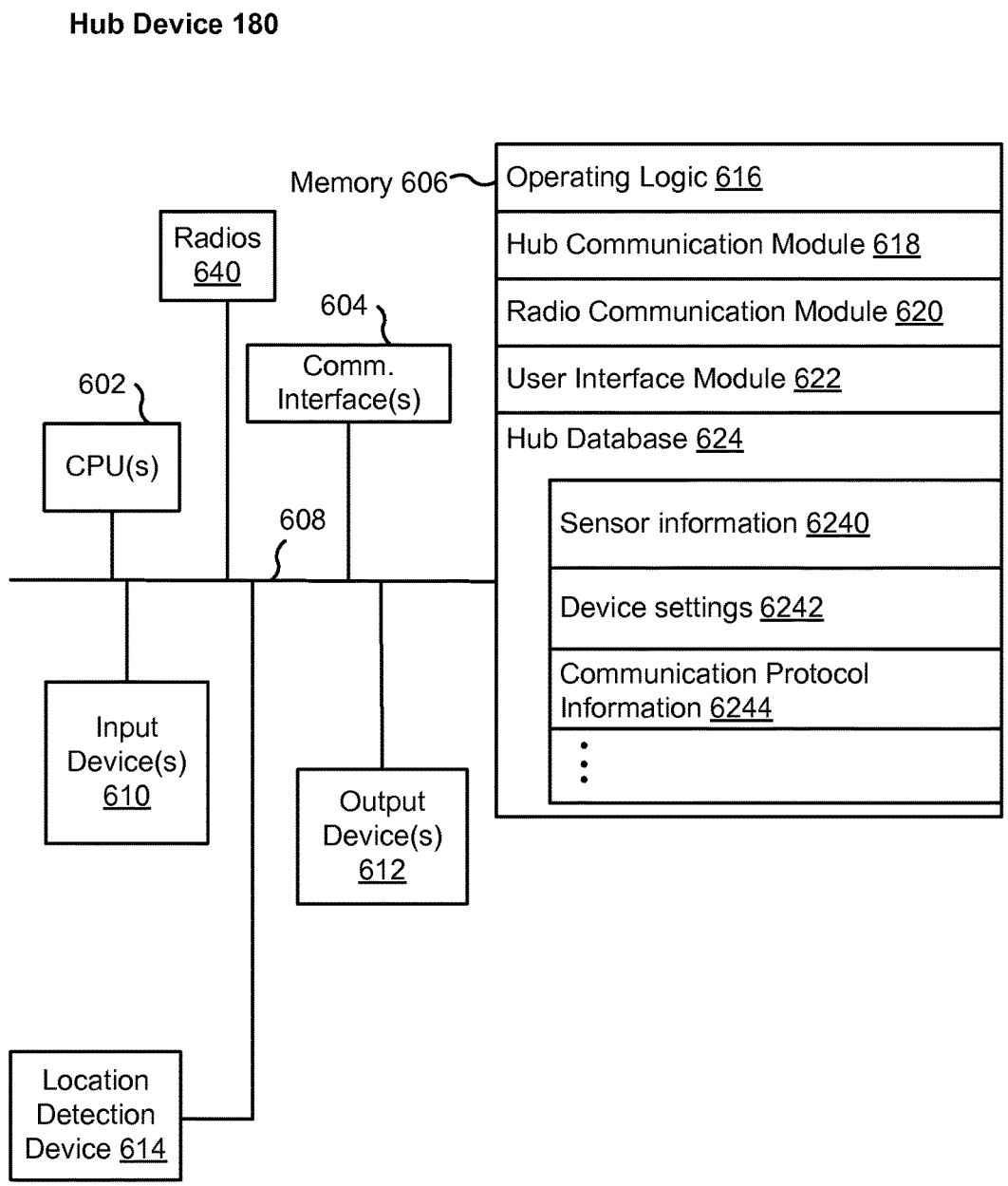
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:
- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
    - Sensor information 6240 for storing and managing data received, detected, and/or transmitted by one or more sensors of the hub device 180 and/or one or more other devices (e.g., smart devices 204 in smart home environment 100);
    - Device settings 6242 for storing operational settings for one or more devices (e.g., coupled smart devices 204 in smart home environment 100); and
    - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
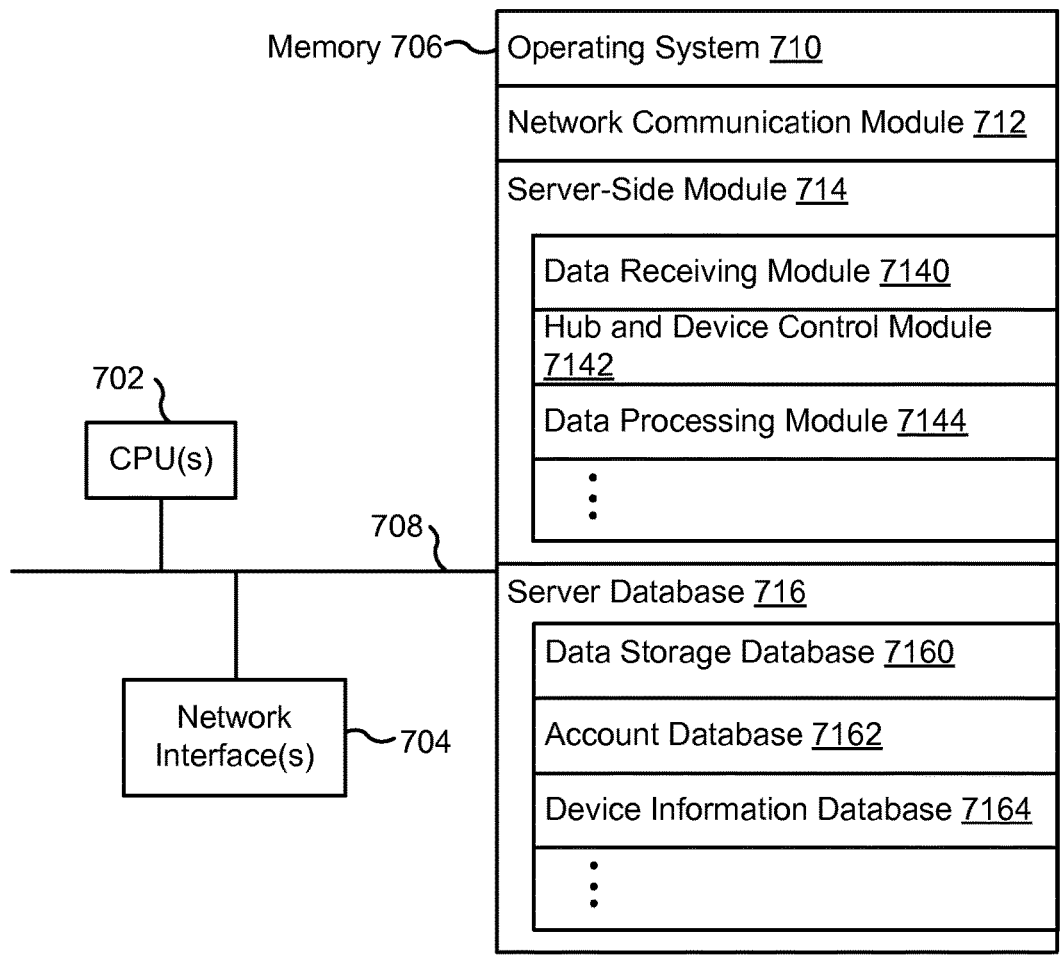
FIG. 7 is a block diagram illustrating a representative hub server system, in accordance with some implementations.

FIG. 7 is a block diagram illustrating the hub server system 508 in accordance with some implementations. The hub server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:
- Operating system 710 including procedures for handling various basic system services and for performing hardware dependent tasks;
- Network communication module 712 for connecting the hub server system 508 to other systems and devices (e.g., client devices, electronic devices, and systems connected to one or more networks 162, FIGS. 1-5) via one or more network interfaces 704 (wired or wireless);
- Server-side module 714, which provides server-side functionalities for device control, data processing and data review, including but not limited to:
    - Data receiving module 7140 for receiving data from electronic devices (e.g., video data from a camera 118, FIG. 1) via the hub device 180, and preparing the received data for further processing and storage in the data storage database 7160;
    - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
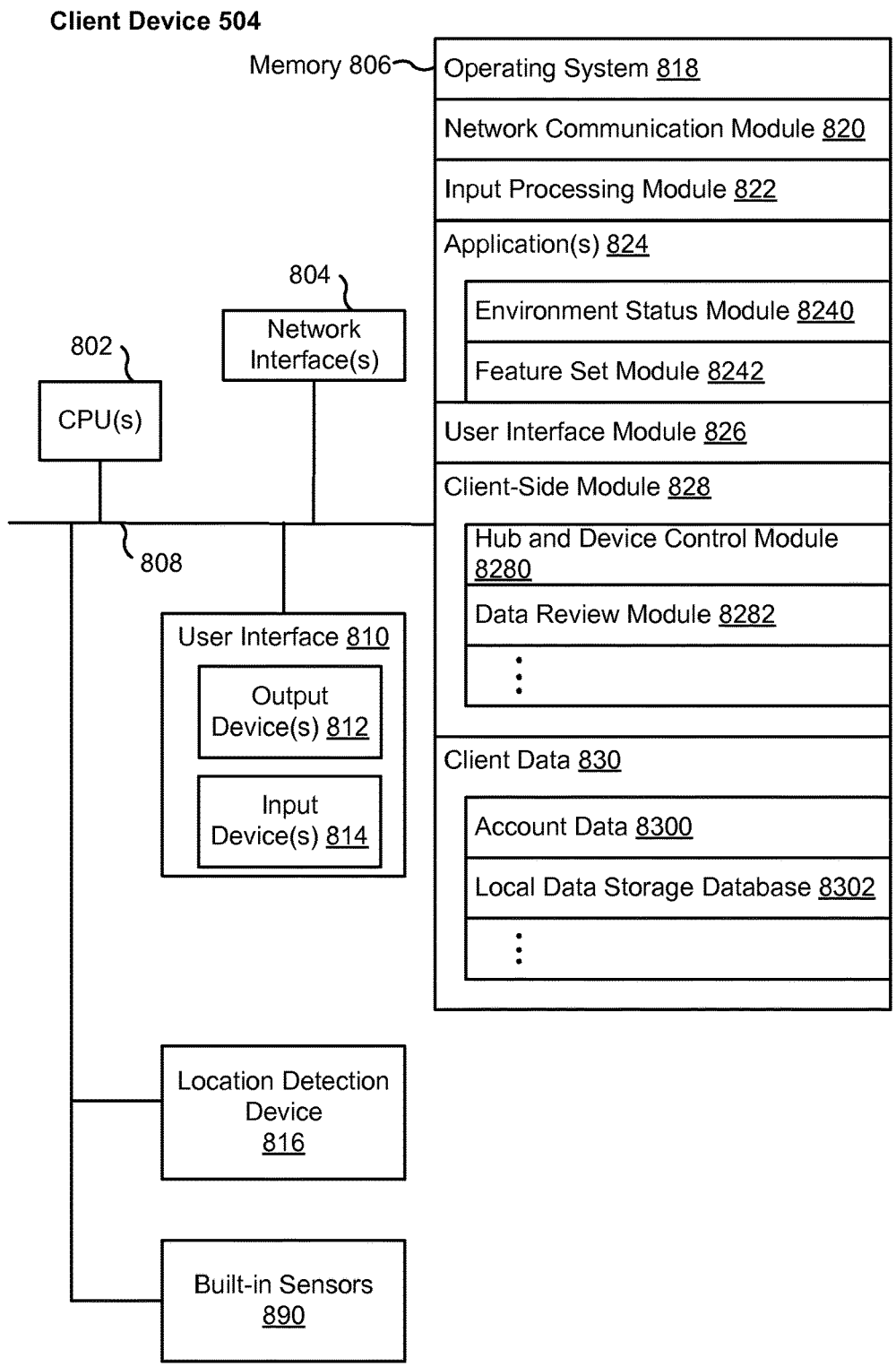
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., client devices, electronic devices, and systems connected to one or more networks 162, FIGS. 1-5) via one or more network interfaces 804 (wired or wireless);

Input processing module 822 for detecting one or more user inputs or interactions from one of the one or more input devices 814 and interpreting the detected input or interaction;

One or more applications 824 for execution by the client device (e.g., games, social network applications, smart home applications, and/or other web or non-web based applications) for controlling devices (e.g., sending commands, configuring settings, etc. to hub devices and/or other client or electronic devices within one or more environments) and for reviewing data captured by the devices (e.g., device status and settings, captured data, or other information regarding the hub device or other connected devices), including but not limited to:

Environment status module 8240 for identifying a current environment status of an environment (e.g., a smart home environment 100, FIG. 1); and Feature set module 8242 for determining a corresponding feature set based on a current environment status (e.g., set of selectable commands for performing device functions associated with the current environment status);

User interface module 622 for providing and displaying a user interface in which settings, captured data, and/or other data for one or more devices (e.g., smart devices 204 in smart home environment 100, including cameras, thermostats and/or hazard detectors) can be configured and/or viewed;

Client-side module 828, which provides client-side functionalities for device control, data processing and data review, including but not limited to:

Hub device and device control module 8280 for generating control commands for modifying an operating mode of the hub device or other electronic devices (e.g., of a smart home environment 100) in accordance with user inputs (e.g., detecting user inputs indicating selection of one or more commands for performing device functions of devices in a smart home environment 100, such as commands for silencing an alarm of a hazard detector 104, accessing a live video feed of a camera 118, etc.); and Data review module 8282 for providing user interfaces for reviewing data processed by the hub server system 508; and Client data 830 storing data associated with the user account and electronic devices, including, but is not limited to:

Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and Local data storage database 8302 for selectively storing raw or processed data associated with electronic devices (e.g., of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
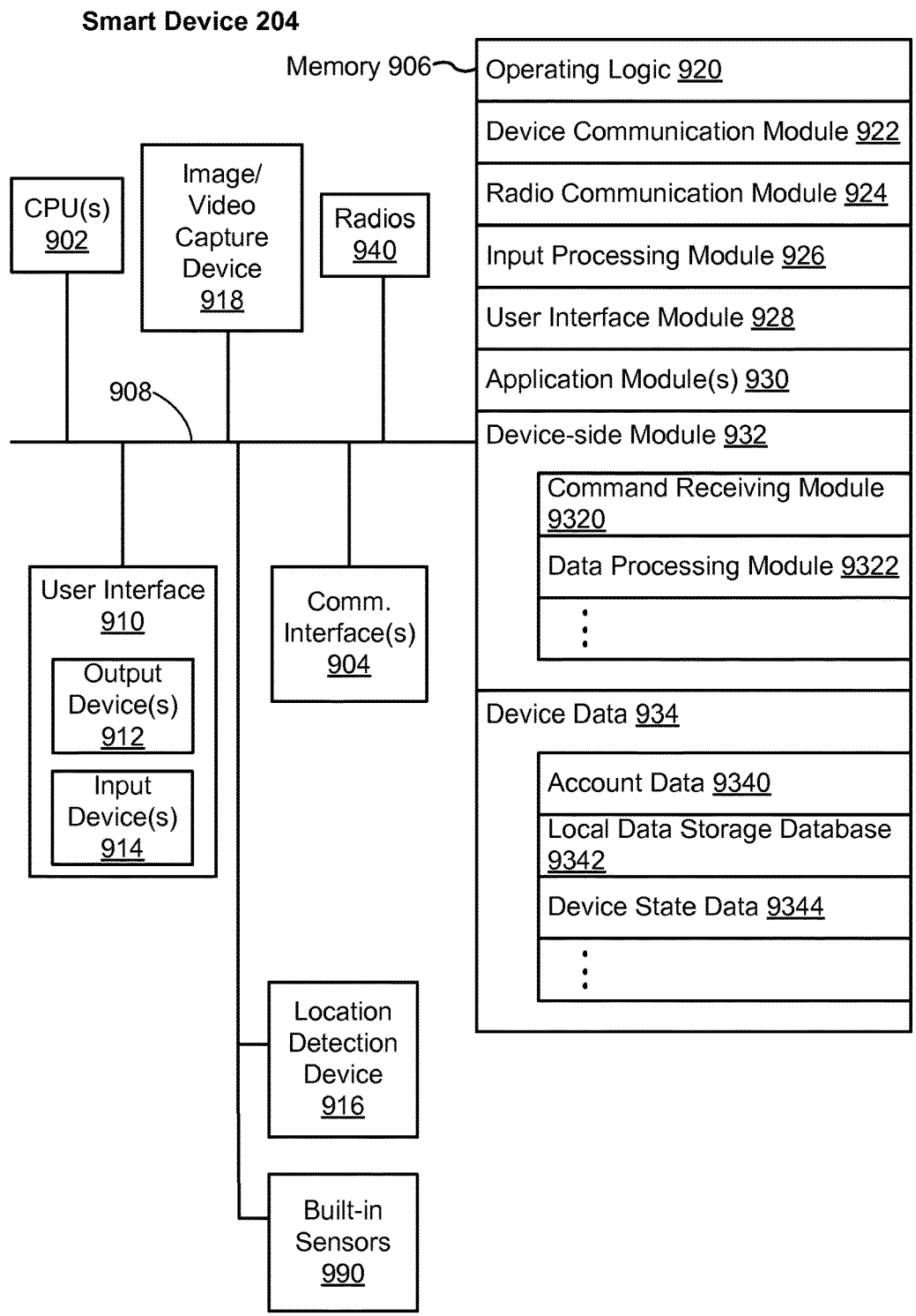
FIG. 9 is a block diagram illustrating a representative smart device, in accordance with some implementations.

FIG. 9 is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);

Radio Communication Module 924 for connecting the smart device 204 to other devices (e.g., controller devices, smart devices 204 in smart home environment 100, client devices 504) via one or more radio communication devices (e.g., radios 940)

Input processing module 926 for detecting one or more user inputs or interactions from the one or more input devices 914 and interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed;

One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204;

Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and Device data 934 storing data associated with devices (e.g., the smart device 204), including, but is not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc., Local data storage database 9342 for selectively storing raw or processed data associated with the smart device 204 (e.g., video surveillance footage captured by a camera 118); and Device state data 9344 storing previous and/or current device state information for the smart device 204 (e.g., for a hazard detector 104, includes detected hazard information, such as a timestamp, severity of the detected hazard, etc.; for a camera 118, includes detected motion information, such as a time, place, and/or type of detected motion).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 10:
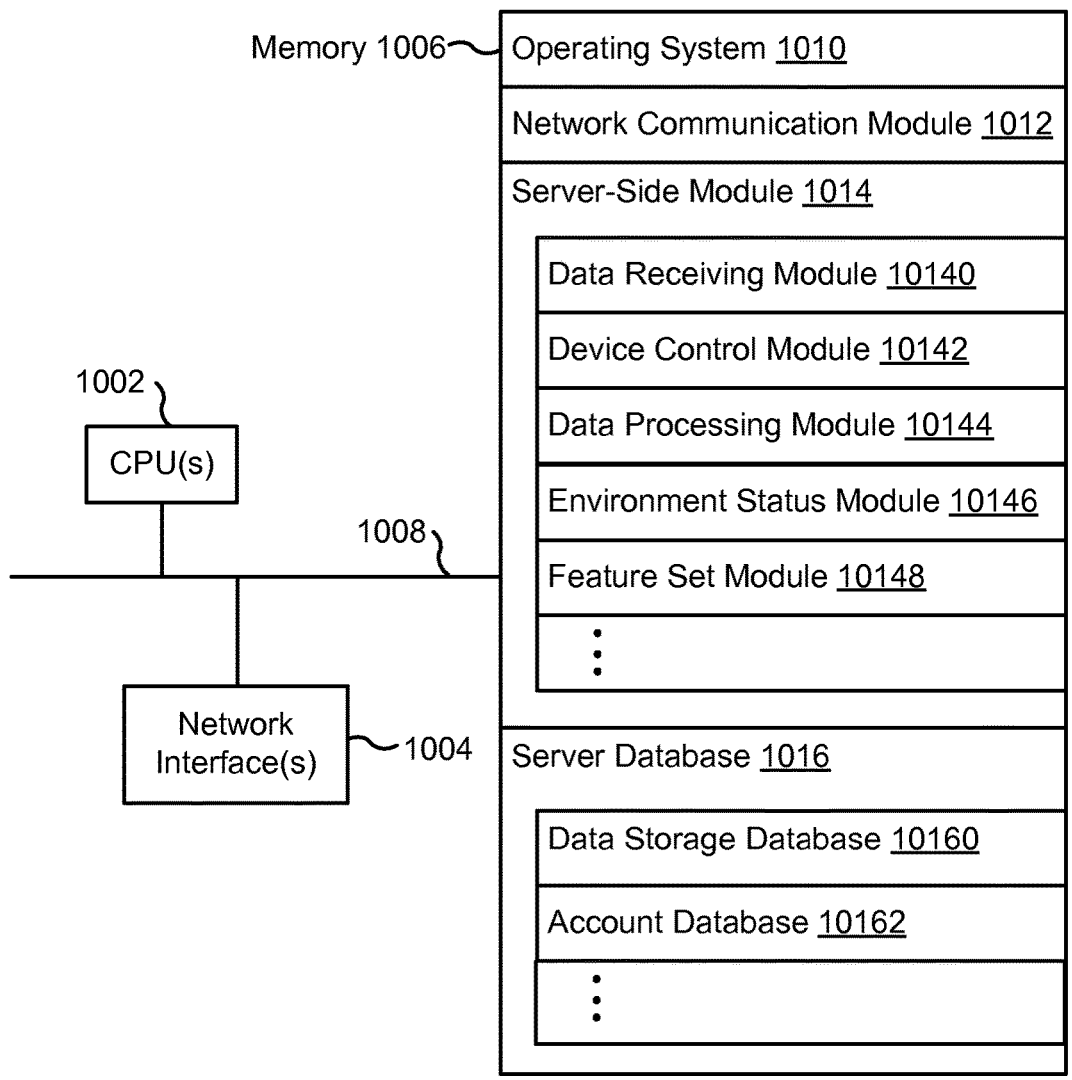
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, and systems connected to one or more networks 162, FIGS. 1-5) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user);

Environment status module 10146 for identifying a current environment status of an environment (e.g., a smart home environment 100, FIG. 1), and for providing an identified current environment status to one or more devices associated with the respective environment (e.g., transmitting an identified current environment status to a client device 504);

Feature set module 10148 for determining a corresponding feature set based on a current environment status (e.g., set of selectable commands for performing device functions associated with the current environment status), and for providing the determined feature set to one or more devices associated with the respective environment (e.g., transmitting the determined feature set to a client device 504 for selection by an associated user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub server system 508, client device 504, smart device 204, smart home provider server system 164, etc.) are interchangeable with one another and may be performed by any other devices or systems, where the corresponding sub-modules of these functions may additionally and/or alternatively be located within and executed by any of the devices and systems. As one example, the environment status module 10146 of the smart home provider server system 164 may be a sub-module of the memory 606 of the hub device 180. The devices and systems shown in and described with respect to FIGS. 6-10 are merely illustrative, and different configurations of the modules for implementing the functions described herein are possible in various implementations.

Attention is now directed towards implementations of graphical user interfaces ("GUIs") and associated processes that may be implemented on a computing device (e.g., the client device 504 in FIG. 8).

Figure 11A:
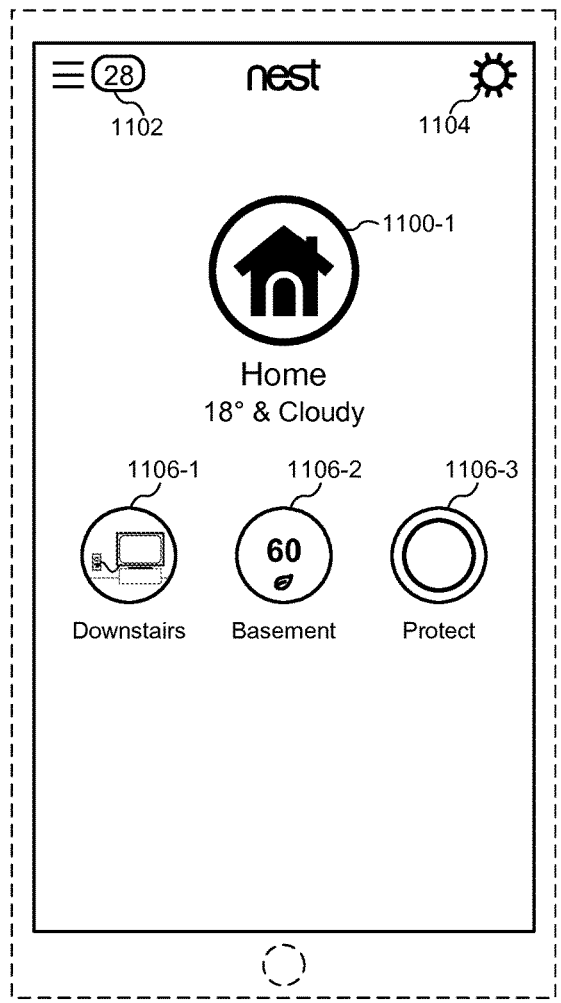
FIGS. 11A-11AW illustrate exemplary graphical user interfaces (GUIs) on a computing device for displaying environment statuses, displaying device states, and providing feature sets for interacting with a smart home environment, in accordance with some implementations.

FIGS. 11A-11AW illustrate exemplary GUIs on a computing device (e.g., client device 504) for displaying environment statuses, displaying device states, and providing feature sets for interacting with the smart home environment, in accordance with some implementations. The GUIs in these figures are used to illustrate the processes described below, including the method 1200. The GUIs may be provided by various applications (e.g., applications 824) executable on the computing device for interacting with a smart home environment 100 (e.g., FIG. 1), such as a web browser, a smart home application for controlling or managing one or more devices of a smart home environment, and/or a third-party application. While FIGS. 11A-11AW illustrate examples of GUIs, in other implementations, a GUI displays user-interface elements in arrangements, and in display areas with aspect ratios and dimensions, distinct from the implementations of FIGS. 11A-11AW.

Figure 11B:
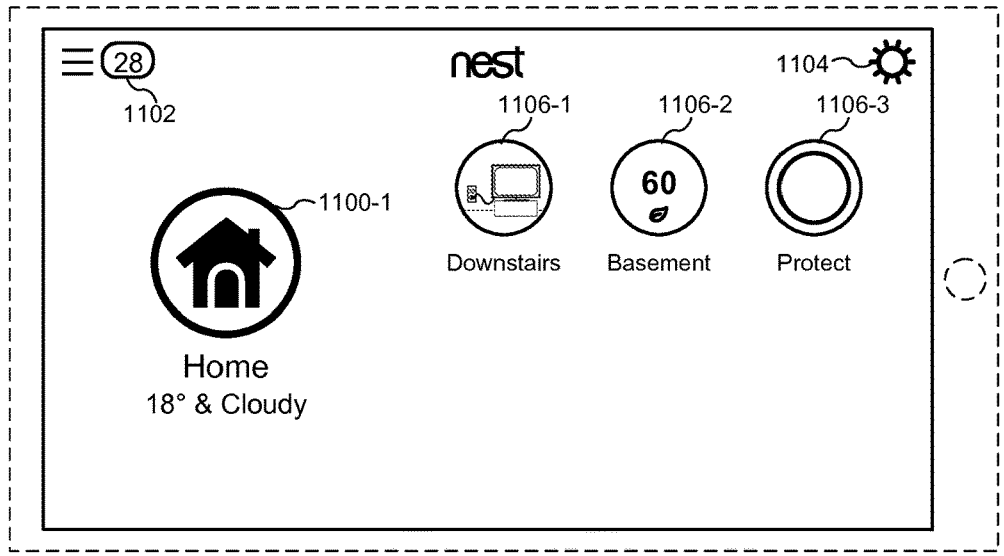

FIG. 11A illustrates a GUI (e.g., a "home screen" or "card") that includes an environment status graphic 1100-1, a profile affordance 1102, a configuration affordance 1104, and device state graphics 1106. The environment status graphic 1100-1 is represented by a corresponding visual mode that includes an icon (an optionally, an associated color for the ring encircling the icon, such as green) that indicates that the current environment status corresponding to a non-critical alert level (e.g., a first one of multiple environment statuses). The device state graphics 1106 represent respective device states of various devices (e.g., smart devices 204) in the smart home environment 100 (e.g., 1106-1 corresponding to a video feed of a camera 118, 1106-2 corresponding to a thermostat 102, 1106-3 corresponding to a hazard detector 104). FIG. 11B illustrates an alternative implementation of the GUI in FIG. 11A in which user-interface elements are re-arranged (e.g., landscape vs. portrait device orientation).

Figure 11C:
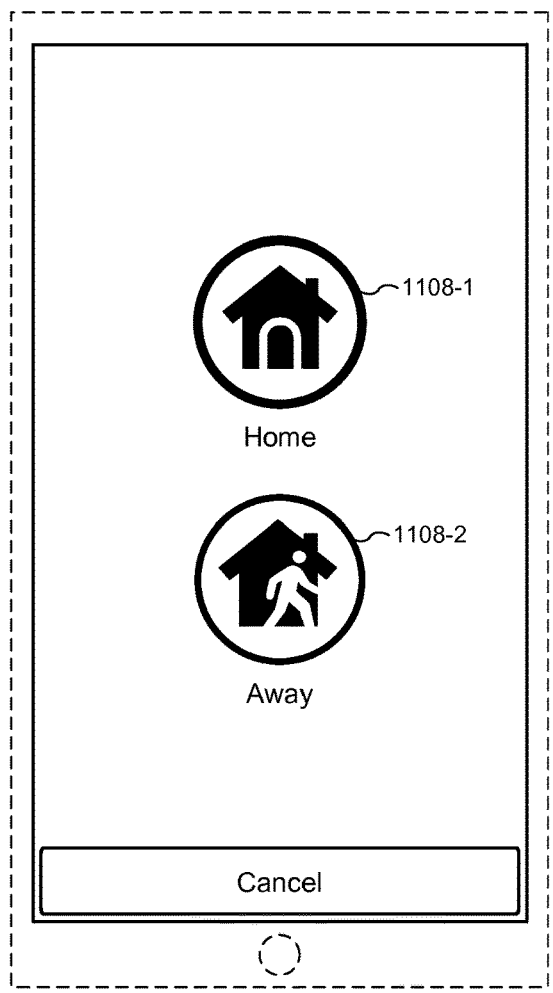
Figure 11D:
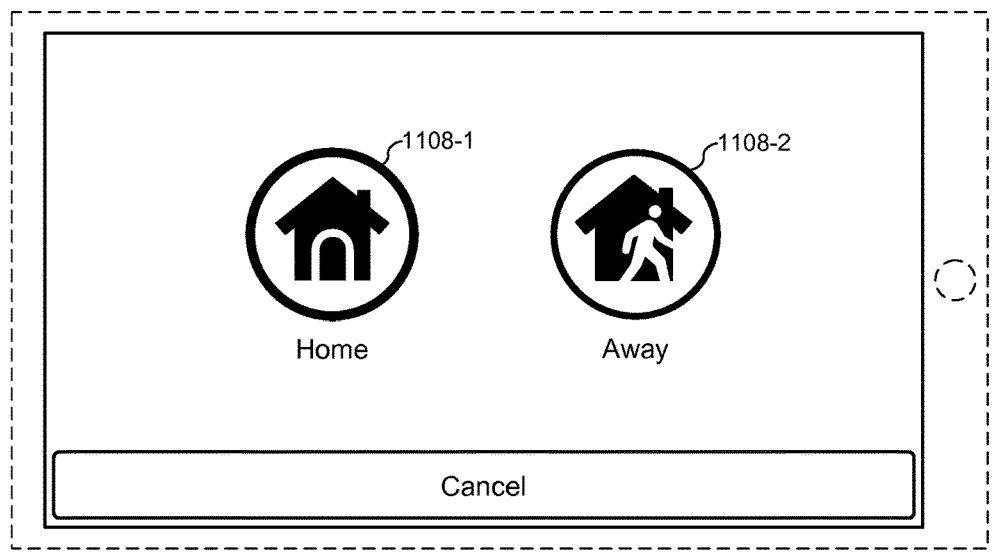

FIG. 11C illustrates a GUI (e.g., an "environment mode screen" or "card") displayed in response to detecting selection of the environment status graphic 1100-1 in FIG. 11A (e.g., corresponding to a first environment status). In this example, a corresponding feature set is provided based on the current environment status corresponding to a non-critical alert level. As shown, environment mode affordances 1108 are displayed, selection of which activate corresponding environment modes of the smart home environment (e.g., a "Home" mode, an "Away" mode). FIG. 11D illustrates an alternative implementation of the GUI in FIG. 11C.

Figure 11E:
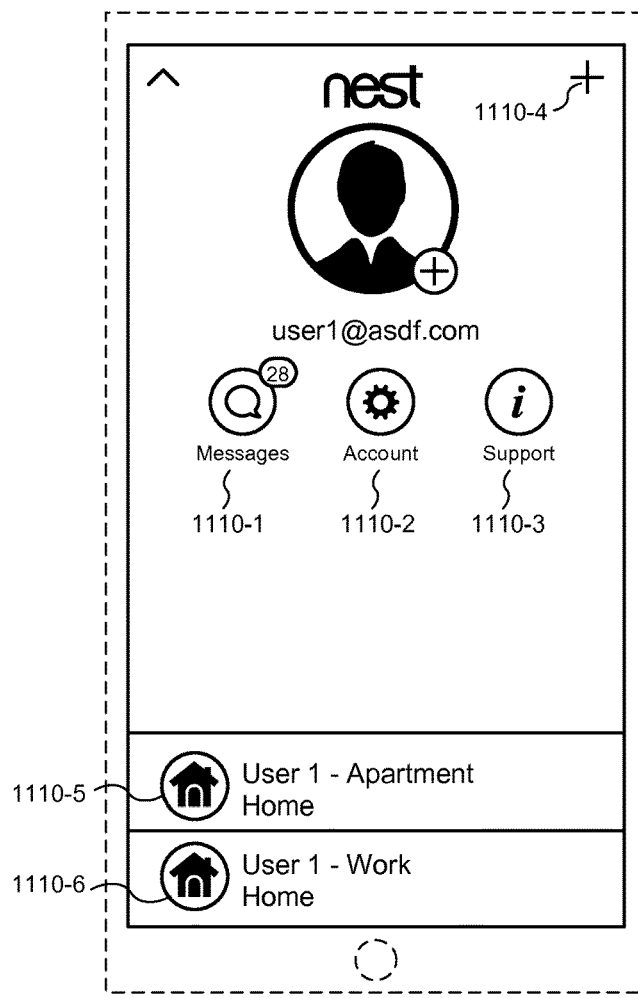
Figure 11F:
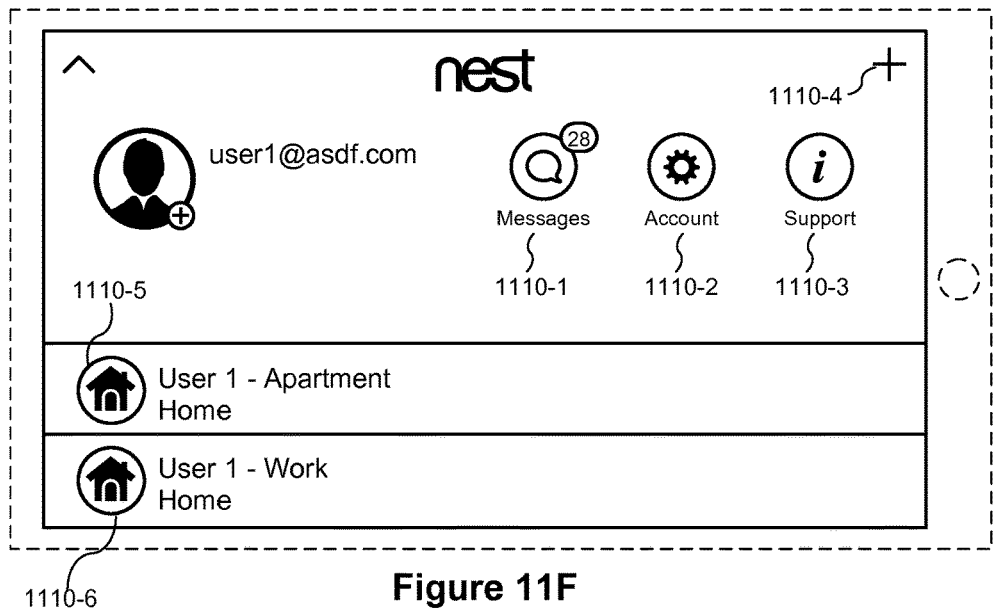
Figure 11G:
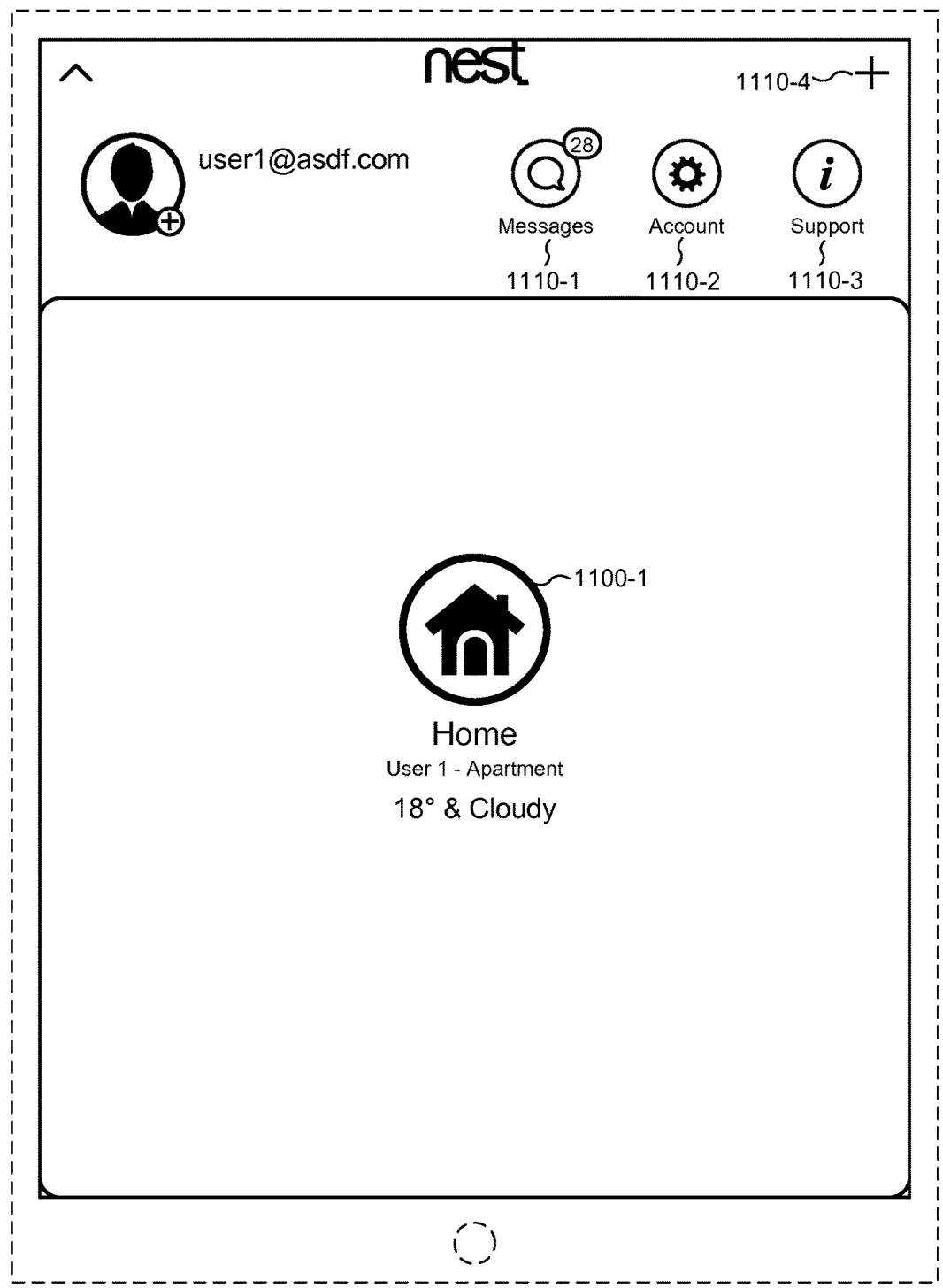
Figure 11H:
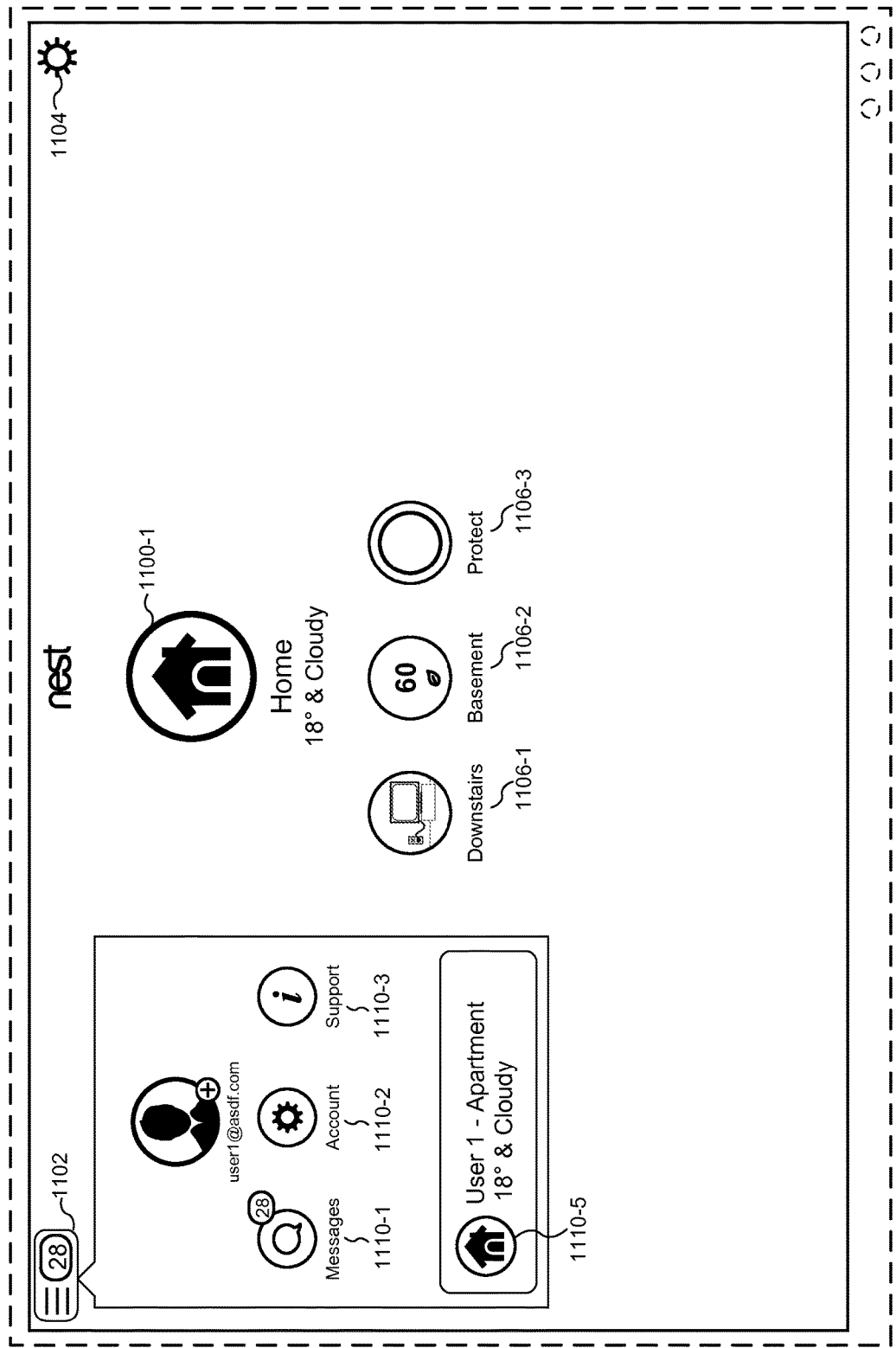

FIG. 11E illustrates a GUI (e.g., a "profile screen" or "card") displayed in response to detecting selection of the profile affordance 1102 in FIG. 11A. In this example, the GUI includes a messages affordance 1110-1 (e.g., for accessing notifications related to the smart home environment 100), an account affordance 1110-2 (e.g., for accessing various user account settings/details for a user associated with the client device 504), a support affordance 1110-3 (e.g., for accessing support related features for the application 824), and an environment addition affordance 1110-4 (e.g., for adding more environments for control and management). Also shown are environment selection affordances 1110-5 and 1110-6 corresponding to different smart home environments 100, selection of which allows a user to control and manage devices of the selected environment. FIGS. 11F through 11H illustrate alternative implementations of the GUI in FIG. 11E. As shown in FIGS. 11G and 11H, the GUIs concurrently display portions of the "home screen" (FIG. 11A) and the "profile screen" (FIG. 11E).

Figure 11I:
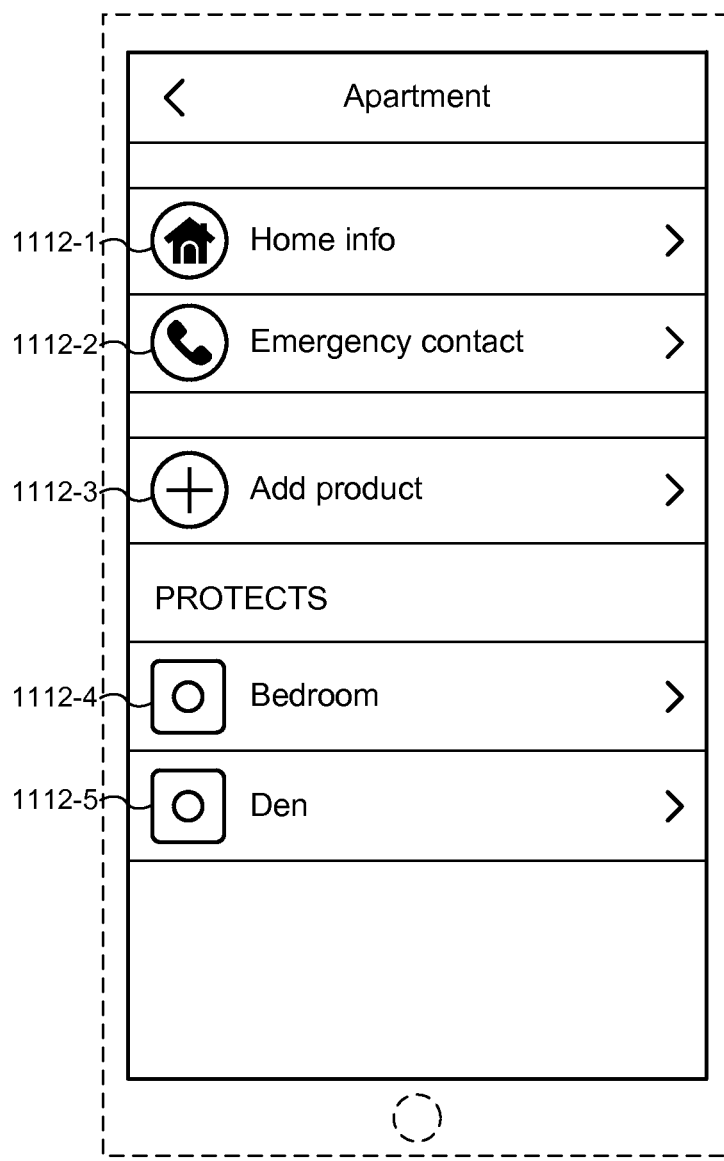

FIG. 11I illustrates a GUI (e.g., a "configuration screen" or "card") displayed in response to detecting selection of the configuration affordance 1104 in FIG. 11A. In this example, the GUI includes a home information affordance 1112-1 (e.g., for accessing device and other details of a currently selected environment), an emergency contact affordance 1112-2 (e.g., for configuring details of an emergency contact), and a device addition affordance 1112-3 (e.g., for adding and configuring additional devices to the selected environment, such as additional cameras 118 or hazard detectors 104). Also shown are device affordances 1112-4 and 1112-5 corresponding to different devices of the smart home environment 100, selection of which allows a user to access and configure settings of a selected device.

Figure 11J:
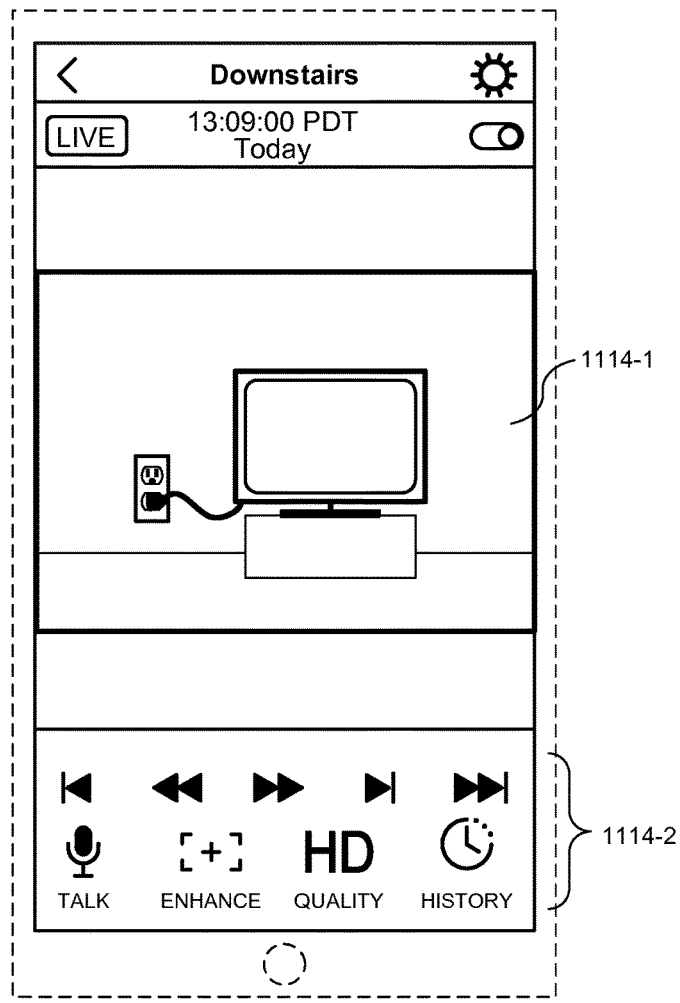
Figure 11K:
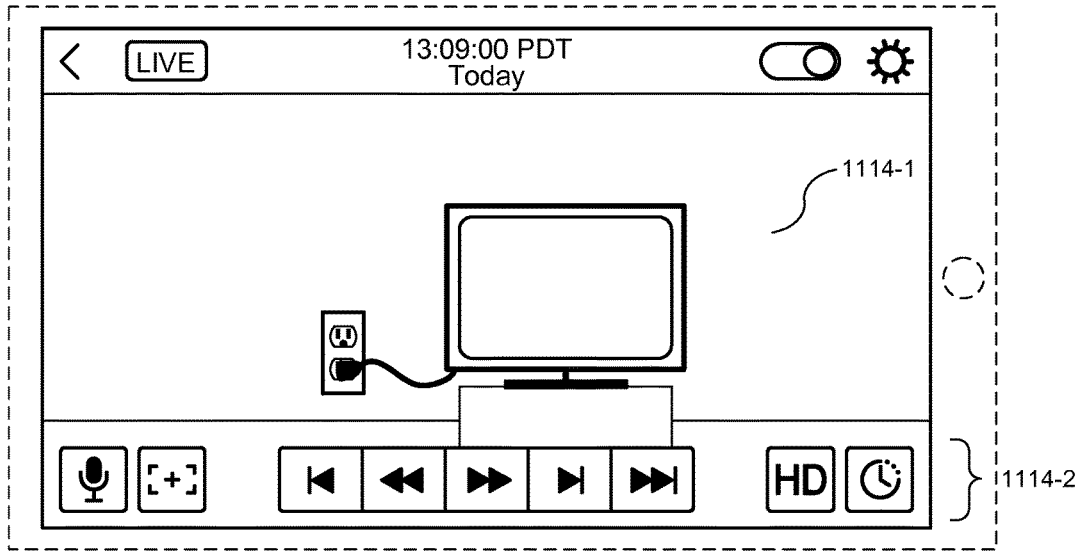
Figure 11L:
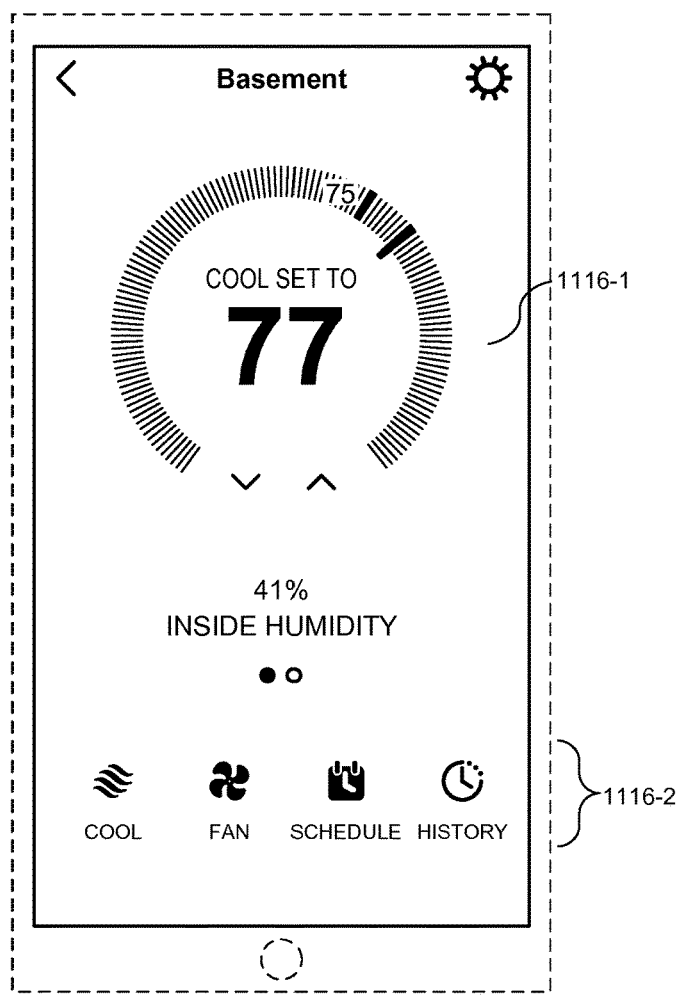
Figure 11M:
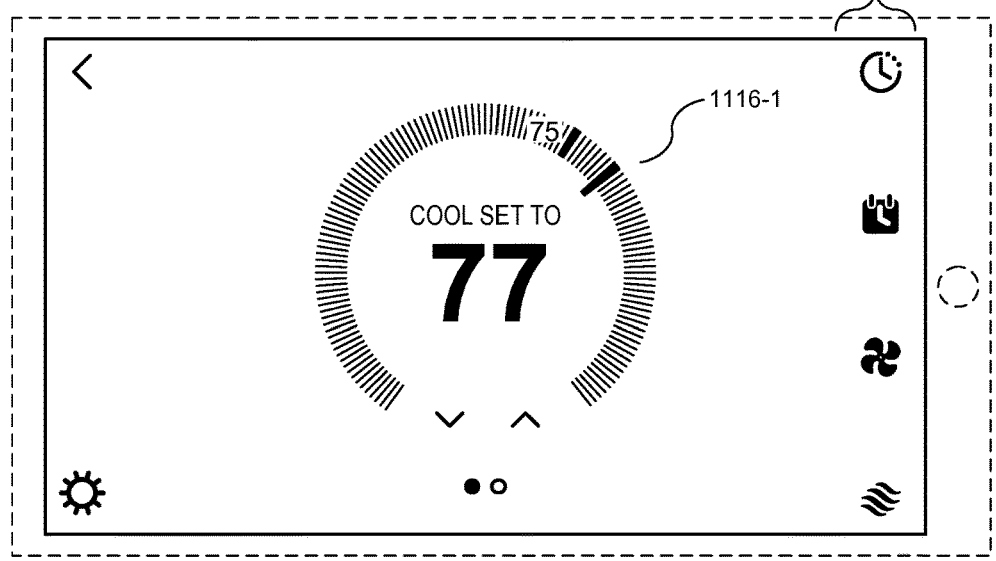
Figure 11N:
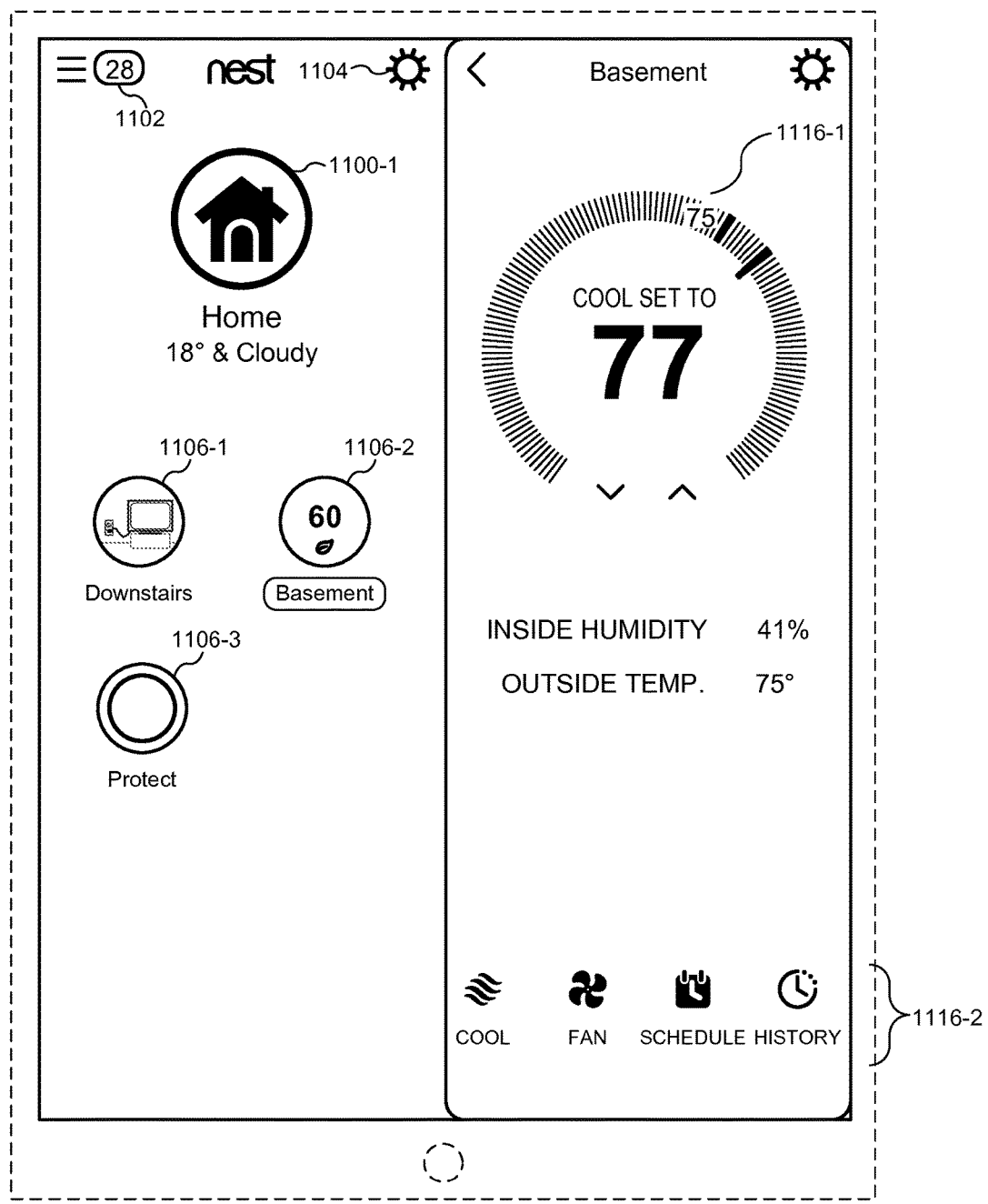
Figure 11O:
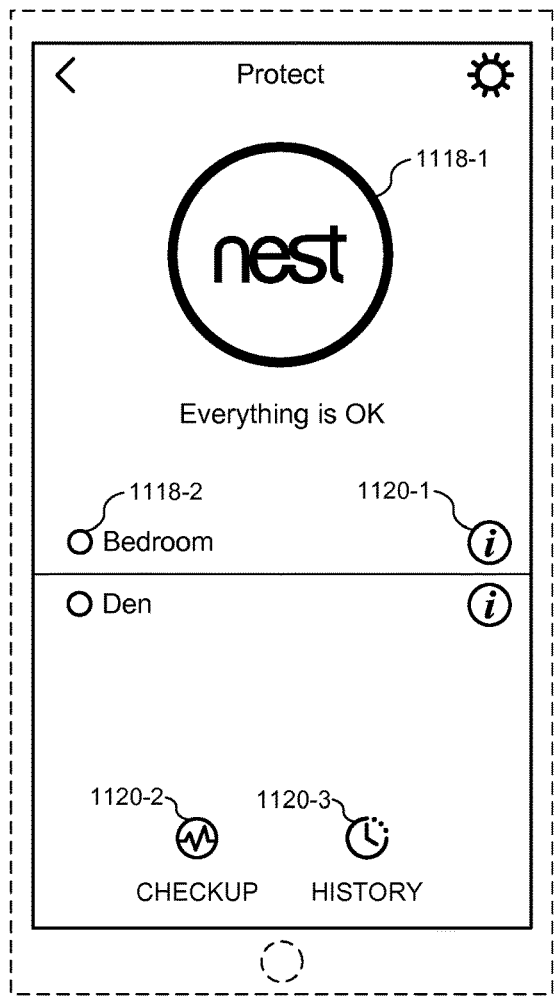
Figure 11P:
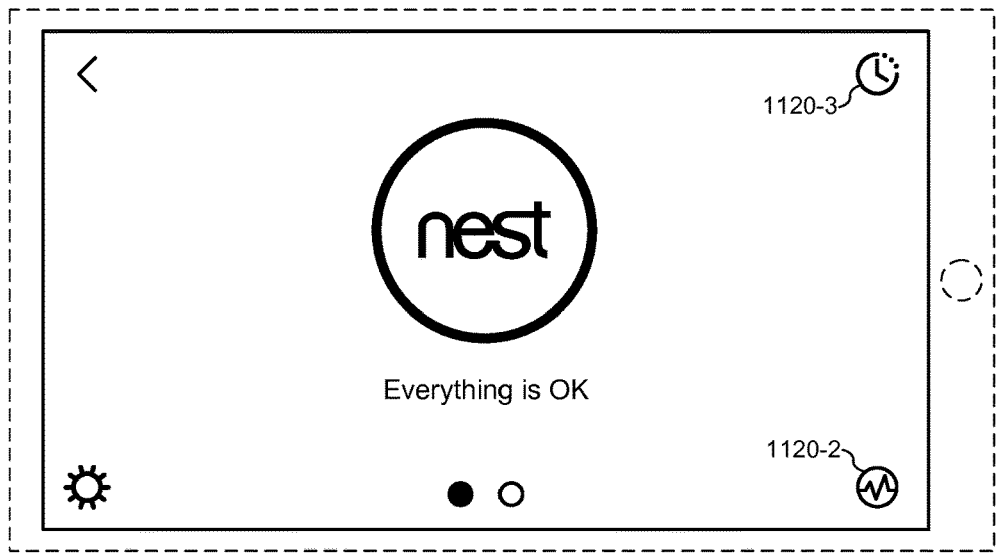
Figure 11Q:
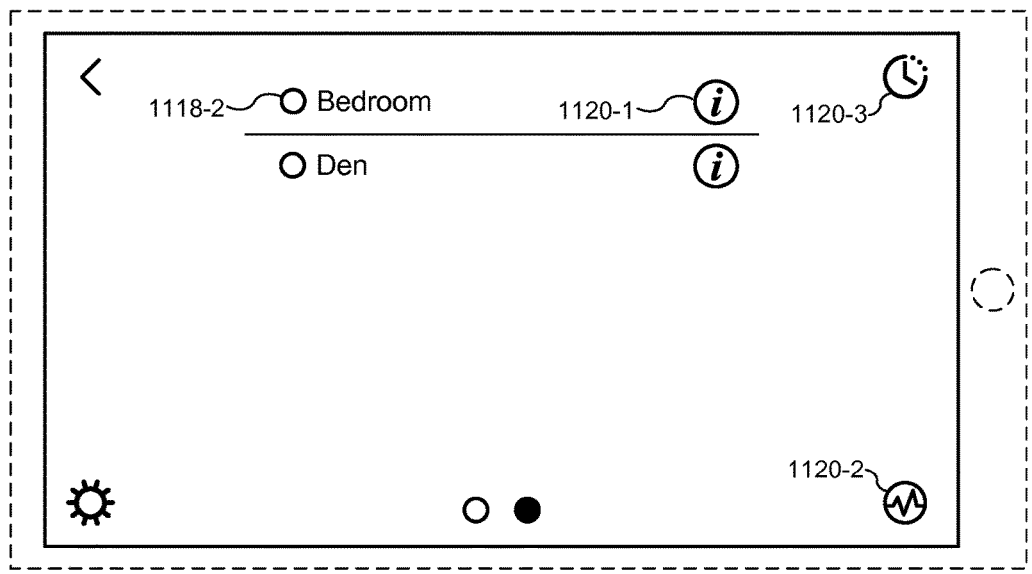
Figure 11R:
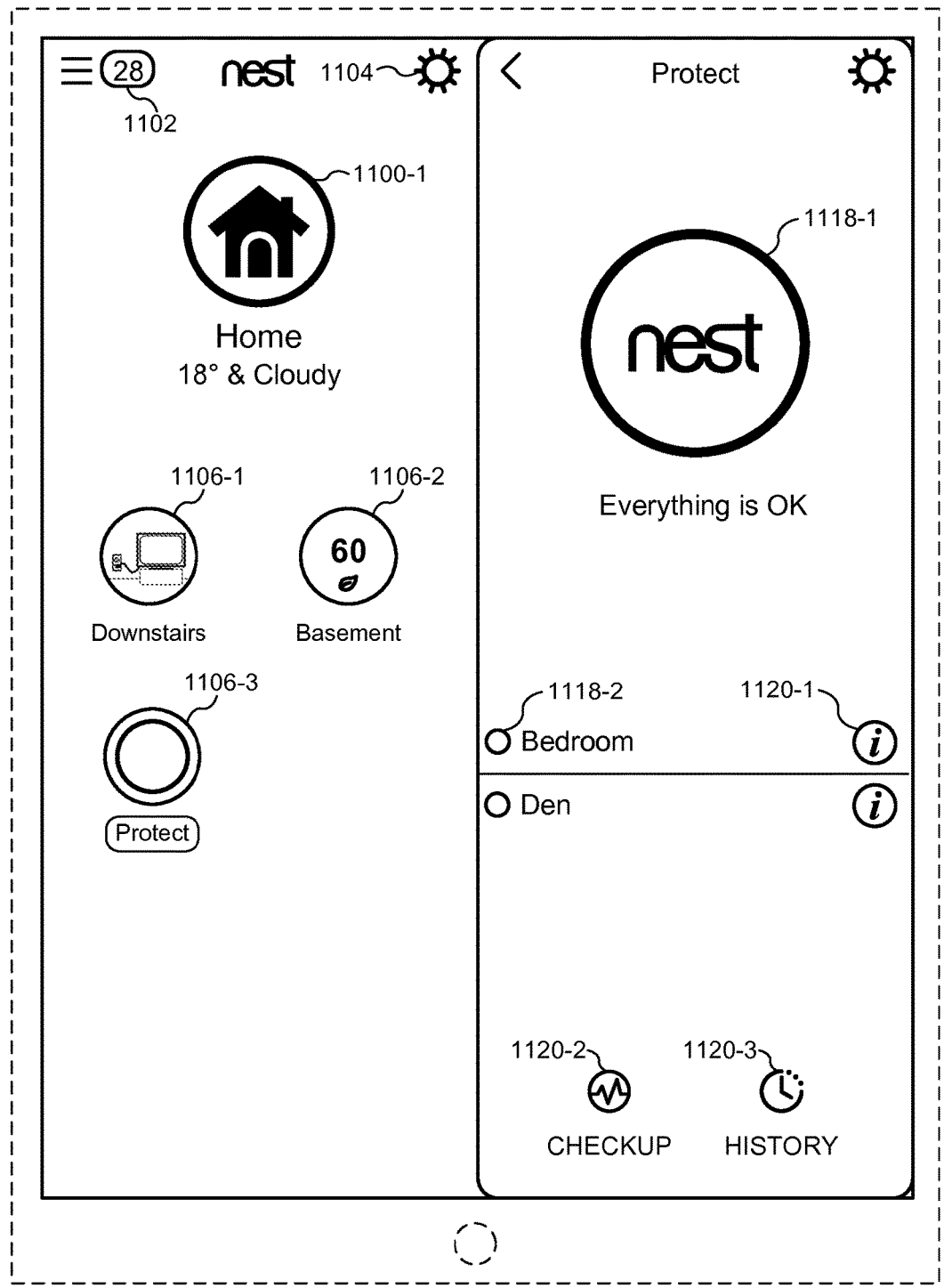
Figure 11S:
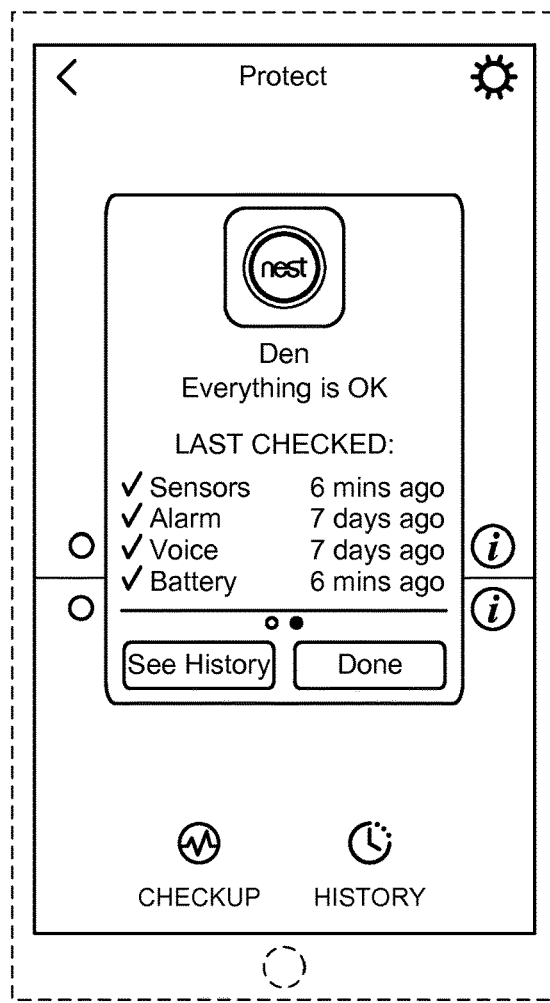
Figure 11T:
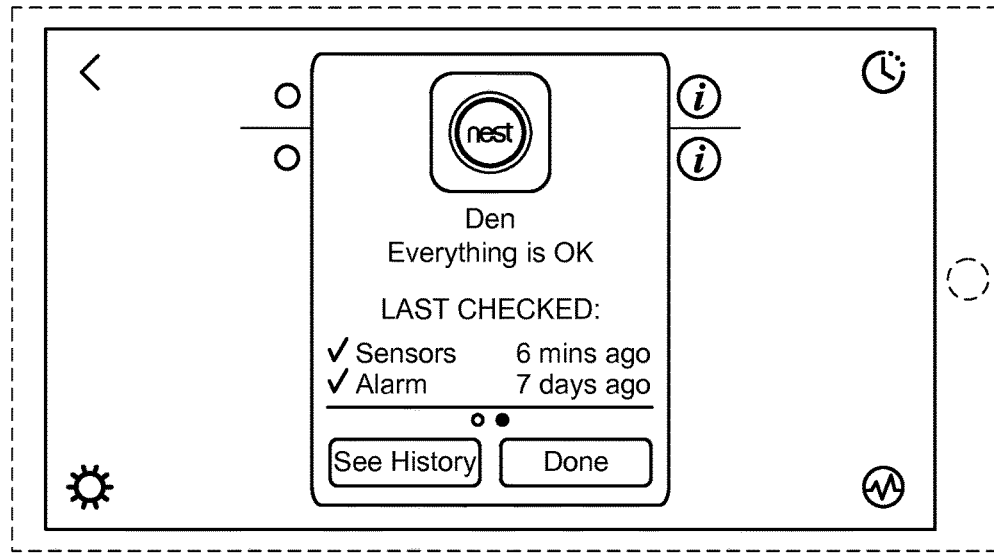
Figure 11U:
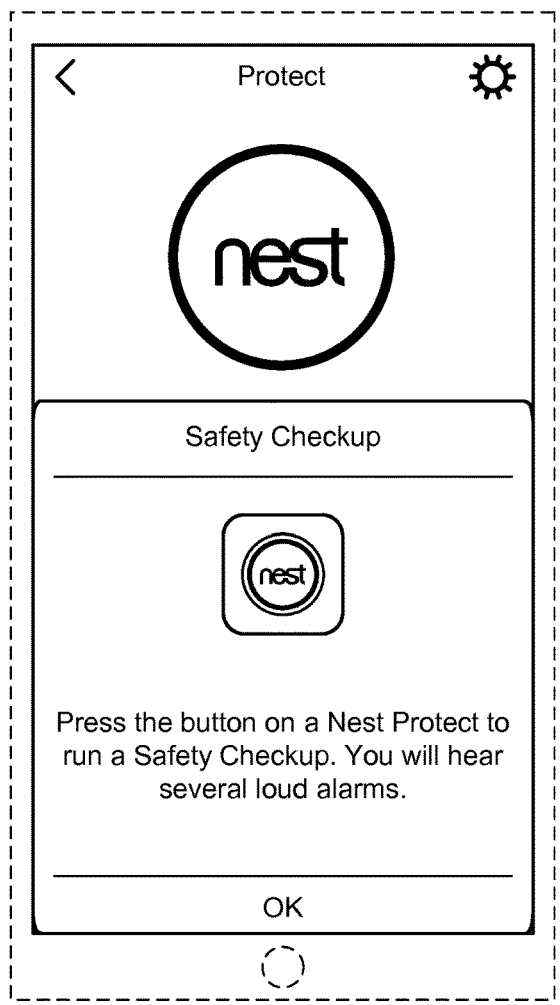
Figure 11V:
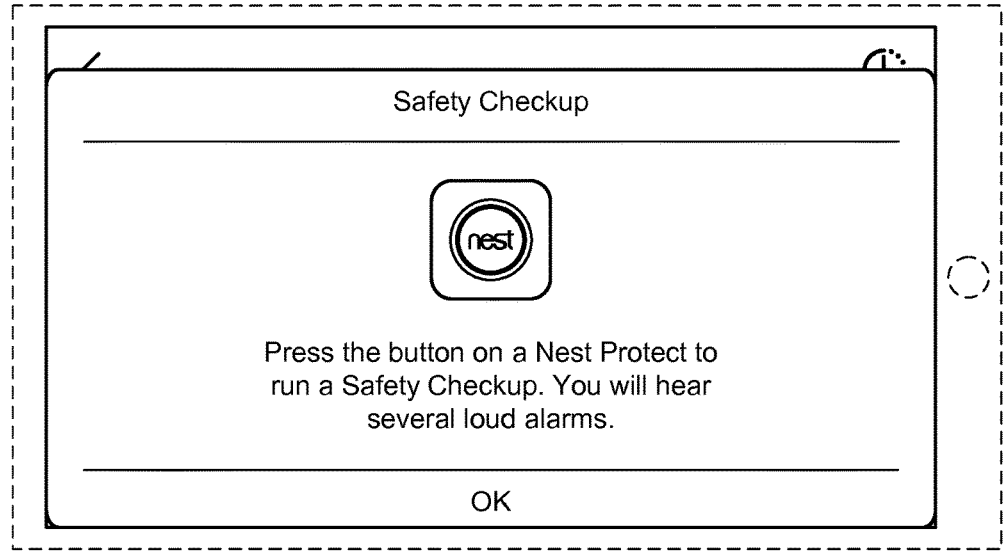
Figure 11W:
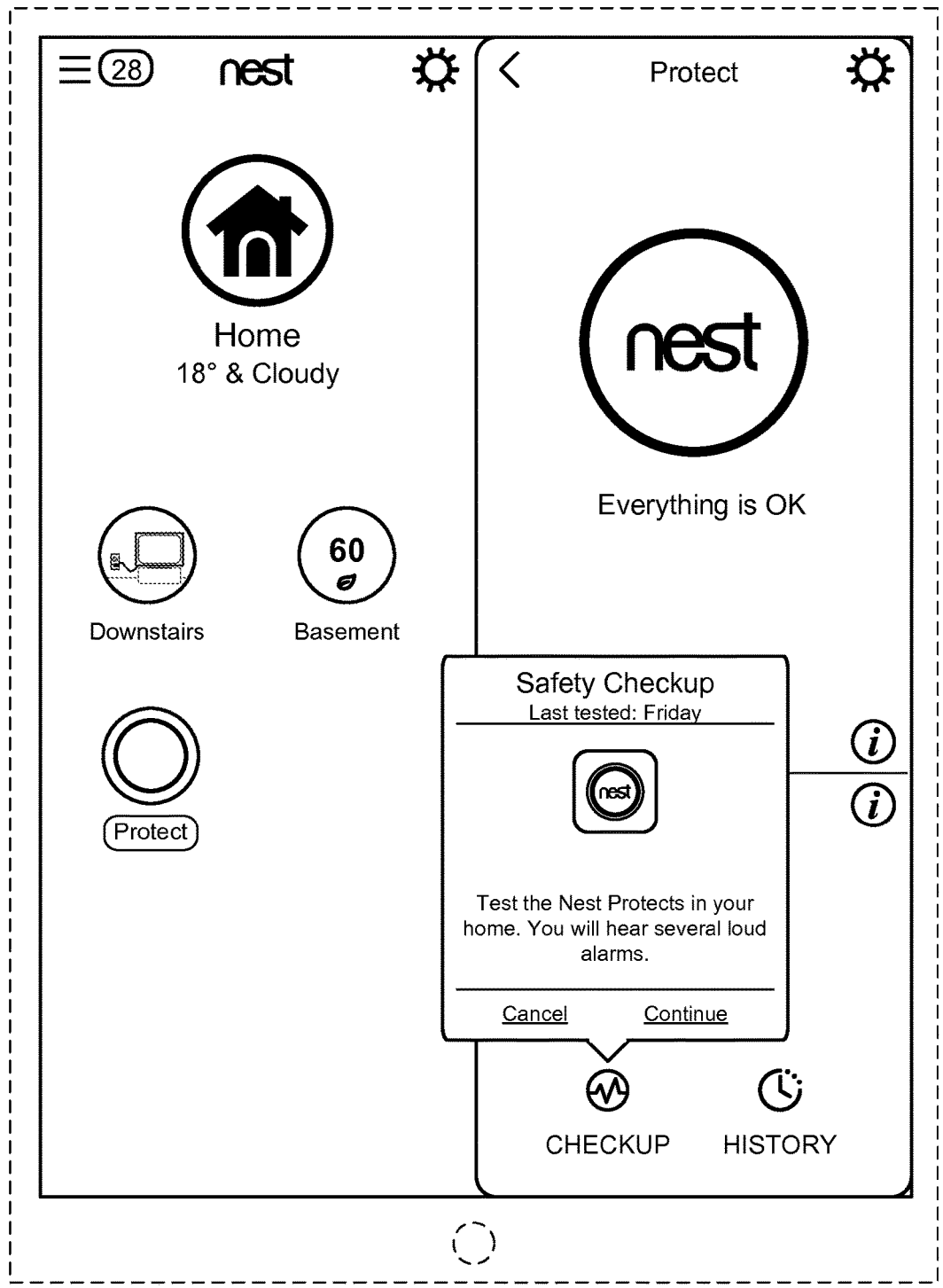

FIGS. 11J-11W illustrate device-specific GUIs displayed in response to selection of the various device state graphics 1106.

More specifically, FIG. 11J illustrates a GUI (e.g., a "video feed screen" or "card") displayed in response to detecting selection of the device state graphic 1106-1 in FIG. 11A for a camera 118. In this example, the GUI includes a video feed 1114-1 and various camera device affordances 1114-2 for controlling playback of the video feed. The camera device affordances 1114-2 also include optional affordances for utilizing a speaker of the camera 118 (e.g., "TALK" button), enhancing the image quality of select portions of the video feed (e.g., "ENHANCE" button), enabling high-definition video quality (e.g., "HD QUALITY" button), and viewing recorded video/detected motion history (e.g., "HISTORY" button). FIG. 11K illustrates an alternative implementation of the GUI in FIG. 11J.

FIG. 11L illustrates a GUI (e.g., a "thermostat screen" or "card") displayed in response to detecting selection of the device state graphic 1106-2 in FIG. 11A for a thermostat 102. In this example, the GUI includes a temperature setpoint affordance 1116-1 (e.g., for indicating a current temperature and for configuring temperature settings of the thermostat) and various thermostat device affordances 1116-2 corresponding to various device features, such as adjusting an operational mode of the thermostat (e.g., "COOL" button), adjusting fan speed (e.g., "FAN" button), modifying scheduling settings (e.g., "SCHEDULE" button), and accessing device history (e.g., "HISTORY" button). FIGS. 11M and 11N illustrate alternative implementations of the GUI in FIG. 11L.

FIG. 11O illustrates a GUI (e.g., a "hazard detector screen" or "card") displayed in response to detecting selection of the device state graphic 1106-3 in FIG. 11A for a hazard detector 104. In this example, the GUI includes hazard device state indicators 1118-1 and 1118-2 (e.g., for indicating a device state of the hazard detector 104), a device information affordance 1120-1 (e.g., for displaying diagnostic information of the corresponding hazard detector 104), a checkup affordance 1120-2 (e.g., for displaying instructions for performing a diagnostic test for the hazard detector 104), and a history affordance 1120-3 (e.g., for viewing a diagnostic test history for the hazard detector 104). In some implementations, the hazard device state indicator 1118-1 corresponds to the visual mode of the device state graphic 1106-3 in FIG. 11A (e.g., both the hazard device state indicator 1118-1 and the device state graphic 1106-3 include yellow colored rings). FIGS. 11P through 11R illustrate an alternative implementation of the GUI in FIG. 11O. As shown in FIG. 11R, the GUI concurrently displays portions of the "home screen" (FIG. 11A) and the "hazard detector screen" (FIG. 11O).

FIG. 11S illustrates a GUI displayed in response to detecting selection of the device information affordance 1120-1 in FIG. 11O. As shown, diagnostic information of the corresponding hazard detector 104 is displayed, which indicates how recently components of the corresponding hazard detector 104 were checked for proper functionality. FIG. 11T illustrates an alternative implementation of the GUI in FIG. 11S.

FIG. 11U illustrates a GUI displayed in response to detecting selection of the checkup affordance 1120-2 in FIG. 11O. As shown, instructions for performing a diagnostic test of the hazard detector 104 are displayed (e.g., "Press the button of a Nest Protest to run a Safety Checkup."). FIGS. 11V and 11W illustrate alternative implementations of the GUI in FIG. 11U. As shown in FIG. 11W, the GUI concurrently displays portions of the "home screen" (FIG. 11A) and the "hazard detector screen" (FIG. 11O), and instructions for the diagnostic test (FIG. 11U).

Figure 11X:
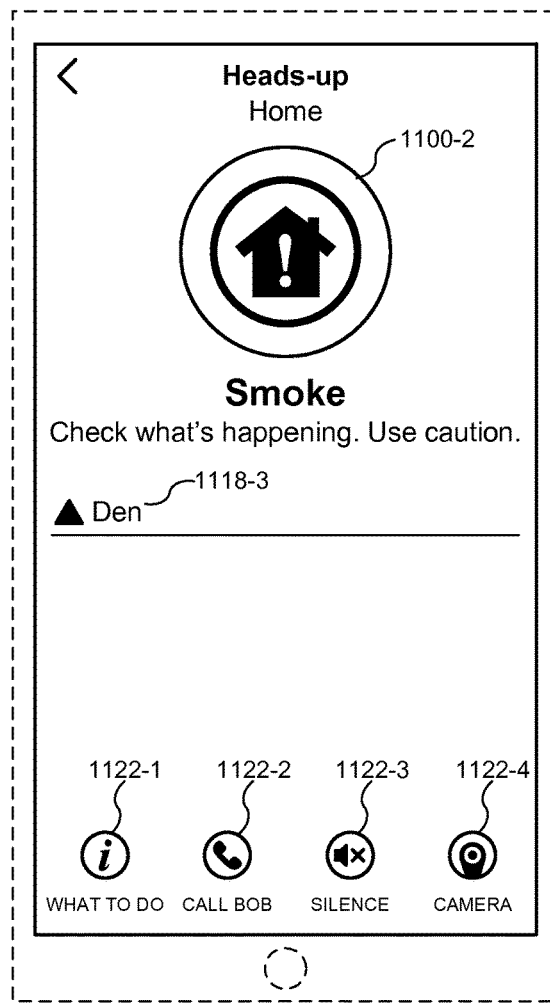

FIGS. 11X-11AW illustrate various GUIs that may be displayed when the current environment status corresponds to a heightened alert level. While the examples illustrate situations in which some hazard condition is detected (e.g., smoke/carbon monoxide detected by the hazard detector 104), similar GUIs may also be displayed in response to other situations in which the current environment status corresponds to a heightened alert level (e.g., detection of motion by a camera 118 in a restricted zone, detection of unusually high/low temperatures by the thermostat 102, etc.).

In particular, FIG. 11X illustrates a GUI (e.g., an "alert notification," "alert card," "alarm card") displayed in response to determining that the current environment status corresponds to a heightened alert level (e.g., an environment status corresponding to an alert level that is higher than that of the environment status represented in FIG. 11A). The GUI indicates the cause of the current environment status (e.g., detection of some level of smoke by the hazard detector 104), and includes both an environment status graphic 1100-2 and a device state indicator 1118-3. In contrast to FIG. 11A, the environment status graphic 1100-2 is represented by a corresponding visual mode that includes an icon (and optionally, an associated color for the ring encircling the icon, such as a red) that indicates that the current environment status corresponds to a heightened alert level (e.g., a house icon with an exclamation point). In this example, the environment status graphic 1100-2 also displays an animation as the GUI in FIG. 11X is displayed, where rings radiate outwards from the environment status graphic 1100-2. Similarly, the device state indicator 1118-3 is distinct from the device state indicator 1118-2 in FIG. 11O (e.g., a triangle icon compared to a circle icon), indicating that the hazard detector 104 has a different device state than the device state shown in FIG. 11O. In some implementations in which the current environment status is based on the device state of a particular device, the visual mode of the environment status graphic 1100-2 matches the visual mode of the corresponding device state graphic (e.g., if a small amount of smoke is detected by the hazard detector 104, the environment status graphic 1100-2 and the device state graphic 1106-3 both include yellow rings).

Figure 11Y:
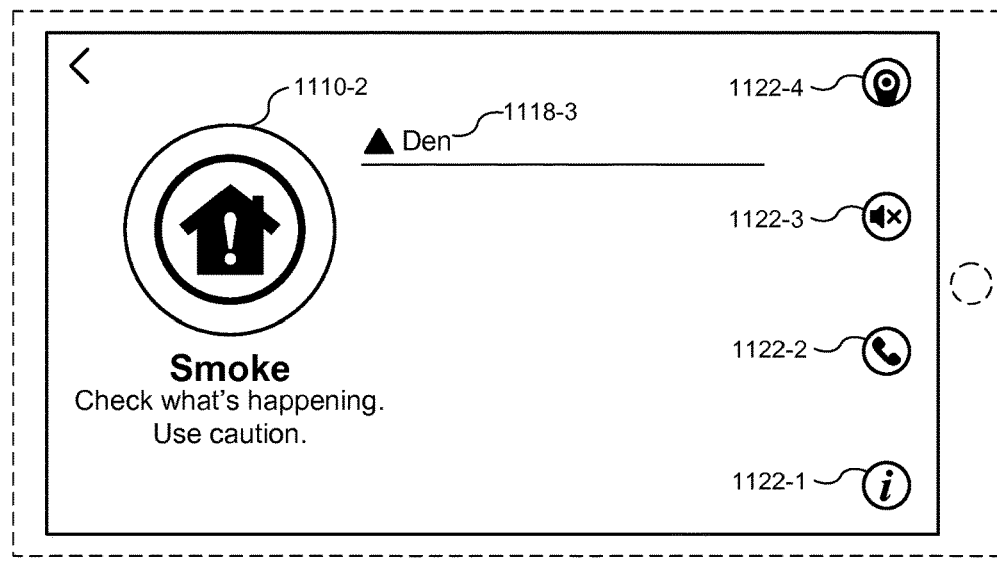
Figure 11A:
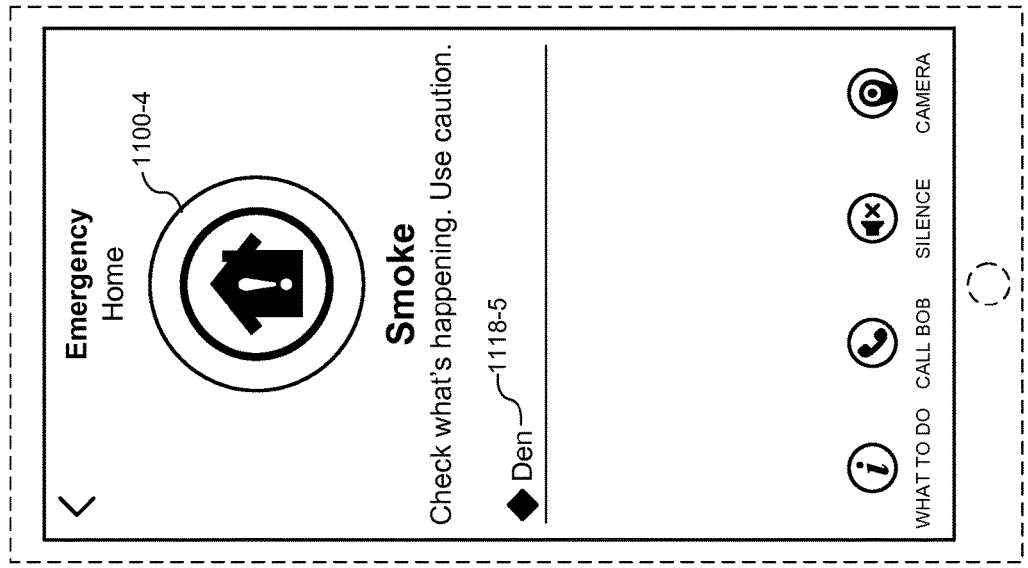

The GUI in FIG. 11X also includes various command affordances 1122 for the feature set corresponding to the current environment status. As described in greater detail below, the selectable affordances correspond to commands for performing device functions associated with the current environment status. In this example, the GUI includes an emergency instructions affordance 1122-1 (e.g., for displaying a set of emergency instructions corresponding to the cause of the current environment status), an emergency contact affordance 1122-2 (e.g., for contacting a designated emergency contact), an alarm silence affordance 1122-3 (e.g., for suppressing an audible alarm on a device), and an event camera feed affordance 1122-4 (e.g., for accessing a camera device nearby an alarming event). FIG. 11Y illustrates an alternative implementation of the GUI in FIG. 11X.

Figure 11Z:
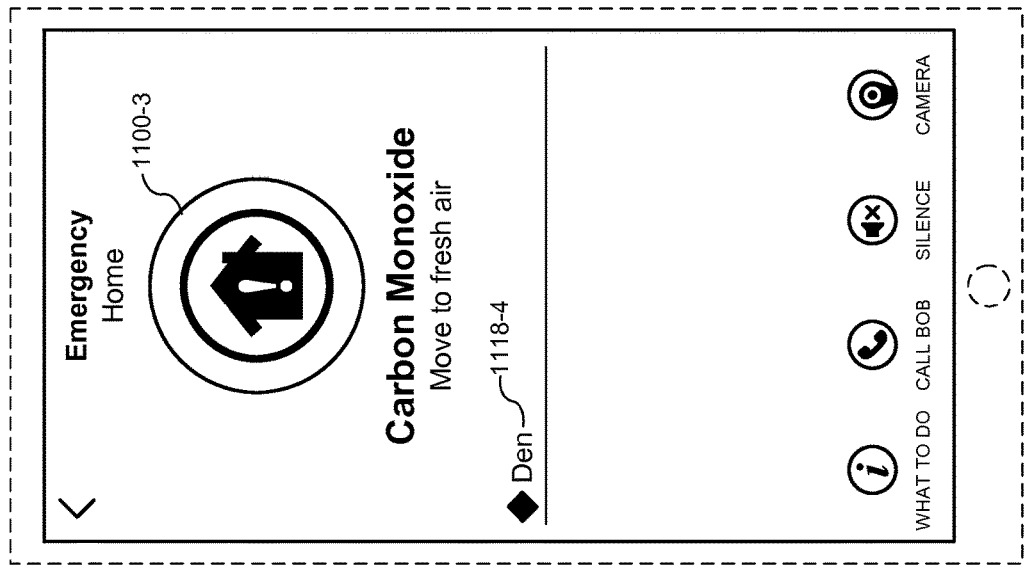
Figure 11A:
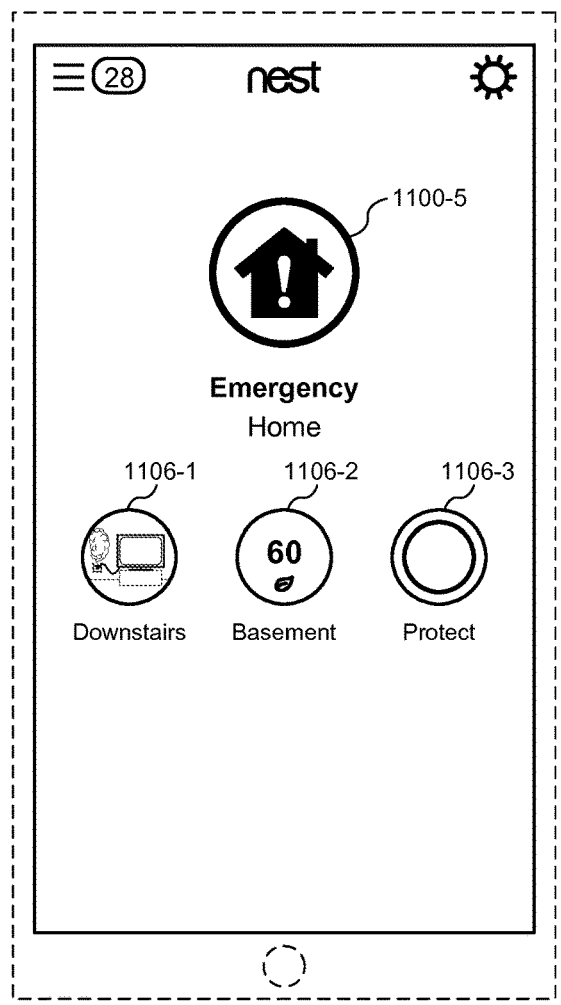
Figure 11A:
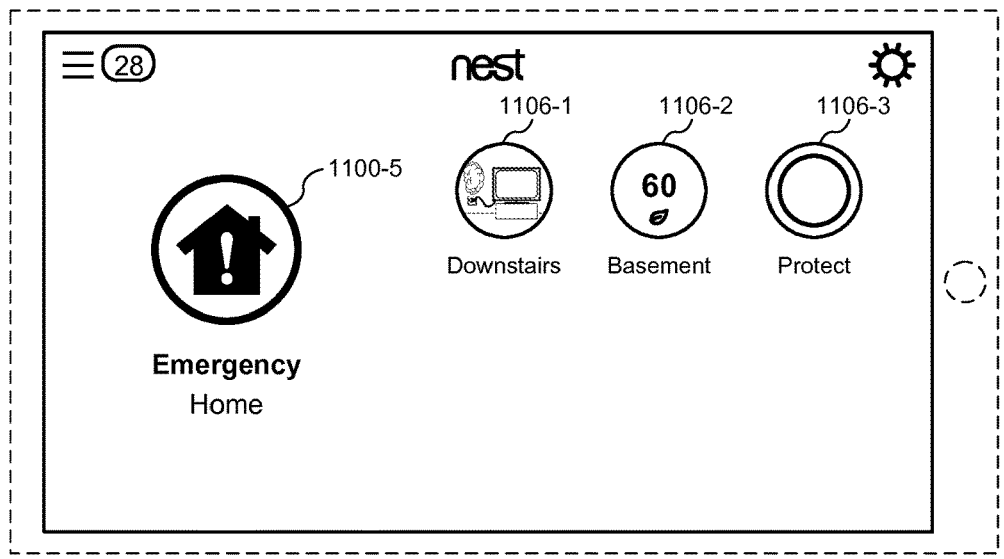
Figure 11A:
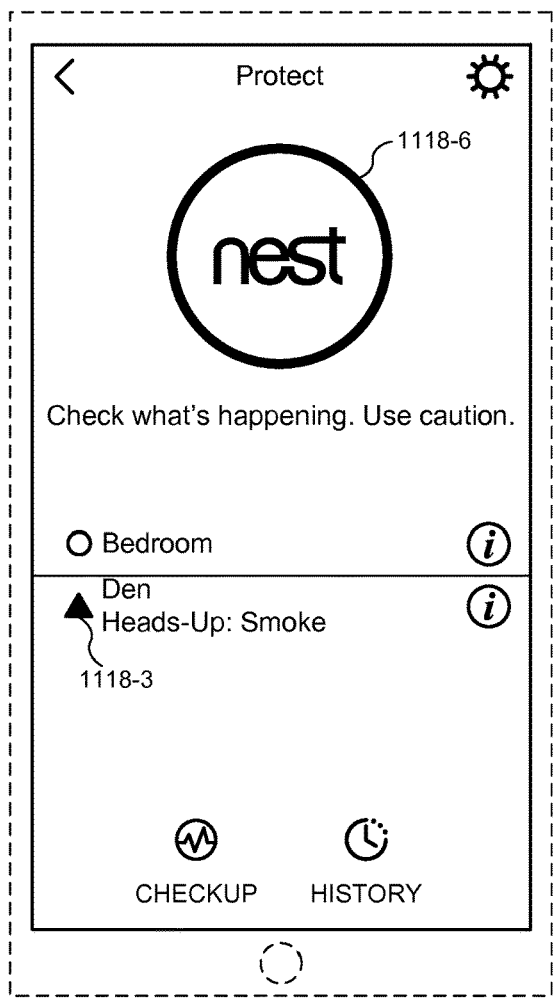
Figure 11A:
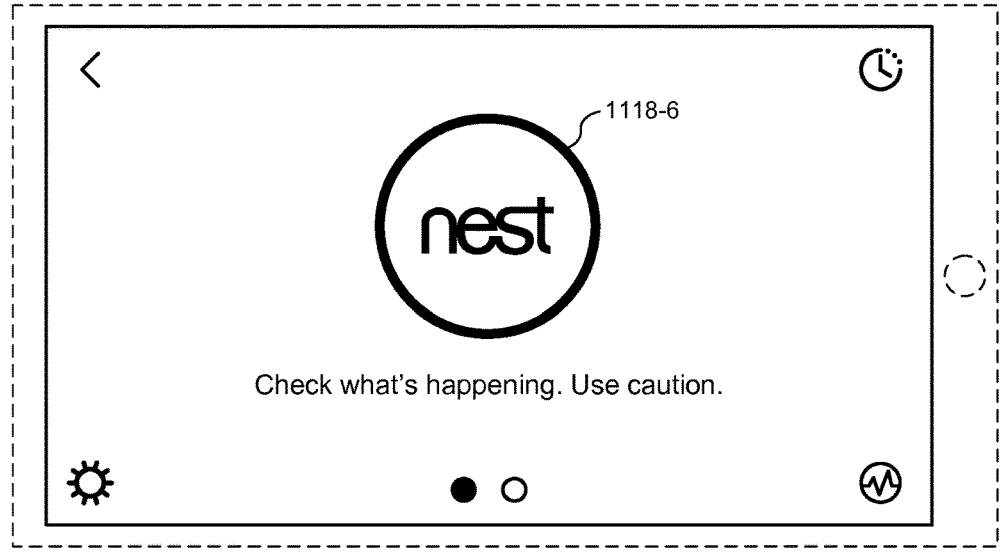
Figure 11A:
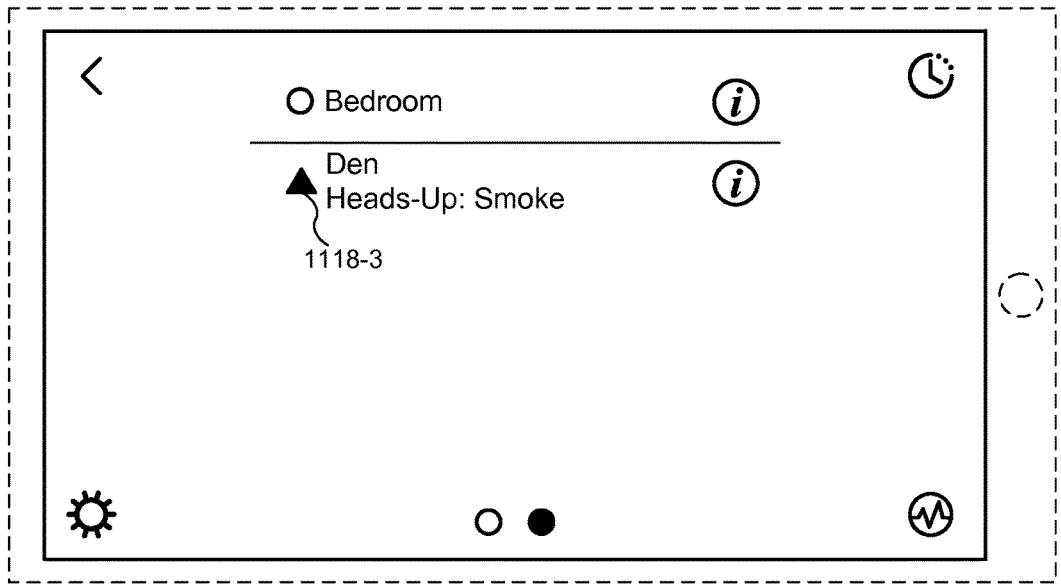
Figure 11A:
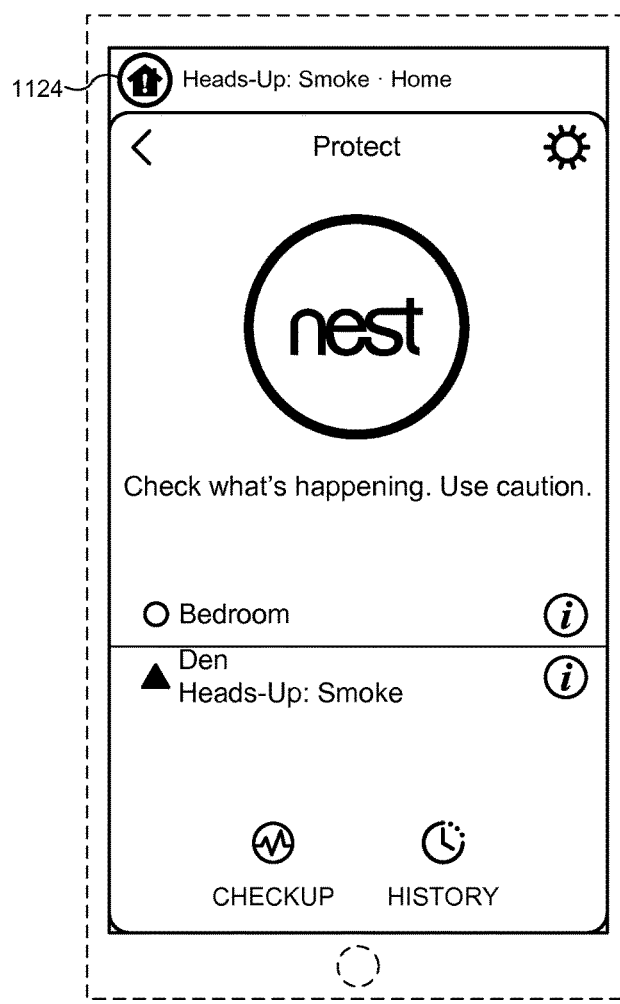
Figure 11A:
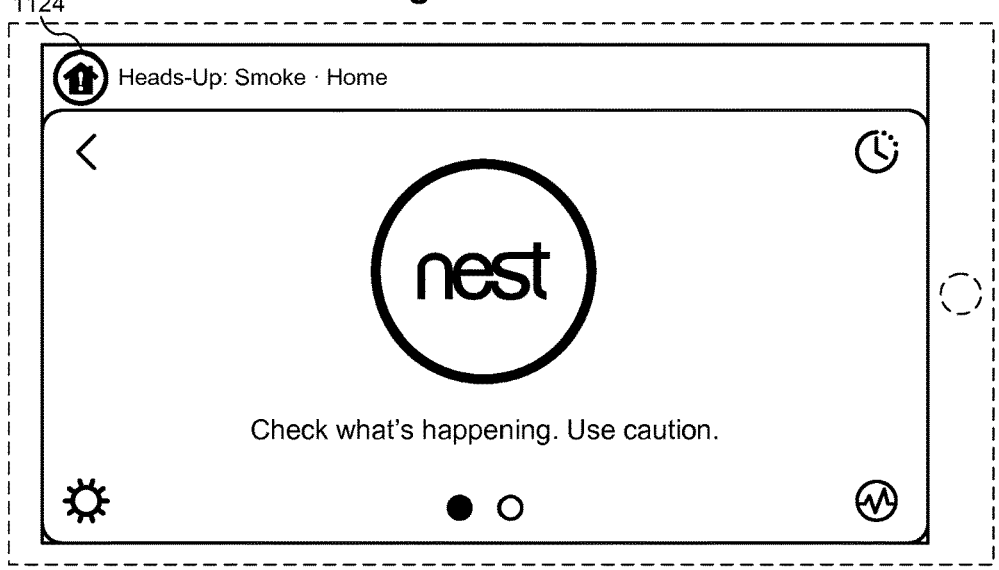
Figure 11A:
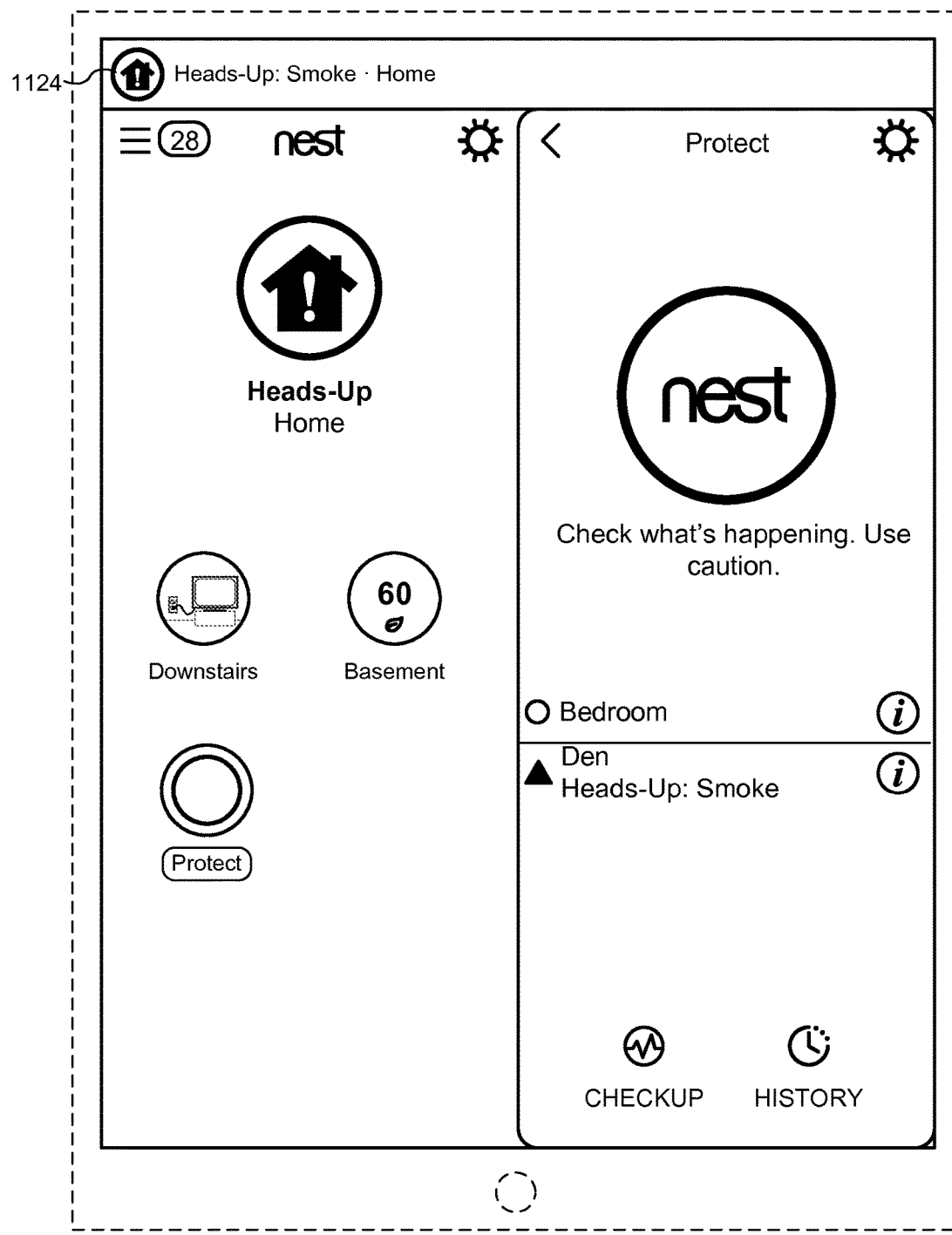
Figure 11A:
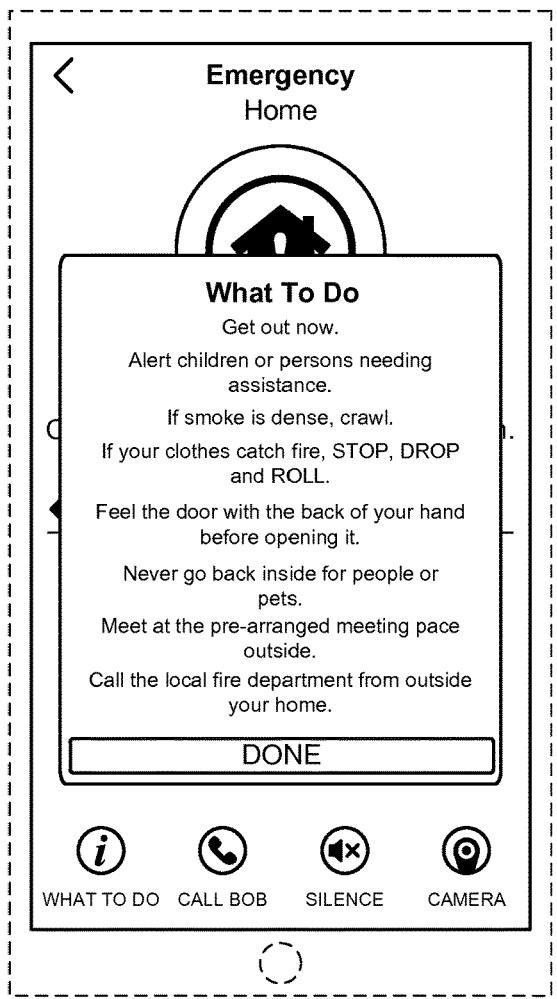
Figure 11A:
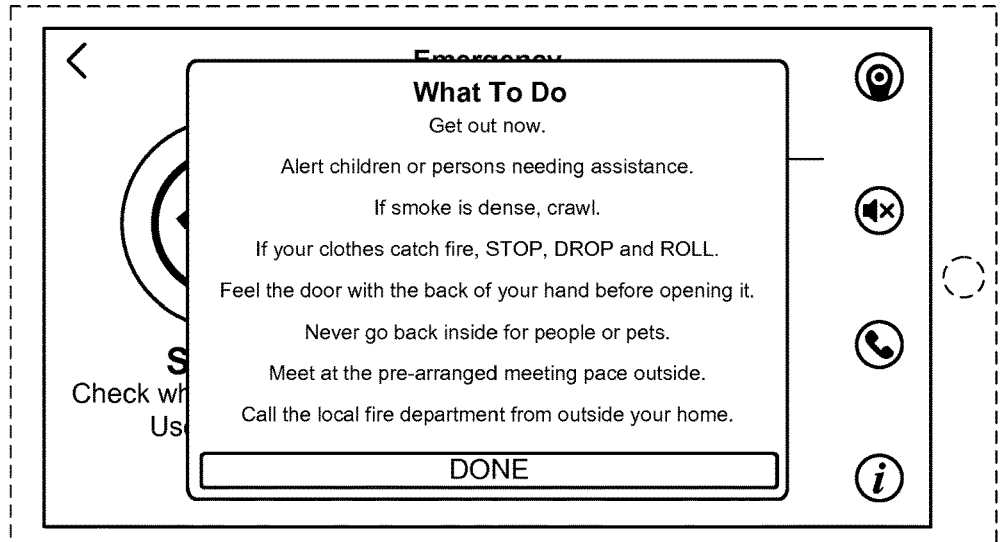
Figure 11A:
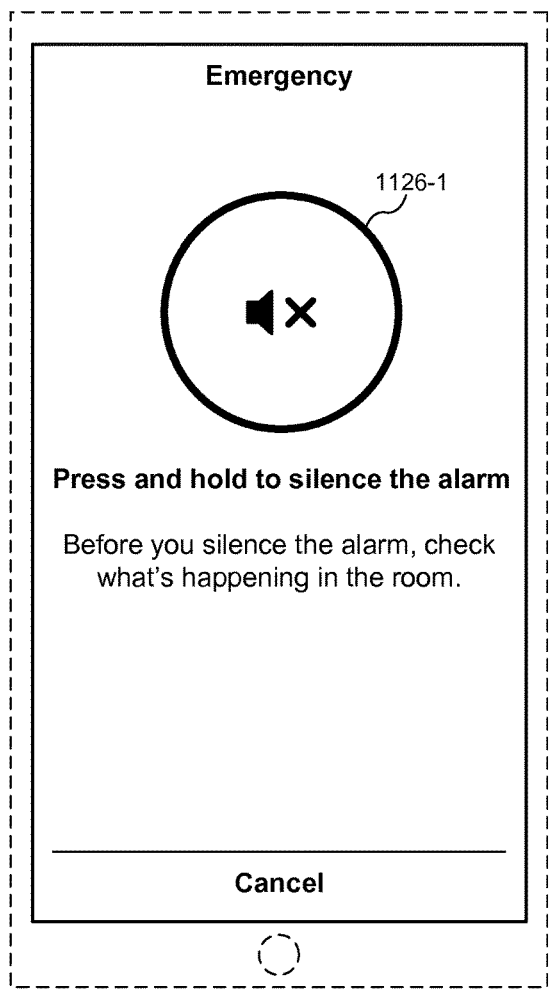
Figure 11A:
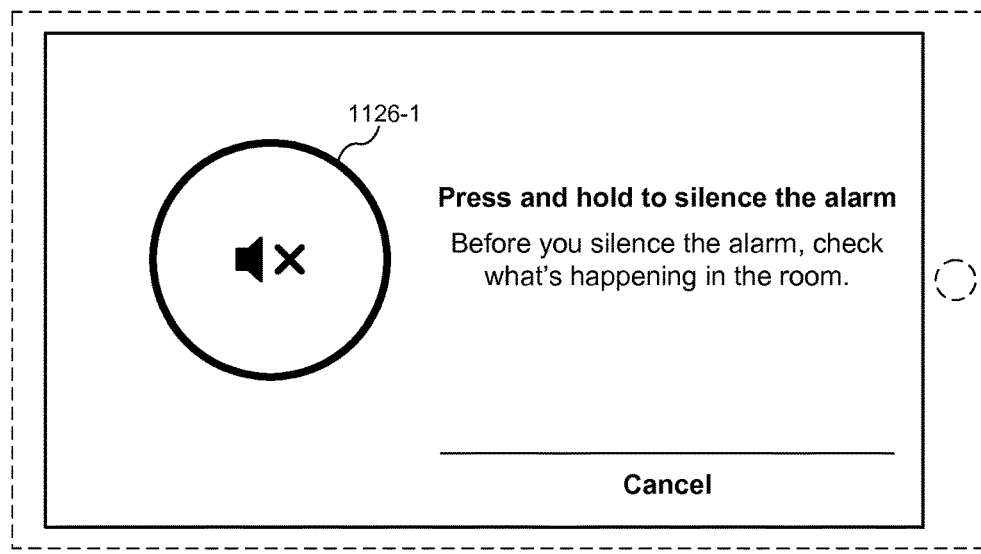
Figure 11A:
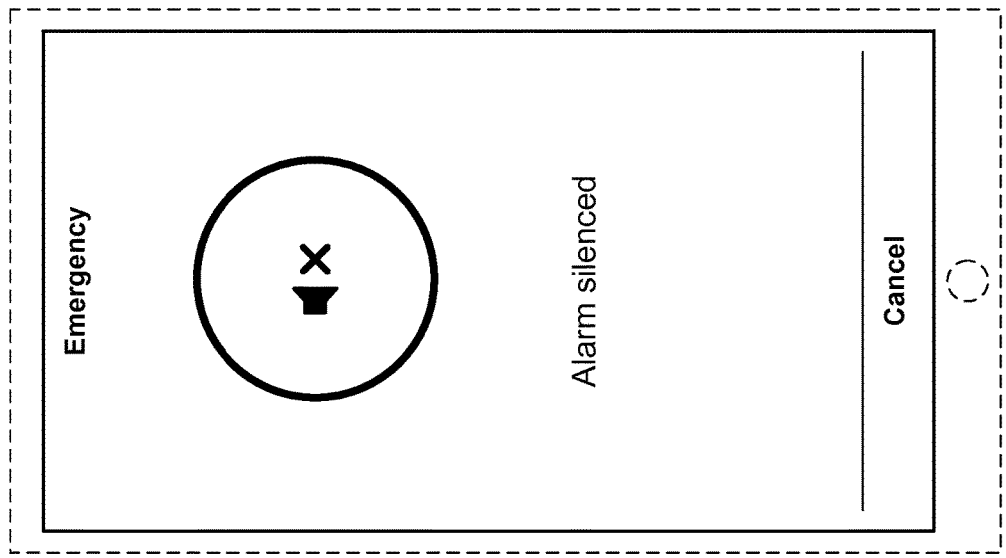
Figure 11A:
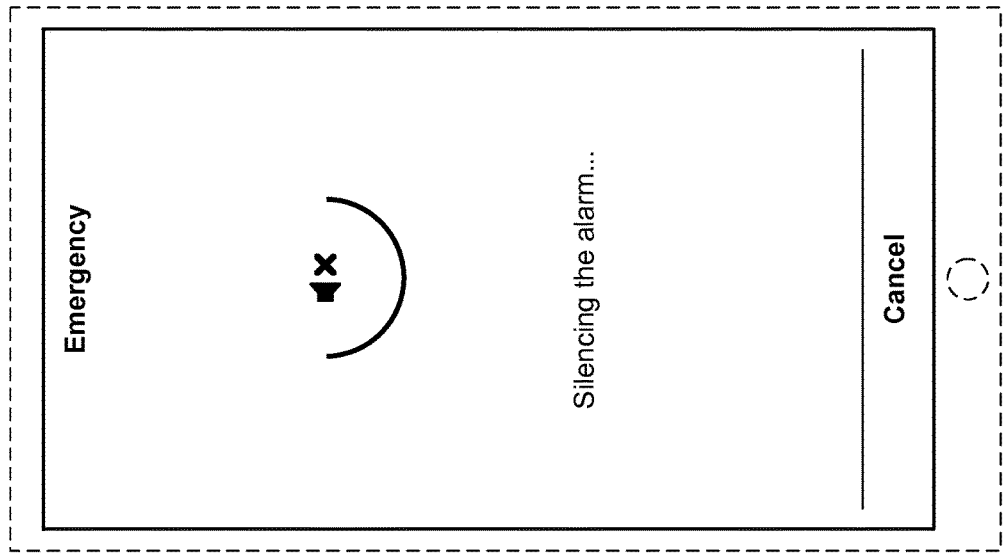
Figure 11A:
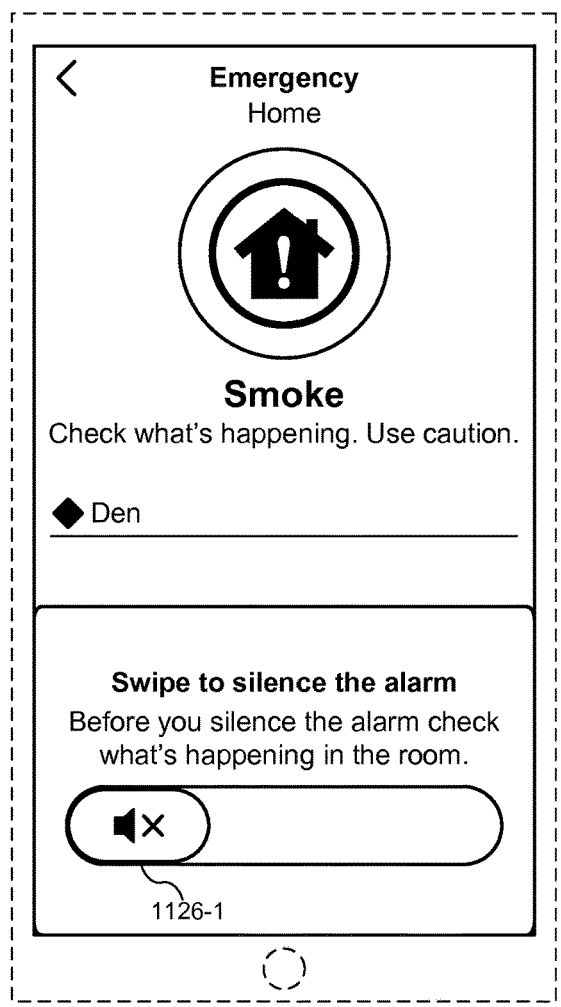
Figure 11A:
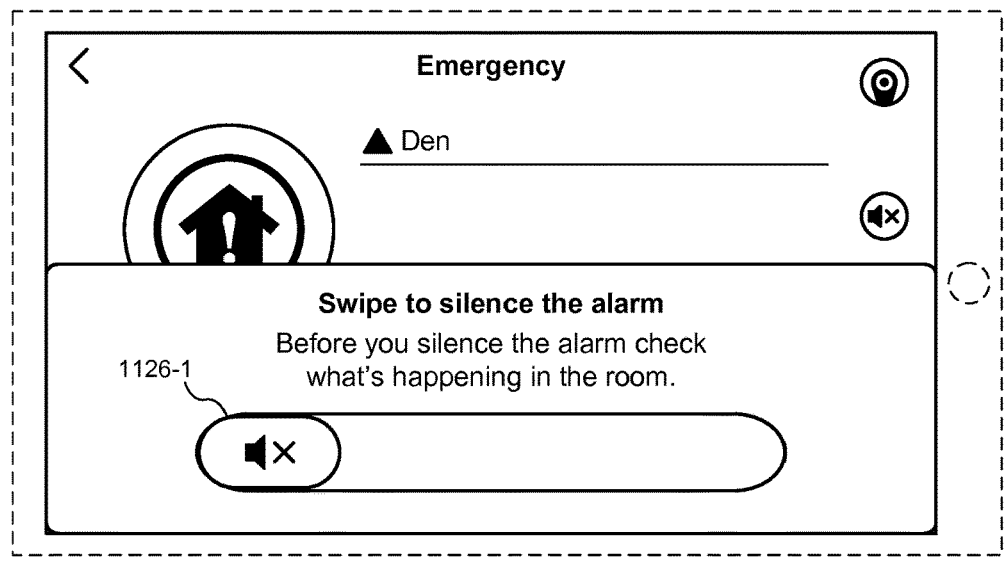
Figure 11A:
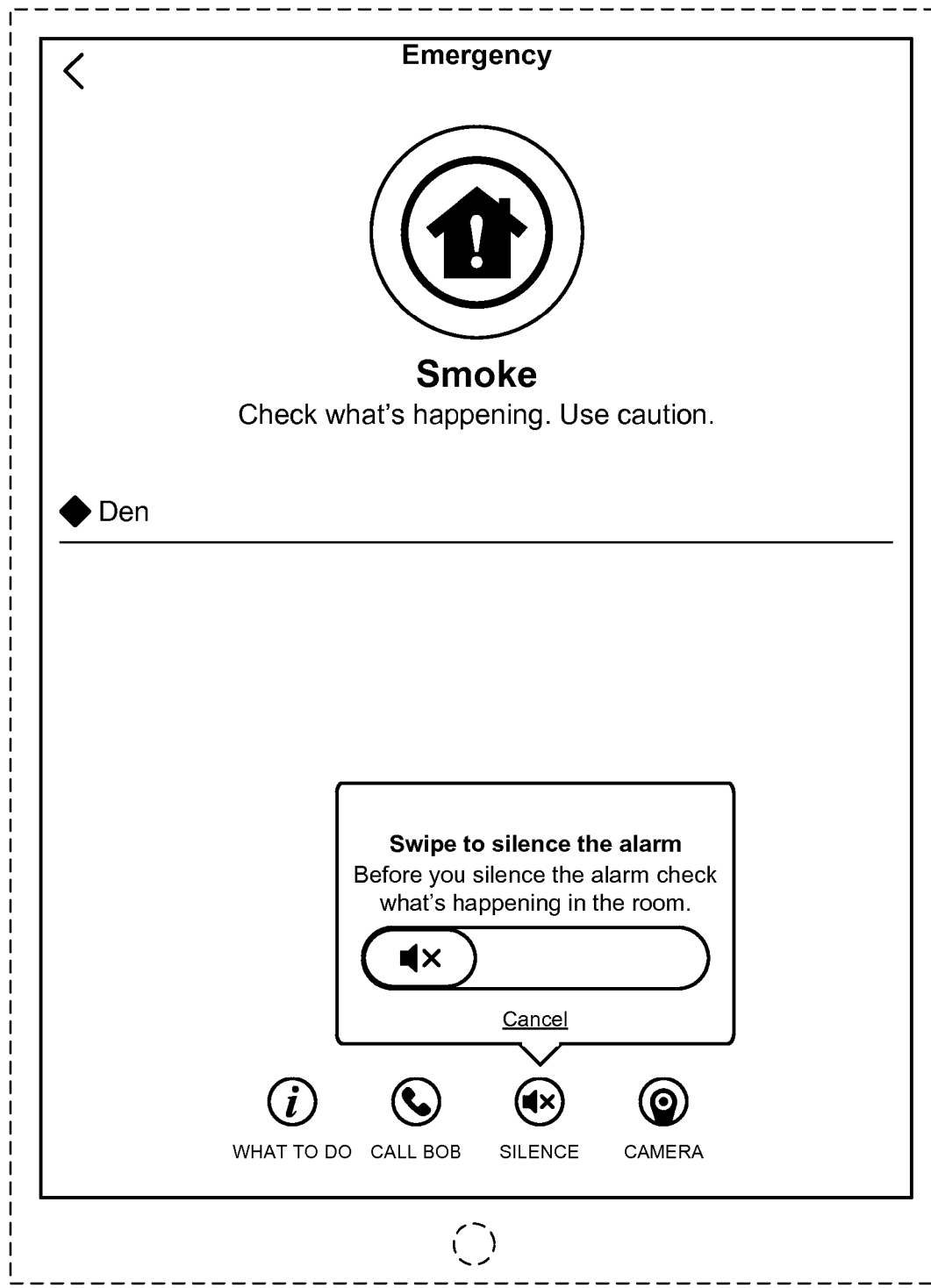
Figure 11A:
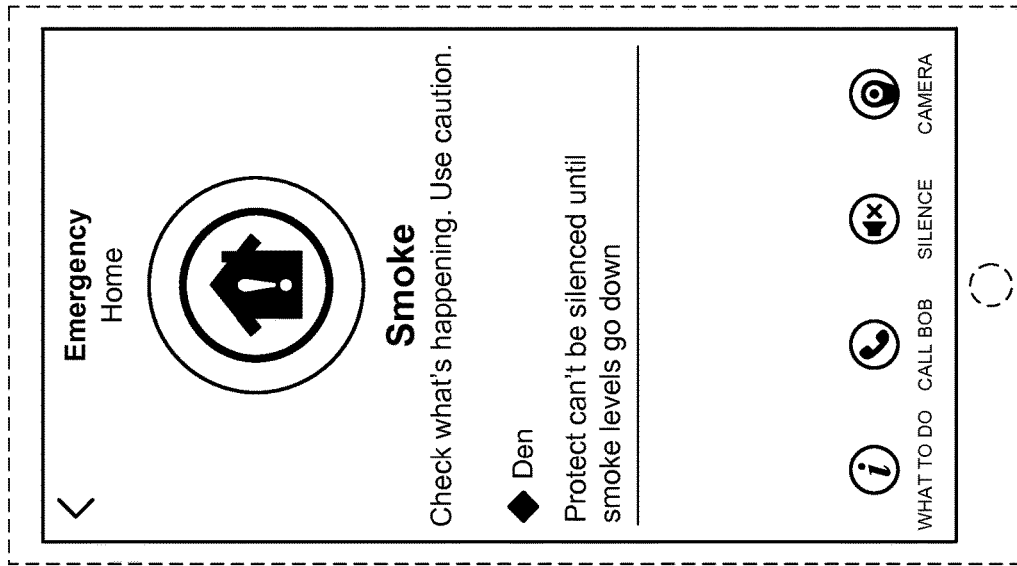
Figure 11A:
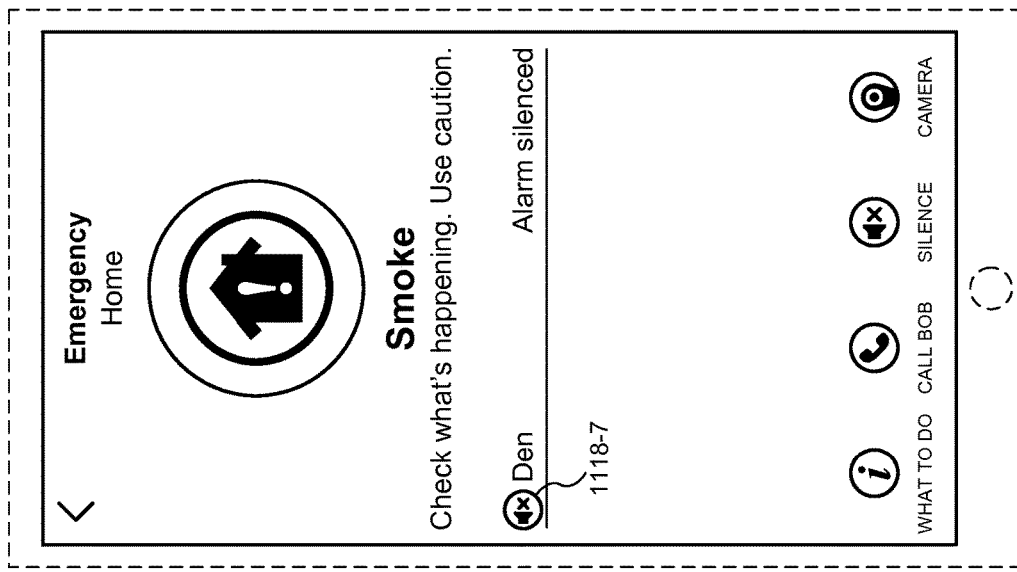
Figure 11A:
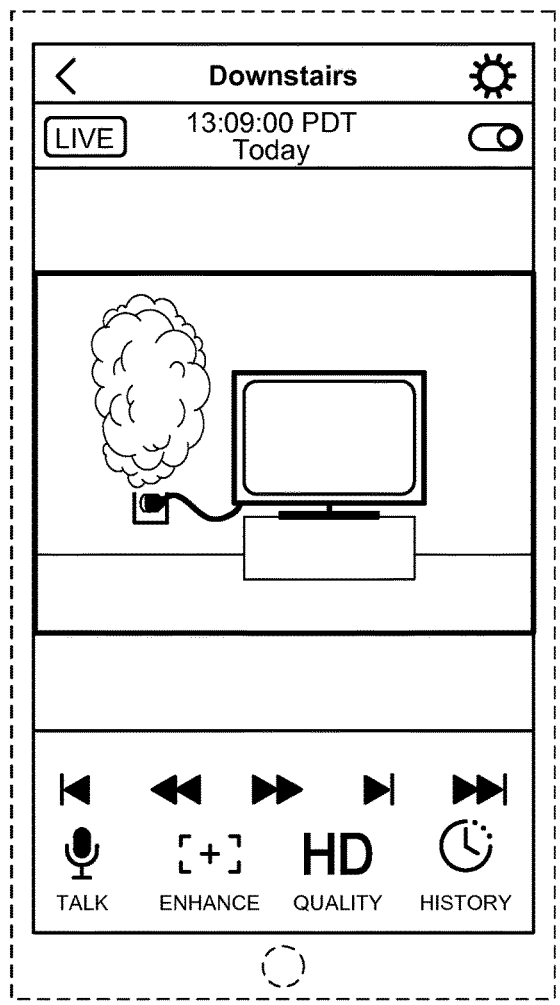
Figure 11A:
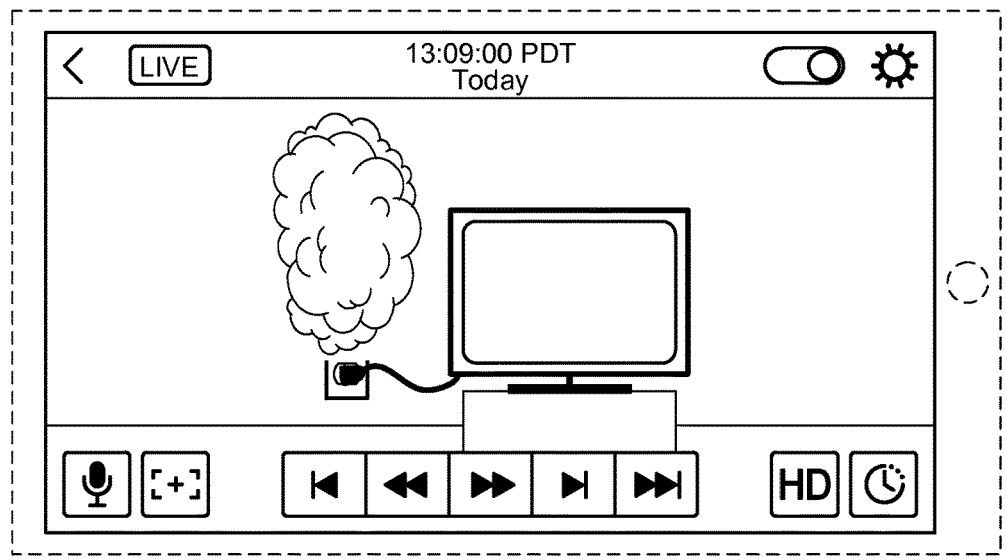

FIGS. 11Z and 11AA illustrate examples of other GUIs corresponding to alternative environment statuses. For example, FIG. 11Z illustrates a GUI that is displayed in response to detecting a threshold level of carbon monoxide, while FIG. 11AA illustrates a GUI that is displayed in response to detecting significant levels of smoke (e.g., more than the smoke levels detected in FIG. 11X). Because FIGS. 11Z and 11AA illustrate GUIs for environment statuses that correspond to alert levels that are higher than those in FIG. 11X (e.g., corresponding to an "Emergency" versus a "Heads-up"), in some implementations, the environment status graphics 1100-3 and 1100-4 and the device state indicators 1118-4 and 1118-5 represent different visual modes than those illustrated in FIG. 11X (e.g., red rings versus yellow rings, diamond icon versus triangle icon).

In addition to displaying the "alert notification" GUI of FIG. 11X, other optional GUIs may be displayed in response to a current environment status corresponding to a heightened alert level.

An implementation is shown in FIG. 11AB, illustrating a GUI similar to that of FIG. 11A (i.e., the "home screen"), but which includes an environment status graphic 1100-5 corresponding to an alert level (e.g., "Emergency") higher than that represented by the environment status graphic 1100-1 in FIG. 11A. In comparison to FIG. 11A, the device state graphics 1106 in FIG. 11AB also reflect respective device states that correspond to the heightened alert level. For example, the device state graphic 1106-1 for the camera 118 illustrates a live video feed of the scene in which the emergency event is occurring (e.g., a smoking electrical outlet). Furthermore, the device state graphic 1106-3 for the hazard detector 104 may change from a green to a red colored ring, reflecting the heightened alert level. Furthermore, in response to detecting selection of the environment status graphic 1100-5, the GUI of FIG. 11X (i.e., the "alert notification") and a corresponding feature set may be displayed and provided for selection. FIG. 11AC illustrates an alternative implementation of the GUI in FIG. 11AB.

Additionally and/or alternatively, the device states upon which a heightened current environment status is based may be displayed and viewed with the respective device-specific GUIs. For example, if the current environment status is based on a detected hazard, the GUI of FIG. 11AD (and FIG. 11O) corresponding to the hazard detector 104 may be accessed to display the respective device state and detected hazard. As shown in FIG. 11AD, the device state graphics 1118-3 and 1118-6 reflect a device state of the hazard detector 104 that corresponds to an alert level that is higher than that of FIG. 11O (e.g., red ring versus green ring, triangle icon versus circle icon). FIGS. 11AE and 11AF illustrate alternative implementations of the GUI in FIG. 11AD.

Additionally and/or alternatively, an indication of the heightened environment status may be displayed while displaying any GUI of the smart home application. Referring to the example in FIG. 11AG, while the computing device displays the device-specific GUI for the hazard detector 104 (e.g., GUI of FIG. 11O), an indicator 1124 may appear in response to detecting the heightened environment status. In response to detecting selection of the indicator 1124, the GUI of FIG. 11X (i.e., the "alert notification") and the corresponding feature set may be displayed and provided. FIGS. 11AH and 11AI illustrate alternative implementations of the GUI in FIG. 11AG.

Referring now to FIGS. 11AJ-11AW, illustrated are various GUIs that may be displayed in response to detecting selection of the various command affordances 1122 in FIG. 11X, the command affordances corresponding to commands for performing device functions associated with the current environment status.

For example, FIG. 11AJ illustrates a GUI displayed in response to detecting selection of the emergency instructions affordance 1122-1 in FIG. 11X. In this example, the GUI includes a set of emergency instructions corresponding to a fire or smoke hazard event. FIG. 11AK illustrates an alternative implementation of the GUI in FIG. 11AJ.

FIG. 11AL illustrates a GUI displayed in response to detecting selection of the alarm silence affordance 1122-3 in FIG. 11X. In this example, a user-interface element 1126-1 is displayed. In response to detecting a corresponding user input (e.g., a tap-and-hold touch gesture) on the user-interface element 1126-1, the computing device sends a command for silencing an audible alarm (e.g., an alarm sounding on a hazard detector 104). FIG. 11AM illustrates an alternative implementation of the GUI in FIG. 11AL. The GUIs of FIGS. 11AN and 11AO are displayed in response to detecting initiation and completion of the corresponding user input. FIGS. 11AP through 11AR illustrate alternative GUIs for silencing playback of audible device alarms, which include a user-interface element 1126-2 corresponding to a swipe touch gesture.

As shown in FIG. 11AS, the "alert notification" GUI (and other GUIs displaying the current environment status/relevant device status) is updated accordingly in response to the command for silencing the alarm, as shown by the device state graphic 1118-7 (e.g., a mute icon). In some implementations, the current environment status corresponds to an alert level that does not permit silencing an alarm. As an example, referring to FIG. 11AT, the GUI indicates that the alarm may not be silenced if smoke levels exceed a predefined threshold (e.g., "Protect can't be silenced until smoke levels go down"). As another example, referring to FIG. 11AU, the alarm may also not be silenced if the computing device is a distance from the alarming event that exceeds a predefined threshold (e.g., in accordance with safety protocol, users who are not within a certain distance from a detected hazard event may not silence an alarm).

FIG. 11AV illustrates a GUI displayed in response to detecting selection of the event camera feed affordance 1122-4 in FIG. 11X. In this example, the video feed of a camera device 118 nearby an alarming event is accessed, allowing a user associated with the smart home environment 100 to assess the event that triggered the alert level corresponding to the current environment status. In this example, the GUI displays a live video feed of a detected fire hazard. FIG. 11AW illustrates an alternative implementation of the GUI in FIG. 11AV.

The GUIs shown in FIGS. 11A-11AW are described in greater detail below in conjunction with the method 1200 of FIGS. 12A-12F.

FIGS. 12A-12F are flow diagrams illustrating a method 1200 of determining a set of features based on a current environment status, in accordance with some implementations. In some implementations, the method 1200 is performed by one or more electronic devices (e.g., devices of a smart home environment 100, FIGS. 1 and 12; smart devices 204 and/or hub device 180 of smart home network 202, FIG. 2) and/or one or more server systems (e.g., smart home provider server system 164 of FIGS. 1 and 2, hub server system 508 of FIG. 5). Thus, in some implementations, the operations of the method 1200 described herein are entirely interchangeable, and respective operations of the method 1200 are performed by any one or combination of the aforementioned devices and systems. For ease of reference, the method herein will be described as being performed by a computing device (e.g., client device 504, FIG. 8) having one or more processors and memory (e.g., a computer memory or other computer-readable storage medium, such as memory 806) storing instructions for execution by the one or more processors. FIGS. 12A-12F correspond to the instructions stored in computer memory.

The computing device identifies (1202) a current environment status of a plurality of environment statuses for the smart home environment. The smart home environment includes one or more electronic devices associated with the computing device (e.g., any one or combination of smart devices 204 in the smart home environment 100 of FIG. 1, such as a camera 118, a thermostat 102, a hazard detector 104, and/or an alarm system 122). As described in greater detail below, the identified current environment status for the smart home environment determines a corresponding feature set for interacting with the smart home environment, feature sets including selectable commands for performing device functions associated with the current environment status.

An environment status represents a particular condition or state (or set of conditions or states) for a given environment that includes one or more devices. Environment statuses may correspond to or indicate that a device process or activity is in progress (e.g., environment statuses indicating that devices are establishing connectivity with other devices (e.g., pairing), devices are booting/rebooting, devices are in process of switching modes, user is accessing a device feature (e.g., speech out/intercom), device testing is in progress, device is locking, user is logging into device and/or application for managing smart home environment, fire drill involving device is being conducted, etc.). Environment statuses may also correspond to or indicate a general device operability of some or all of the devices in an environment. A general device operability may be such that user attention is not needed (e.g., environment statuses indicating that devices are generally operable, devices are powered and in an "ON" state, user is viewing device and/or application, setup (e.g., pairing) or other process (e.g., mode switching) was completed successfully, etc.), while in other situations, a general device operability is such that user attention is needed (e.g., environment statuses indicating device connectivity issues (e.g., loose/disconnected physical wiring), device connection failures (e.g., failed device pairing, loss of Internet connectivity, no devices detected), device power/battery issues (e.g., low-power devices having no battery power remaining, power outage), software update required, etc.). Environment statuses may also correspond to, indicate, or alert a user as to the occurrence of an event. Events may be hazard events, which include the detection of smoke, carbon monoxide, chemicals, fire, flooding, extreme weather, and/or other environmental incidents implicating user health and safety. Events may also include the detection of motion (e.g., within a predefined zone of interest, within any portion of a scene under surveillance, etc.), a security breach (e.g., opening of a door, window, etc.), and/or other situations involving user safety. Events may also correspond to a predefined device threshold being satisfied (e.g., room temperature exceeds a predefined safety temperature threshold for a thermostat 102, threshold level of smoke/carbon monoxide detected, etc.).

In some implementations, each of the plurality of environment statuses for the smart home environment corresponds (1204) to a respective alert level of a predefined range of alert levels. Ranges of alert levels provide a relative measure as to the criticality, severity, urgency, or significance of a given environment status and the events, situations, or conditions to which they correspond or indicate. As an example, a range may include three distinct alert levels. Here, based on this range of alert levels, an environment status indicating low battery of a device may correspond to a first alert level (e.g., a "non-critical" alert level), whereas an environment status indicating detected motion by a camera may correspond to a second alert level that is higher than the first alert level (e.g., a "warning" alert level), and an environment status indicating a detected fire hazard may correspond to a third alert level that is higher than both the first and second alert levels (e.g., an "emergency" alert level).

In some implementations, the current environment status is (1206) a first environment status of the plurality of environment statuses and corresponds to a first alert level of the predefined range of alert levels. The first alert level may, for example, correspond to a lowest alert level in the range of alert levels, and therefore indicates that the current environment status represents a non-critical condition (e.g., all devices of the smart home environment have passed testing and are in an idle state).

In some implementations, the current environment status is (1208) a second environment status of the plurality of environment statuses and corresponds to a second alert level of the predefined range of alert levels that is higher than the first alert level. Here, the second alert level may, for example, correspond to a heightened alert level, where the corresponding second environment status indicates that an event or condition warranting the attention of an associated user has occurred or is occurring. For example, in some implementations, a first one of the one or more electronic devices is (1210) a hazard detector device (e.g., hazard detector 104), and the second environment status corresponds to the detection of smoke levels satisfying a first predefined smoke threshold. In some implementations, the first predefined smoke threshold is one of multiple predefined smoke thresholds which correspond to varying amounts of detected smoke. For example, the environment status graphic 1100-2 in FIG. 11X visually represents an environment status corresponding to the detection of smoke levels satisfying a first smoke threshold (e.g., "Heads-Up" alert), whereas the environment status graphic 1100-4 in FIG. 11AA visually represents an environment status corresponding to the detection of smoke levels satisfying a higher second smoke threshold (e.g., "Emergency" alert).

In some implementations, a first one of the one or more electronic devices is (1212) a camera device (e.g., camera 118), and the second environment status corresponds to the detection of motion in a predefined region monitored by the camera device. Alternatively (as described in greater detail below with respect to different device states of a camera device), the second environment status may correspond to the detection of motion events of a particular category (e.g., motion of an unidentified user, an animal, etc.), the detection of motion at a particular location (e.g., bedroom, patio, etc.), or the detection of motion at a particular time (e.g., at night) or on a particular day (e.g., during the weekdays).

Figure 12B:
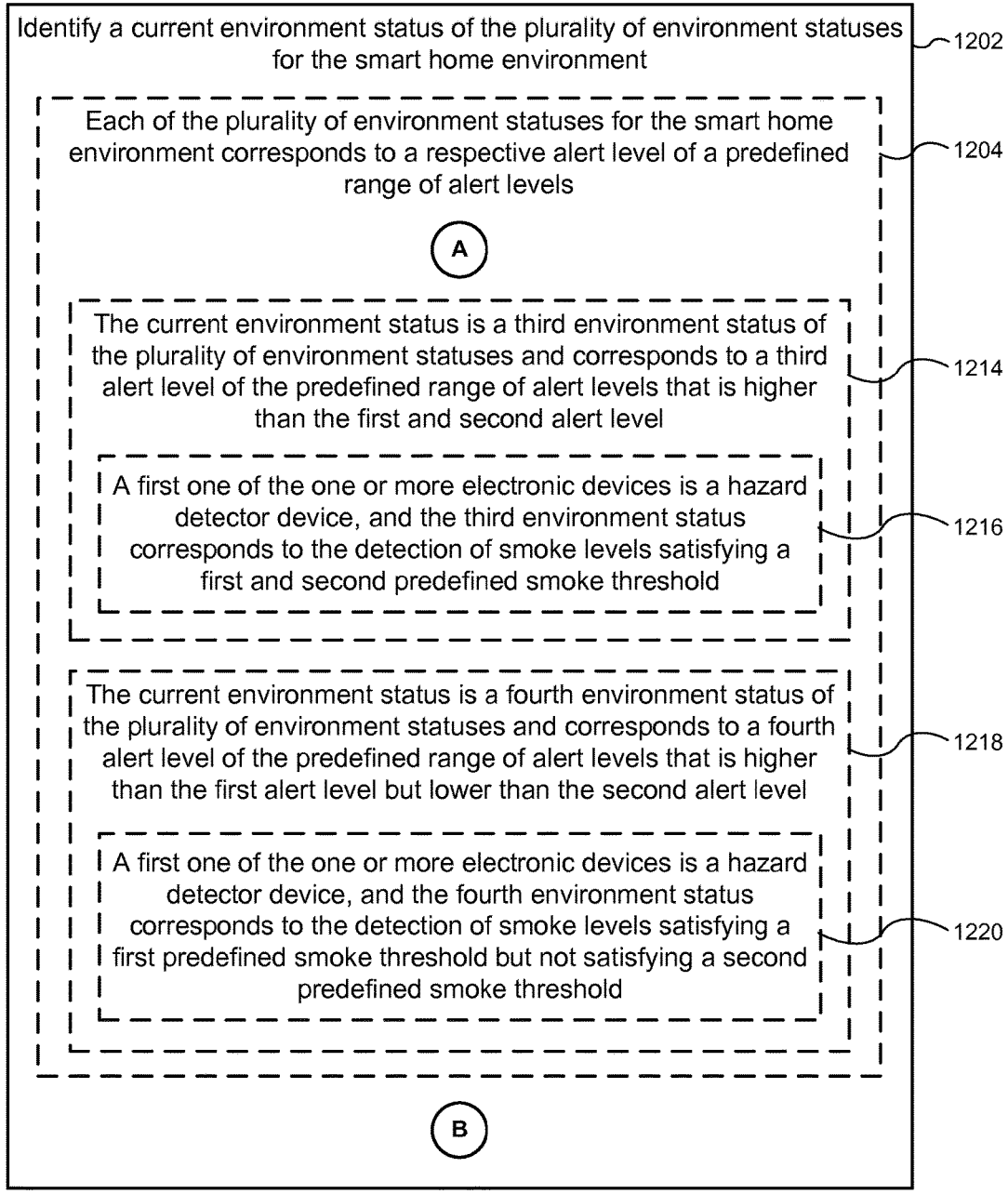

Referring now to FIG. 12B, in some implementations, the current environment status is (1214) a third environment status of the plurality of environment statuses and corresponds to a third alert level of the predefined range of alert levels that is higher than the first and second alert level. For example, given three distinct alert levels in a predefined range, the third alert level may correspond to a critical alert level, where the third environment status indicates that an emergency event or condition has occurred or is occurring. For example, in some implementations, a first one of the one or more electronic devices is (1216) a hazard detector device, and the third environment status corresponds to the detection of smoke levels satisfying a first and second predefined smoke threshold (e.g., large amounts of smoke, significant fire hazard).

In some implementations, the current environment status is (1218) a fourth environment status of the plurality of environment statuses and corresponds to a fourth alert level of the predefined range of alert levels that is higher than the first alert level but lower than the second alert level. In some implementations, a first one of the one or more electronic devices is (1220) a hazard detector device, and the fourth environment status corresponds to the detection of smoke levels satisfying a first predefined smoke threshold but not satisfying a second predefined smoke threshold. In contrast to the example above, the fourth environment status may, for example, correspond to the detection of only minor levels of smoke not rising to the level of an emergency (e.g., alert level in FIG. 11X corresponding to a "Heads-Up," in comparison to the alert level in FIG. 11AA corresponding to an "Emergency").

The implementations above describe only examples of a range of alert levels and the environment statuses to which they correspond. In other implementations, however, each alert level of a range of alert levels may correspond to any one or combination of other environment statuses representing different conditions or states of a particular device (e.g., for a hazard detector 104, alert levels correspond to varying amounts—or different types—of detected hazards), or multiple types of devices (e.g., a first alert level corresponding to an environment status indicating connectivity failures of camera 118, and also corresponding to an environment status indicating a required software update for a thermostat 102). Correspondence between alert levels and various environment statuses may therefore be predefined in any manner, and is not limited to any of the examples or implementations described herein.

Figure 12C:
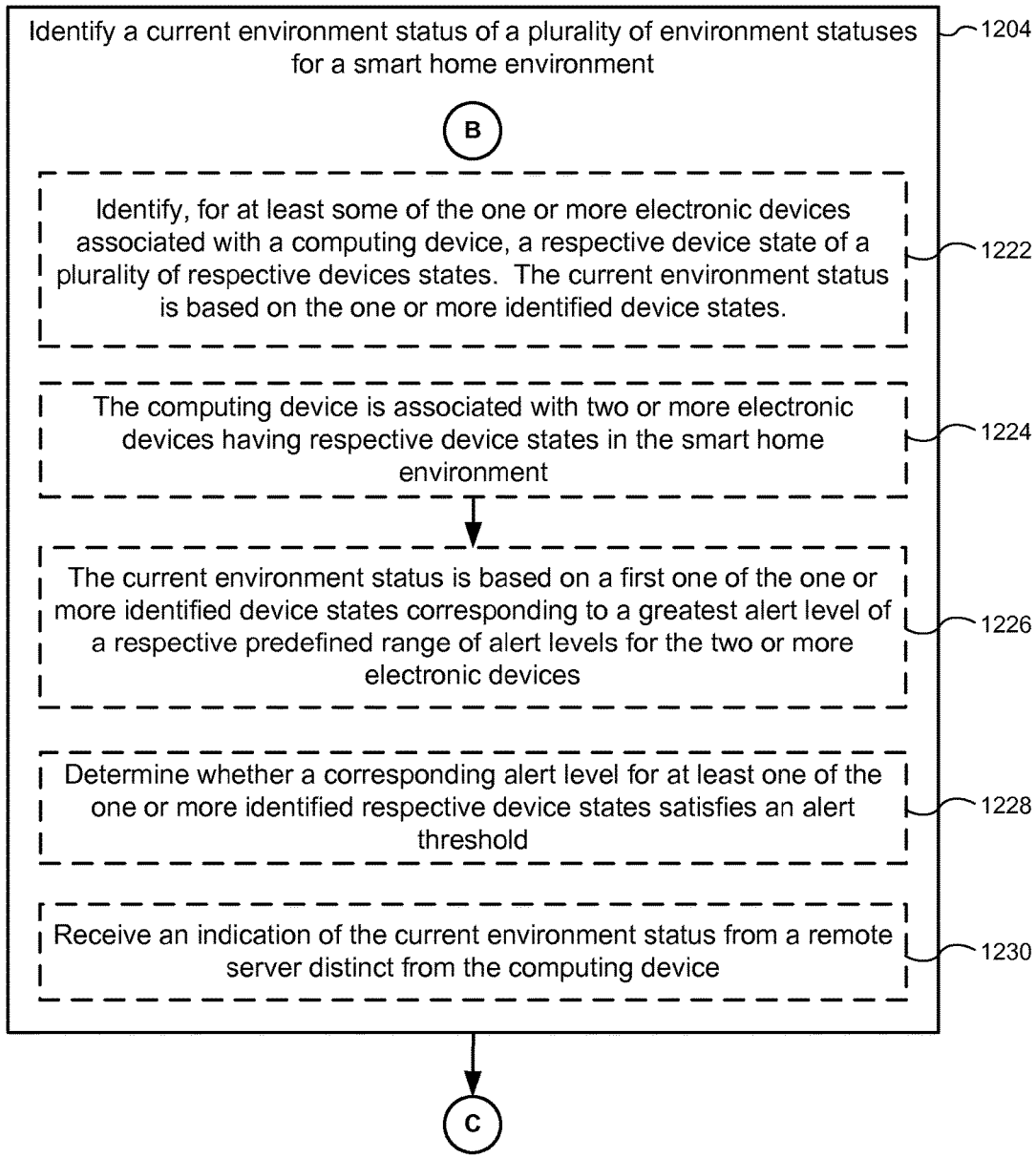

Referring now to FIG. 12C, in some implementations, identifying (1204) the current environment status includes identifying (1222) for at least some of the one or more electronic devices associated with a computing device, a respective device state of a plurality of respective devices states. The current environment status is based on the one or more identified device states. As described above with respect to environment statuses, device states similarly represent a condition or state of a particular device. Given differences in functionality and available features, different devices have distinct (although sometimes overlapping) sets of device states. As an example, a hazard detector 104 (e.g., FIG. 1) may include different states corresponding to different types of detected hazards (e.g., different states for smoke, carbon monoxide, fire), and for each type of hazard, a severity of the detected hazard (e.g., different states for low, medium, and high smoke levels). Devices may also have different states corresponding to different diagnostic (e.g., carbon monoxide test, smoke test, tests completed/failed, battery failure, sensor failure), calibration, or setup processes (e.g., device pairing, booting/rebooting, software update needed/in progress, reset required), and/or different device modes (e.g., night light mode, "Home/Away" modes). As another example, a camera 118 (e.g., FIG. 1) may have different states for detected motion, such as different states for the different predefined zones of interest in which motion is detected, categories of detected motion (e.g., motion of an unidentified user, animal, etc.), and/or locations in which motion is detected (e.g., front door, patio, bedroom).

Thus, as an example, if an identified device state of a hazard detector 104 indicates that smoke is detected in a premises, the current environment status is an environment status corresponding to a heightened alert level (e.g., a "warning" alert level) as a result of the identified device state.

In some implementations, the current environment status and its corresponding alert level is based on a combination of identified device states. For example, in some implementations, a respective environment status may require that a threshold number of devices (e.g., more than two, all, etc.) have a specified device state (e.g., the current environment status corresponds to a heightened alert level only if two or more hazard detectors 104 of the smart home environment 100 detect smoke).

In some implementations, the one or more devices in the smart home environment have respective alert priorities, and the current environment status and its corresponding alert level are based on a device of the one or more devices having the highest alert priority. In one example, the current environment status is based on the device state of a hazard detector 104 located in a home bedroom having a higher alert priority than a hazard detector 104 located in an office workplace. As another example, the current environment status is based on the device state of a camera 118 as opposed to a thermostat 102, if camera devices, as a device type, have a higher alert priority than thermostat devices.

Correspondence between device states and environment statuses may be predefined. Additionally and/or alternatively, the current environment status may be based on the respective alert levels of the device states. As with environment statuses, each device state of a device may correspond to a particular alert level of a respective range of alert levels for the device, where alert levels indicate a relative criticality, severity, urgency, or significance of a device state. For example, a device state of a hazard detector 104 indicating connectivity issues (e.g., with device pairing) may have a lower relative alert level than a device state corresponding to the detection of a fire hazard.

Thus, in some implementations, the computing device is associated (1224) with two or more electronic devices having respective device states, and the current environment status is based (1226) on a first one of the one or more identified device states corresponding to a greatest alert level of a respective predefined range of alert levels for the two or more electronic devices. For example, a smart home environment 100 may include a first and second hazard detector 104, where the first hazard detector has a device state indicating that device testing is in progress (corresponding to a first alert level) and the second hazard detector has a different device state corresponding to the detection of a fire hazard (corresponding to a second alert level that is higher than the first alert level). Consequently, given that the device state of the second hazard detector (e.g., fire detected) corresponds to a higher alert level than the device state of the first hazard detector (e.g., testing in progress), the current environment status (e.g., an environment status corresponding to a heightened alert level) will be based on and reflect the device state of the second hazard detector, rather than the first hazard detector.

In some implementations, identifying (1204) the current environment status includes determining (1228) whether a corresponding alert level for at least one of the one or more identified respective states satisfies an alert threshold. An alert threshold for a respective device may be a predefined alert level that the alert level of an identified device state must satisfy as a minimum. In one example, a first alert level of a respective range of alert levels for a hazard detector 104 may correspond to non-critical device states (e.g., testing in progress, software update needed), whereas a second alert level may correspond to semi-critical device states (e.g., small amount of smoke detected) and a third alert level may correspond to critical device states (e.g., large amount of smoke/fire detected). In this example, if the alert threshold is the second alert level (i.e., semi-critical device states of the hazard detector 104), the smart home environment 100 has a heightened environment status only if the alert level of the identified device state corresponds to at least a second alert level (e.g., at least some hazard is detected).

In some implementations, identifying (1204) the current environment status includes (1230) receiving an indication of the current environment status from a remote server distinct from the computing device (e.g., device states of devices in the smart home environment 100 are transmitted to the smart home provider server system 164 of FIGS. 1 and 10, which identifies the current environment status of the smart home environment 100 and transmits the current environment status to the client device 504).

Figure 12D:
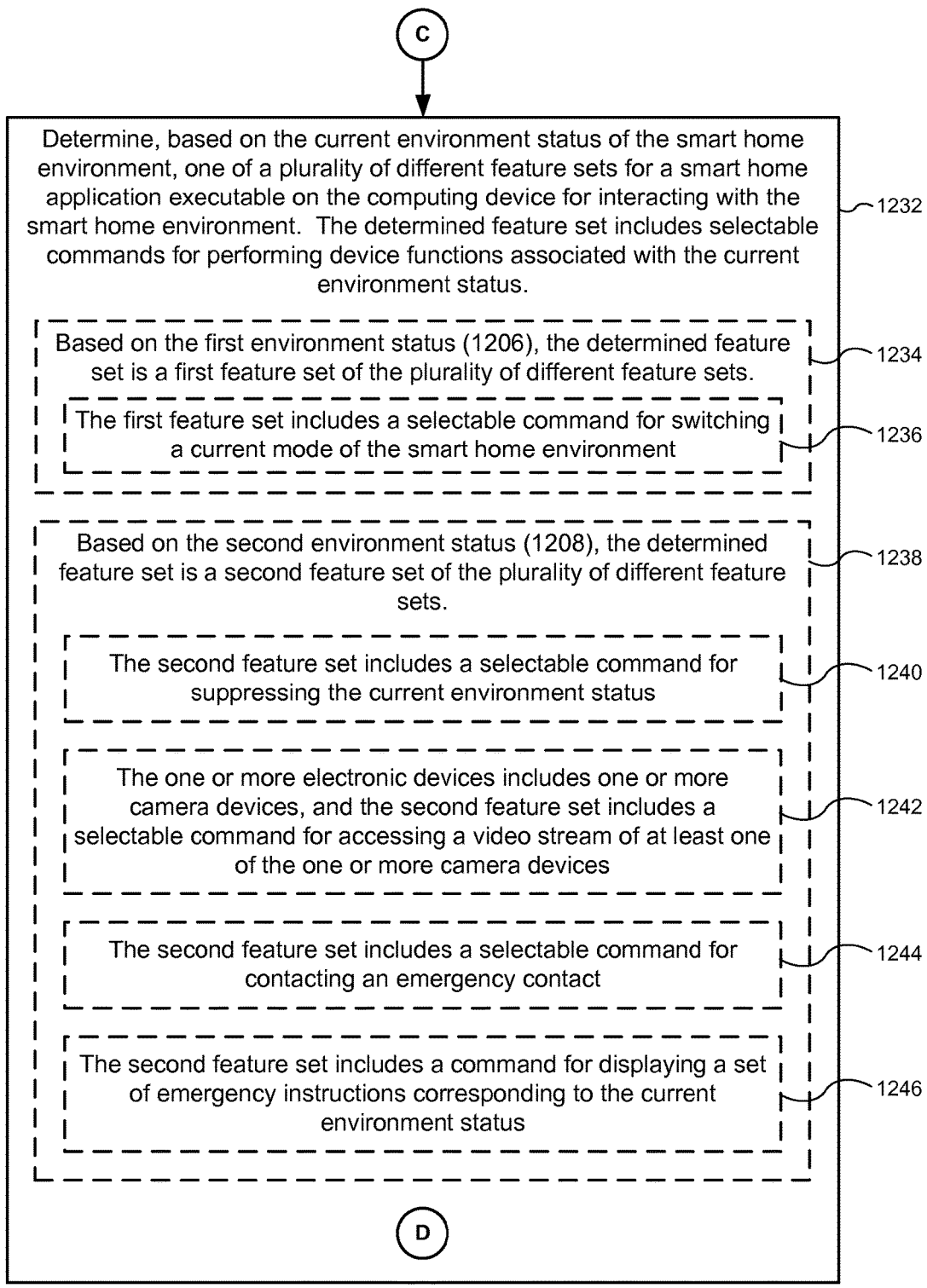

Referring now to FIG. 12D, after identifying the current environment status, the computing device determines (1232), based on the current environment status of the smart home environment, one of a plurality of different feature sets for a smart home application executable on the computing device for interacting with the smart home environment. The determined feature set includes selectable commands for performing device functions associated with the current environment status. Commands may include instructions executable by respective devices which cause devices to perform one or more device functions. Commands may also include instructions for configuring or calibrating device settings (e.g., adjusting temperature set points for a thermostat 102).

In some implementations, based on the first environment status (identified in 1206, corresponding to the first alert level), the determined feature set is (1234) a first feature set of the plurality of different feature sets. In some implementations, the first feature set includes (1236) a selectable command for switching a current mode of the smart home environment (e.g., switching between "Home" and "Away" modes for the smart home environment by selecting an environment mode affordance 1108 in FIG. 11C, where selecting an "Away" mode commands the thermostat 102 to enable predefined temperature setpoints).

In some implementations, based on the second environment status (identified in 1208, corresponding to a second alert level that is higher than the first alert level), the determined feature set is (1238) a second feature set of the plurality of different feature sets.

In some implementations, the second feature set includes (1240) a selectable command for suppressing the current environment status. The command for suppressing the current environment status may include a command for silencing an audible alarm (e.g., selecting an alarm silence affordance 1122-3 in FIG. 11X for silencing an alarm sounding on a hazard detector 104), or removing an alert notification from client device/other devices (e.g., dismissing the "alert card" in FIG. 11X).

In some implementations, the one or more electronic devices include (1242) one or more camera devices, and the second feature set includes a selectable command for accessing a video stream of at least one of the one or more camera devices. For example, selecting the event camera feed affordance 1122-4 in FIG. 11X executes a command for accessing a video feed of a camera 118 in the smart home environment 100. In some implementations, the current environment status is based on a respective device state of a first one of the one or more electronic devices and the one or more camera devices includes two or more camera devices, where accessing (1242) the video stream includes accessing a first camera device of the two or more camera devices that is closest in proximity to the first electronic device (e.g., the current environment status is based on the device state of the hazard detector 104 indicating that smoke is detected, where in response to selecting the event camera feed affordance 1122-4 in FIG. 11X, the video feed of the camera closest to the hazard detector 104 is displayed, as shown in FIG. 11AV).

In some implementations, the second feature set includes (1244) a selectable command for contacting an emergency contact. For example, selecting the emergency contact affordance 1122-2 in FIG. 11X executes a command for contacting a designated emergency contact (e.g., using the computing device to dial a phone number of the designated emergency contact, sending an electronic notification to the designated emergency contact, etc.).

In some implementations, the second feature set includes (1246) a command for displaying a set of emergency instructions corresponding to the current environment status. For example, selecting the emergency instructions affordance 1122-1 in FIG. 11X displays text for a corresponding security protocol, as shown in FIG. 11AJ.

Figure 12E:
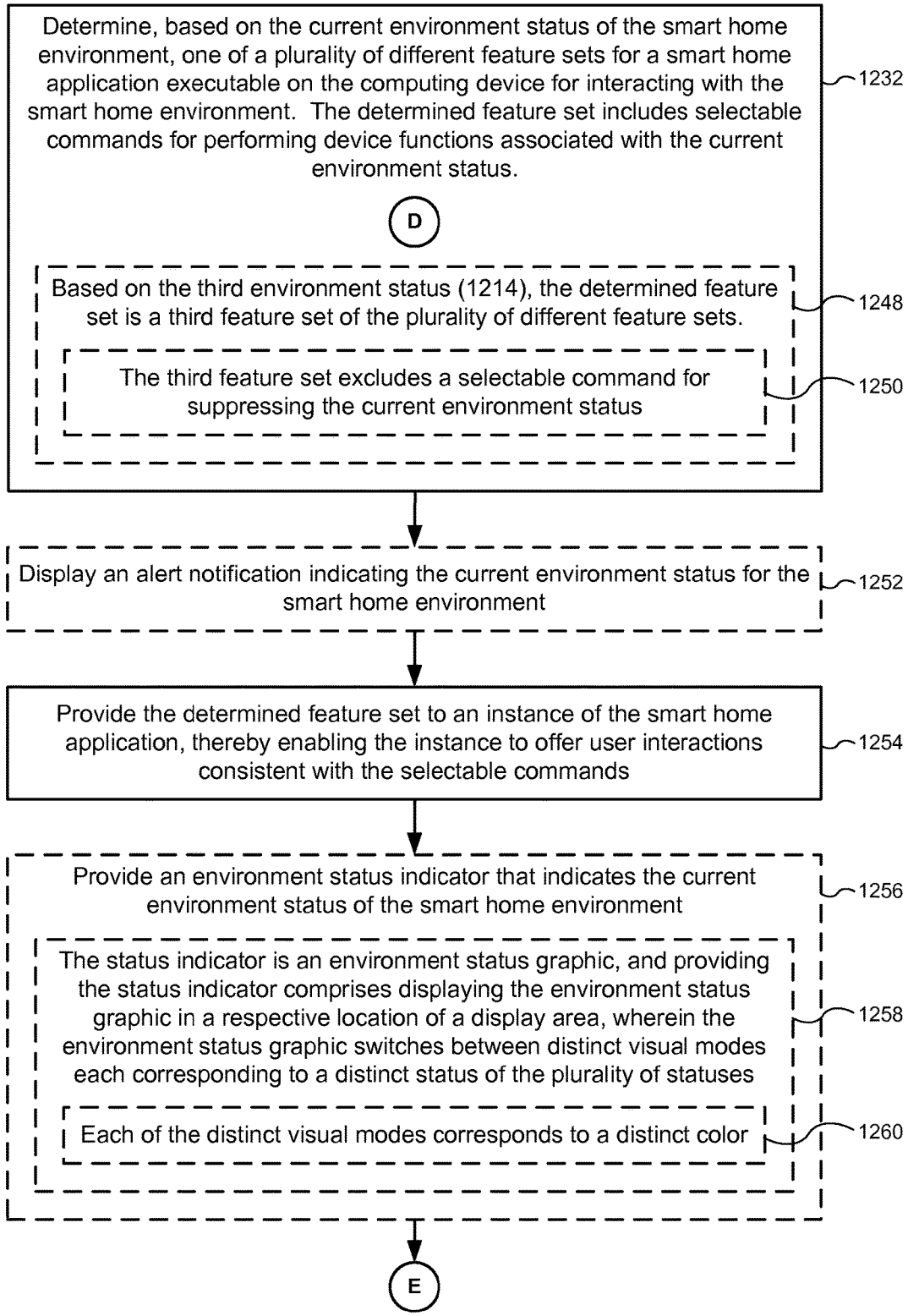

Referring now to FIG. 12E, in some implementations, based on the first environment status (identified in 1214, corresponding to a third alert level that is higher than the first and second alert level), the determined feature set is (1248) a third feature set of the plurality of different feature sets. In some implementations, the third feature set excludes (1250) a selectable command for suppressing the current environment status. For example, if the third alert level corresponds to an emergency event in which a significant amount of smoke is detected, a command for silencing an alarm sounding on the hazard detector 104 is not available or selectable by a user, as shown in FIG. 11AT. Thus, while the command for suppressing the current environment status may be included in another feature set determined based on one environment status (e.g., small amount of smoke detected), the command is excluded from a feature set determined based on a different environment status (e.g., significant amount of smoke detected).

The implementations above describe only examples of determined feature sets and the environment statuses (and respective alert levels) to which they correspond. In other implementations, however, a particular feature set may correspond to any environment status, and may include any one or combination of selectable commands (e.g., commands for displaying emergency instructions and contacting an emergency contact are selectable only when the current environment status is a third environment status (e.g., "Emergency"), and a command for silencing an alarm is selectable only when the current environment status is a second environment status (e.g., "Heads-Up")). Correspondence between feature sets and various environment statuses may therefore be predefined in any manner, and is not limited to any of the examples or implementations described herein.

In some implementations, the computing device displays (1252) an alert notification indicating the current environment status for the smart home environment. An example is illustrated in FIG. 11X, where an "alarm card" indicating the current environment status (e.g., detection of smoke) is displayed on the computing device in response to detecting the heightened environment status. In this example, the "alarm card" of FIG. 11X is overlaid on the "home screen" of FIG. 11A (or any active screen being viewed within the smart home application).

After determining (1232) the feature set based on the current environment status, the computing device provides (1254) the determined feature set to an instance of the smart home application, thereby enabling the instance to offer user interactions consistent with the selectable commands. In some implementations, a GUI is displayed on the computing device of a user associated with the smart home environment 100, which includes various user-interface elements corresponding to selectable commands (e.g., the GUI of FIG. 11X, which includes command affordances 1122, selection of which sends commands for performing various device functions). In some implementations, the determined feature set is provided (e.g., displayed on a GUI as selectable user-interface elements) in response to detecting a user input indicating selection of a displayed environment status indicator corresponding to the current environment status (e.g., user input detected on environment status indicator 1100-5, FIG. 11AB, in response to which the GUI of FIG. 11AA and command affordances 1122 are displayed).

In some implementations, after providing (1254) the determined feature set to the instance of the smart home application, a user input is detected, indicating selection of a command of the determined feature set. In response to detecting the user input, the selected command is executed by the computing device (e.g., using the computing device to dial an emergency contact) or is sent towards and for execution by one or more of the one or more electronic devices in the smart home environment (e.g., command for silencing alarm is sent to the hazard detector 104).

In some implementations, an environment status indicator is provided (1256) that indicates the current environment status of the smart home environment. In some implementations, the computing device displays a user interface icon that reflects the current environment status (e.g., environment status graphic 1100-1, FIG. 11A). In some implementations, providing the environment status indicator includes playing a sound effect (e.g., a beep, chirp, or chime corresponding to a detected hazard), providing tactile feedback (e.g., vibration), and/or displaying a visual effect (e.g., flashing screen, rings radiating outwards from the environment status graphic 1100-1 in FIG. 11X).

In some implementations, the status indicator is (1258) a status graphic, and providing the status indicator comprises displaying the status graphic in a respective location of a display area, wherein the status graphic switches between distinct visual modes each corresponding to a distinct status of the plurality of statuses. Referring to the example in FIG. 11A, an environment status graphic 1100-1 (a house-shaped icon including an outline of a door) is displayed that corresponds to a first environment status. As shown in FIG. 11AB, the environment status graphic switches between distinct visual modes as a result of a heightened environment status, where the environment status graphic 1100-2 (FIG. 11AB) is distinct from the environment status graphic 1100-1 (FIG. 11A) (e.g., transformation into a house-shaped icon with an exclamation point). In some implementations, each of the distinct visual modes corresponds (1260) to a distinct color. For example, although not illustrated, the environment status graphic 1100-1 in FIG. 11A (indicating a first environment status corresponding to a non-critical status of the smart home environment) may be represented by a green ring, whereas the environment status graphic 1100-2 in FIG. 11AB (indicating a second environment status corresponding to the detection of some smoke) may be represented by a yellow ring, and the environment status graphic 1100-4 in FIG. 11AA (indicating a third environment status corresponding to the detection of significant smoke) may be represented by a red ring. In some implementations, the distinct visual modes may correspond to the display of different visual effects (e.g., soft glow, object rotation, flash, screen brightening/dimming, etc.).

Figure 12F:
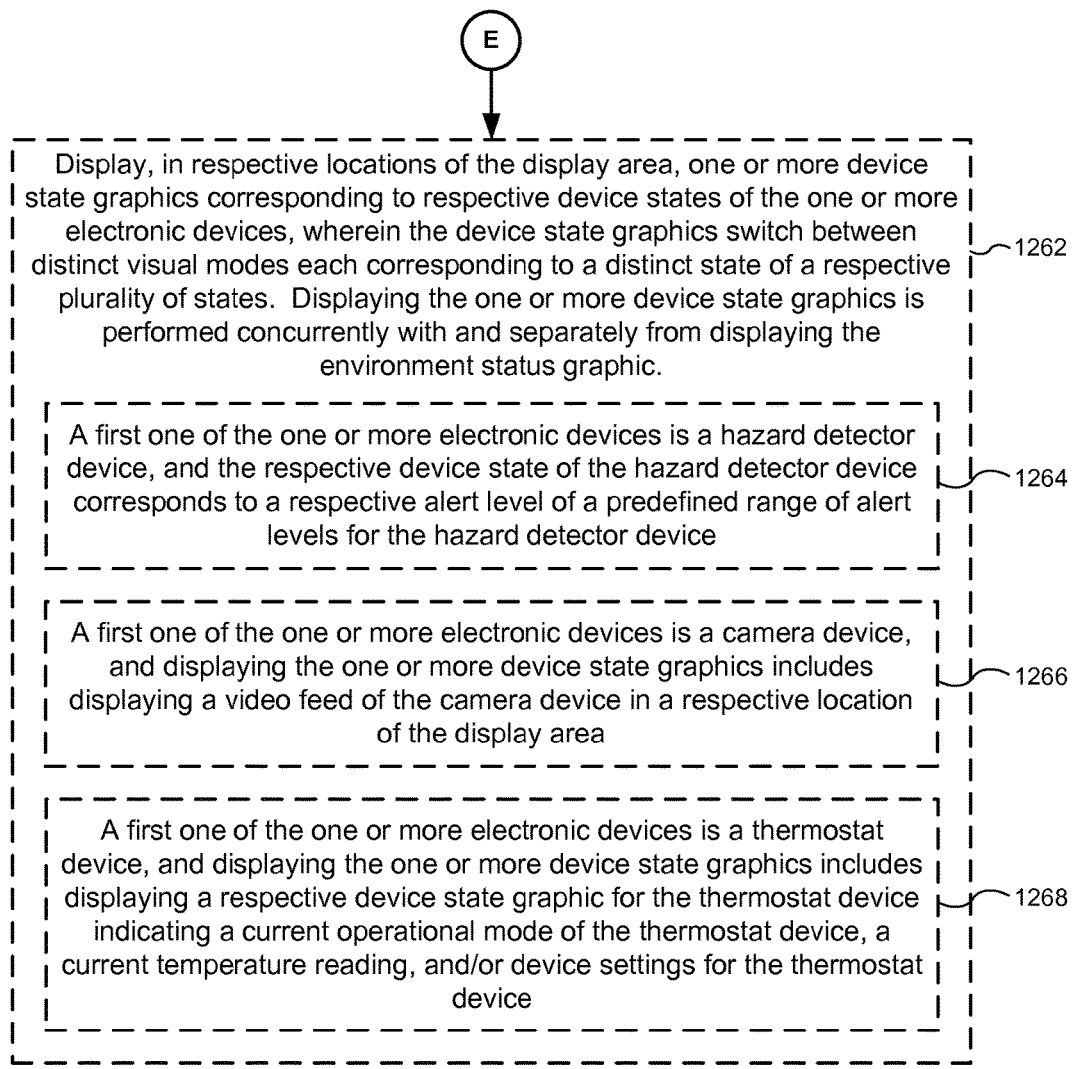

Referring now to FIG. 12F, in some implementations, the computing device displays (1262), in respective locations of the display area, one or more state graphics corresponding to respective device states of the one or more electronic devices, wherein the state graphics switch between distinct visual modes each corresponding to a distinct state of a respective plurality of states. Displaying the one or more state graphics is performed concurrently with and separately from displaying the status graphic. FIG. 11A illustrates a GUI that includes an environment status graphic 1100-1 and device state graphics 1106-1 through 1106-3 corresponding to a camera 118, a thermostat 102, and a hazard detector 104, respectively. In some implementations, a first one of the one or more electronic devices is (1264) a hazard detector device, and the respective device state of the hazard detector device corresponds to a respective alert level of a predefined range of alert levels for the hazard detector device. Thus, in some implementations, each of the distinct visual modes corresponds to a distinct alert level for device states of a hazard detector 104 (e.g., device state graphic 1106-3 in FIG. 11A corresponds to a first device state and first alert level (e.g., a non-critical state in which no hazard are detected) and is represented by a green ring, whereas the device state graphic 1106-3 in FIG. 11AB corresponds to a second device state of the hazard detector 104 (e.g., emergency state smoke is detected) and is represented by a red ring).

In some implementations, a displayed visual mode of the environment status graphic is based on a displayed visual mode of a device state graphic, of the one or more device state graphics, corresponding to a device whose device state the current environment status is based upon. As an example, if the current environment status is a second environment status (e.g., fire hazard detected) as a result of an identified device state of a hazard detector 104, both the environment status graphic and the device state graphic of the hazard detector 104 will display the same visual mode (e.g., red rings).

In some implementations, a first one of the one or more electronic devices is (1266) a camera device, and displaying the one or more device state graphics includes displaying a video feed of the camera device in a respective location of the display area (e.g., device state graphic 1106-1, FIG. 11A).

In some implementations, a first one of the one or more electronic devices is (1268) a thermostat device, and displaying the one or more device state graphics includes displaying a respective device state graphic for the thermostat device indicating a current operational mode of the thermostat device, a current temperature reading, and/or device settings for the thermostat device. An example is shown in FIG. 11B, where the device state graphic 1106-2 displays a blue color when in a "cooling" operational mode. Furthermore, the device state graphic 1106-2 displays a current temperature reading (e.g., 60°), and also a current device setting (e.g., a leaf symbol indicating an energy savings setting).

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a computing device having one or more processors and memory storing instructions for execution by the one or more processors, wherein the computing device is associated with a plurality of electronic devices in a smart home environment, the plurality of electronic devices together composing the smart home environment at least in part, and the smart home environment having a plurality of environment statuses, each of the plurality of environment statuses corresponding to an alert level in a hierarchy of three or more alert levels defined to indicate a relative measure of criticality, severity, urgency, or significance of a status of the smart home environment, the three or more alert levels including at least a non-critical alert level, a heightened alert level, and an emergency alert level concerning the status of the smart home environment:
identifying, for each of at least some of the plurality of electronic devices, a device state of the electronic device;
determining a current environment status from the hierarchy of three or more alert levels of the plurality of environment statuses for the smart home environment based on a combination of the plurality of identified device states, wherein the current environment status for the smart home environment is separate from and in addition to the plurality of identified device states for the plurality of electronic devices;
concurrently displaying, in a display area of the computing device, an environment status indicator that indicates the current environment status of the smart home environment and a plurality of device state icons corresponding to respective device states of at least some of the plurality of electronic devices, wherein at least one of the respective device states corresponds to a device state alert level in a second hierarchy of three or more second alert levels defined to indicate a relative measure of criticality, severity, urgency, or significance of a device state of a first one of the plurality of electronic devices, the three or more second alert levels including at least a non-critical alert level, a heightened alert level, and an emergency alert level concerning the at least one of the respective device states;
in response to a determination of the current environment status, determining one of a plurality of different feature sets for a smart home application executable on the computing device for interacting with the smart home environment, wherein the determined feature set comprises selectable commands for performing device functions associated with the current environment status; and
providing the determined feature set to an instance of the smart home application, thereby enabling the instance to offer user interactions consistent with the selectable commands;
wherein the plurality of electronic devices include a hazard detector device having two or more threshold levels, and each of the three or more alert levels of the plurality of environment statuses is at least partially defined based on the two or more threshold levels of the hazard detector device.

2. A non-transitory computer readable storage medium, storing one or more programs for execution by one or more processors of a computing device associated with a plurality of electronic devices in a smart home environment, the plurality of electronic devices together composing the smart home environment at least in part, and the smart home environment having a plurality of environment statuses, the one or more programs including instructions for:
identifying, for each of at least some of the plurality of electronic devices, a device state of the electronic device;
determining a current environment status from the hierarchy of three or more alert levels of the plurality of environment statuses for the smart home environment based on a combination of the plurality of identified device states, wherein:
the current environment status for the smart home environment is separate from and in addition to the plurality of identified device states for the plurality of electronic devices;
each of the plurality of environment statuses corresponding to an alert level in a hierarchy of three or more alert levels defined to indicate a relative measure of criticality, severity, urgency, or significance of a status of the smart home environment; and
the three or more alert levels includes at least a non-critical alert level, a heightened alert level, and an emergency alert level concerning the status of the smart home environment;
concurrently displaying, in a display area of the computing device, an environment status indicator that indicates the current environment status of the smart home environment and a plurality of device state icons corresponding to respective device states of at least some of the plurality of electronic devices, wherein at least one of the respective device states corresponds to a device state alert level in a second hierarchy of three or more second alert levels defined to indicate a relative measure of criticality, severity, urgency, or significance of a device state of a first one of the plurality of electronic devices, the three or more second alert levels including at least a non-critical alert level, a heightened alert level, and an emergency alert level concerning the at least one of the respective device states;
in response to a determination of the current environment status, determining one of a plurality of different feature sets for a smart home application executable on the computing device for interacting with the smart home environment, wherein the determined feature set comprises selectable commands for performing device functions associated with the current environment status; and providing the determined feature set to an instance of the smart home application, thereby enabling the instance to offer user interactions consistent with the selectable commands;
wherein the plurality of electronic devices include a hazard detector device having two or more threshold levels, and each of the three or more alert levels of the plurality of environment statuses is at least partially defined based on the two or more threshold levels of the hazard detector device.

3. The method of claim 1, wherein the current environment status is a second environment status of the plurality of environment statuses and the determined feature set is a second feature set of the plurality of different feature sets, the second environment status corresponding to the heightened alert level in the hierarchy of alert levels that is higher than the non-critical alert level.

4. The method of claim 3, wherein a second one of the plurality of electronic devices is a hazard detector device, and the second environment status corresponds to one of: the detection of smoke levels satisfying a first predefined smoke threshold, the detection of temperature satisfying a first predefined temperature threshold, and the detection of carbon monoxide levels satisfying a first predefined monoxide threshold.

5. The method of claim 3, wherein the second feature set includes a selectable command for suppressing the current environment status.

6. The method of claim 3, wherein the second environment status corresponds to detection of motion of a predefined category, motion in a predefined region, or motion that occurs at a predefined time frame by a camera device.

7. The method of claim 3, wherein:
the plurality of electronic devices include one or more camera devices; and
the second feature set includes a selectable command for accessing a video stream of at least one of the one or more camera devices.

8. The method of claim 7, wherein:
the current environment status is based on a respective device state of a first one of the plurality of electronic devices;
the one or more camera devices includes two or more camera devices; and
accessing the video stream comprises:
determining a first camera device of the two or more camera devices that is closest in proximity to the first electronic device; and
accessing the first camera device.

9. The method of claim 3, wherein the second feature set includes a selectable command for contacting an emergency contact.

10. The method of claim 3, wherein the current environment status is a third environment status of the plurality of environment statuses and the determined feature set is a third feature set of the plurality of different feature sets, the third environment status corresponding to the emergency alert level in the hierarchy of alert levels that is higher than the non-critical alert level and the heightened alert level, and wherein the third feature set excludes a selectable command for suppressing the current environment status.

11. The method of claim 1, wherein a second one of the plurality of electronic devices is a camera device, and displaying the plurality of device state icons comprises displaying at least one image from a live video feed of the camera device in a first one of the plurality of device state icons.

12. The method of claim 1, wherein a third one of the plurality of electronic devices is a thermostat, and displaying the plurality of device state icons comprises displaying at least an operational mode, a current temperature reading and a current device setting of the thermostat in a second one of the plurality of device state icons.

13. A computing device associated with a plurality of electronic devices in a smart home environment, the plurality of electronic devices together composing the smart home environment at least in part, and the smart home environment having a plurality of environment statuses, the computing device comprising:
a processor; and
memory for storing one or more programs for execution by the processor, the one or more programs including instructions for:
identifying, for each of at least some of the plurality of electronic devices, a device state of the electronic device;
determining a current environment status from the hierarchy of three or more alert levels of the plurality of environment statuses for the smart home environment based on a combination of the plurality of identified device states, wherein:
the current environment status for the smart home environment is separate from and in addition to the plurality of identified device states for the plurality of electronic devices;
each of the plurality of environment statuses corresponding to an alert level in a hierarchy of three or more alert levels defined to indicate a relative measure of criticality, severity, urgency, or significance of a status of the smart home environment; and
the three or more alert levels includes at least a non-critical alert level, a heightened alert level, and an emergency alert level concerning the status of the smart home environment;
concurrently displaying, in a display area of the computing device, an environment status indicator that indicates the current environment status of the smart home environment and a plurality of device state icons corresponding to respective device states of at least some of the plurality of electronic devices, wherein at least one of the respective device states corresponds to a device state alert level in a second hierarchy of three or more second alert levels defined to indicate a relative measure of criticality, severity, urgency, or significance of a device state of a first one of the plurality of electronic devices, the three or more second alert levels including at least a non-critical alert level, a heightened alert level, and an emergency alert level concerning the at least one of the respective device states;
in response to a determination of the current environment status, determining one of a plurality of different feature sets for a smart home application executable on the computing device for interacting with the smart home environment, wherein the determined feature set comprises selectable commands for performing device functions associated with the current environment status; and
providing the determined feature set to an instance of the smart home application, thereby enabling the instance to offer user interactions consistent with the selectable commands;

wherein the plurality of electronic devices include a hazard detector device having two or more threshold levels, and each of the three or more alert levels of the plurality of environment statuses is at least partially defined based on the two or more threshold levels of the hazard detector device.

14. The computing device of claim 13, wherein the environment status indicator is an environment status graphic, and the environment status graphic switches between distinct visual modes each corresponding to a distinct environment status of the plurality of environment statuses.

15. The computing device of claim 14, wherein the device state graphics switch between distinct visual modes each corresponding to a distinct device state of a respective plurality of device states, and wherein displaying the plurality of device state graphics is performed concurrently with and separately from displaying the environment status indicator.

16. The computing device of claim 13, comprising instructions for displaying a video feed of a camera device in a respective location of the display area.

17. The computing device of claim 13, comprising instructions for receiving an indication of the current environment status from a remote server distinct from the computing device.

18. The computer readable storage medium of claim 2, wherein:
   the plurality of electronic devices comprise two or more electronic devices having respective device states; and
   the current environment status is based on a first one of the plurality of identified device states corresponding to the emergency alert level of the hierarchy of alert levels for the two or more electronic devices.

19. The computer readable storage medium of claim 2, further comprising instructions for displaying an alert notification indicating the current environment status for the smart home environment.

20. The computer readable storage medium of claim 2, further comprising instructions for:
   detecting a user input indicating selection of the displayed environment status indicator; and
   providing the determined feature set to the instance of the smart home application in response to detecting the user input indicating selection of the displayed environment status indicator.

* * * * *